(12) United States Patent
Baker

(10) Patent No.: US 12,306,617 B2
(45) Date of Patent: May 20, 2025

(54) AUTOMATED MANUFACTURING ARCHITECTURAL MILLWORK

(71) Applicant: Robert Anthony Baker, Washington, DC (US)

(72) Inventor: Robert Anthony Baker, Washington, DC (US)

(*) Notice: Subject to any disclaimer, the term of this patent is extended or adjusted under 35 U.S.C. 154(b) by 0 days.

(21) Appl. No.: 18/077,656

(22) Filed: Dec. 8, 2022

(65) Prior Publication Data

US 2023/0097555 A1 Mar. 30, 2023

Related U.S. Application Data

(62) Division of application No. 16/582,330, filed on Sep. 25, 2019, now Pat. No. 11,556,116.

(Continued)

(51) Int. Cl.
G05B 19/418 (2006.01)
B27C 5/00 (2006.01)
(Continued)

(52) U.S. Cl.
CPC . *G05B 19/41865* (2013.01); *G05B 19/40931* (2013.01); *G05B 19/4097* (2013.01);
(Continued)

(58) Field of Classification Search
None
See application file for complete search history.

(56) References Cited

U.S. PATENT DOCUMENTS 5,692,195 A 11/1997 Conner et al.
6,662,062 B1 12/2003 Bjornson et al.
(Continued)

FOREIGN PATENT DOCUMENTS

BE 1019669 A5 9/2012
CN 1713196 A 12/2005
(Continued)

OTHER PUBLICATIONS

Notification of Transmittal of the International Search Report and the Written Opinion of the International Searching Authority issued on Dec. 23, 2019, in connection with corresponding international Application No. PCT/US19/52902 (11 pgs.).

(Continued)

*Primary Examiner* — Sean Shechtman
(74) *Attorney, Agent, or Firm* — Maier & Maier, PLLC

(57) ABSTRACT

A system and method for making made-to-order architectural millwork of custom dimensions; including the design of wood joints and a system for deploying them within the overall structural design of individual architectural millwork units, as well as methods for online design and ordering, automated writing of machine code, robotic part preparation, and simplified on-site installation. With the automation and generation of digital code for manufacturing custom architectural components, this method makes the formation of distributed manufacturing centers possible. Through this method and with minimum re-tooling and/or training, these centers are able to produce custom millwork more efficiently and effectively than traditional custom millwork woodshops.

12 Claims, 70 Drawing Sheets

Related U.S. Application Data

(60) Provisional application No. 62/736,641, filed on Sep. 26, 2018.

(51) Int. Cl.
  *B27M 3/18* (2006.01)
  *G05B 19/4093* (2006.01)
  *G05B 19/4097* (2006.01)

(52) U.S. Cl.
  CPC ............... *B27C 5/00* (2013.01); *B27M 3/18* (2013.01); *G05B 2219/45145* (2013.01); *G05B 2219/45197* (2013.01); *G05B 2219/45229* (2013.01)

(56) References Cited

U.S. PATENT DOCUMENTS

| | | |
|---|---|---|
| 7,155,440 B1 | 12/2006 | Kronmiller et al. |
| 8,463,426 B1 | 6/2013 | Rogers et al. |
| 11,556,116 B2 | 1/2023 | Baker |
| 2003/0004596 A1 | 1/2003 | Landers et al. |
| 2004/0093113 A1 | 5/2004 | Bjornson et al. |
| 2005/0257437 A1 | 11/2005 | Juten et al. |
| 2006/0075718 A1 | 4/2006 | Borne et al. |
| 2011/0282757 A1 | 11/2011 | Muckle, Jr. et al. |
| 2012/0066019 A1 | 3/2012 | Hinshaw et al. |
| 2013/0037984 A1 | 2/2013 | Arnauts |
| 2013/0066447 A1* | 3/2013 | Baierl-Moehler ............... G05B 19/40938 700/86 |
| 2015/0153724 A1 | 6/2015 | Platt |
| 2016/0327937 A1 | 11/2016 | Erion et al. |
| 2017/0031350 A1 | 2/2017 | Dew et al. |
| 2017/0046776 A1* | 2/2017 | Ninomiya ............... G06F 30/13 |
| 2018/0107194 A1 | 4/2018 | Erion et al. |
| 2020/0130256 A1 | 4/2020 | Debora et al. |

FOREIGN PATENT DOCUMENTS

| | | |
|---|---|---|
| CN | 101142578 A | 3/2008 |
| CN | 101458732 A | 6/2009 |
| CN | 102396124 A | 3/2012 |
| CN | 102682122 A | 9/2012 |
| CN | 105303385 A | 2/2016 |
| CN | 106649988 A | 5/2017 |
| EP | 3824363 A1 | 5/2021 |
| JP | H09106417 A | 4/1997 |
| JP | 2003-141201 A | 5/2003 |
| JP | 2013136062 A | 7/2013 |
| WO | 2018/072034 A1 | 4/2018 |
| WO | 2020068942 A1 | 4/2020 |

OTHER PUBLICATIONS

Partial Supplementary European Search Report issued on Mar. 10, 2022, in connection with corresponding European Application No. 19866681.0; 17 pages.

Office Action issued on Mar. 8, 2022, in connection with corresponding Canadian Application No. 3111613; 6 pages.

Extended European Search Report issued on Jun. 9, 2022, in connection with corresponding European Application No. 19866681.0; 18 pages.

Office Action issued on Jan. 31, 2024, in corresponding Chinese Application No. 201980063850.7, 24 pages.

Office Action issued on Aug. 1, 2024, in corresponding Chinese Application No. 201980063850.7, 7 pages.

Office Action issued on Apr. 10, 2024, in corresponding Canadian Application No. 3,111,613, 6 pages.

* cited by examiner

①  -  ⑨  parts numbered in order of assembly

Assembly

Assembled

Example Unit Parameters $u_1$: type: wall
    width: $w_1$
    height: $h_1$
    depth: $d_1$
    number of doors: 2
        left door width: a
        right door width: $w_1$ - a
    adjacencies:
        right: $u_2$ (left side)

$u_2$: type: wall
    width: $w_2$
    height: $h_2$
    depth: $d_2$
    number of doors: 1
        hinge side: right
    adjacencies:
        left: $u_1$ (right side)

$u_3$: type: base
    width: $w_3$
    height: $h_3$
    depth: $d_3$
    number of doors: 2
        left door width: b
        right door width: $w_3$ - b
    adjacencies:
        right: $u_4$ (left side)
        bottom: $u_5$ (top side)

Adjacencies Graph

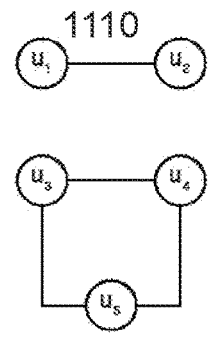

1110

Graph shows two sets of example project: right side of $u_1$ joining left side of $u_2$, right side of $u_3$ joining left side of $u_4$, and top of $u_5$ joining under sides of $u_3$ and $u_4$. Adjacencies identify instances of edge type $e_4$ of Figure 6

Fig. 11 B

Illustration of
Assembled Unit

Joint Type $j_1$

Part A

Part B (a) part A material thickness
(b) part B material thickness
(c) notch depth
(d) b - c
(e) notch length
(f) joint length Joint Type j₂

Part A

Part B (a) part A material thickness
(b) part B material thickness
(c) joint length Joint Type $j_4$ Part A Part B (1) threaded insert nut
(2) CNC drilled hole for rapid hardware installation
(3) CNC drilled hole for precise screw location Joint Type j₅

Assembly

Assembled

Example Panel with Edge Types $e_3$ and Joint Types $j_5$

Side A

Side B

See Figure 6 for Edge Type e3. See Figure 22 for Joint Type $j_5$.

Interior Design Product Example: Picture Frame

Designed Corner (Point Objects) and Sides (Edge Objects)

Assembled Units (1) angle may vary and may be computed from customer defined inputs with software
(2) Round Tube: lengths of Round Tubes may vary and may be computed from customer defined inputs with software
(3) Flat Plate
(4) Mechanical Fastener
(5) where structurally required, seam between two components may be welded manually or with a robotic welding machine Section Through Corner Connection of Structural Unit (1) Round Tube
(2) Flat Plate
(3) Mechanical Fastener
(4) Flat Plate tenon with matching mortise in Round Tube for structural rigidity and accurate assembly, and where structurally required, seam between two components may be welded manually or with a robotic welding machine Connection between Two Structural Units (1) angle between planes of two planar units may vary and may be calculated from customer defined inputs with software
(2) connection between two Structural Units (See Fig. 25 F for more detail)
(3) Structural Unit Section Through Connection of Two Structural Units (1) angle may vary and is calculated from customer defined inputs
(2) Round Tube
(3) Mechanical Fastener
(4) center axis of Round Tube
(5) center axis of holes for Mechanical Fastener (intersects and is perpendicular to center axis of each tube)

(1) Sheathing Unit
(2) Set of Structural Units may connect to Sheathing Units (see Fig. 25 L and Fig. 25 M for example) and perform as a structural system Set of Formwork Units The term "Set of Formwork Units" in Fig. 25 refers to an ordered set of connected Formwork Units (See Fig. 25 J).

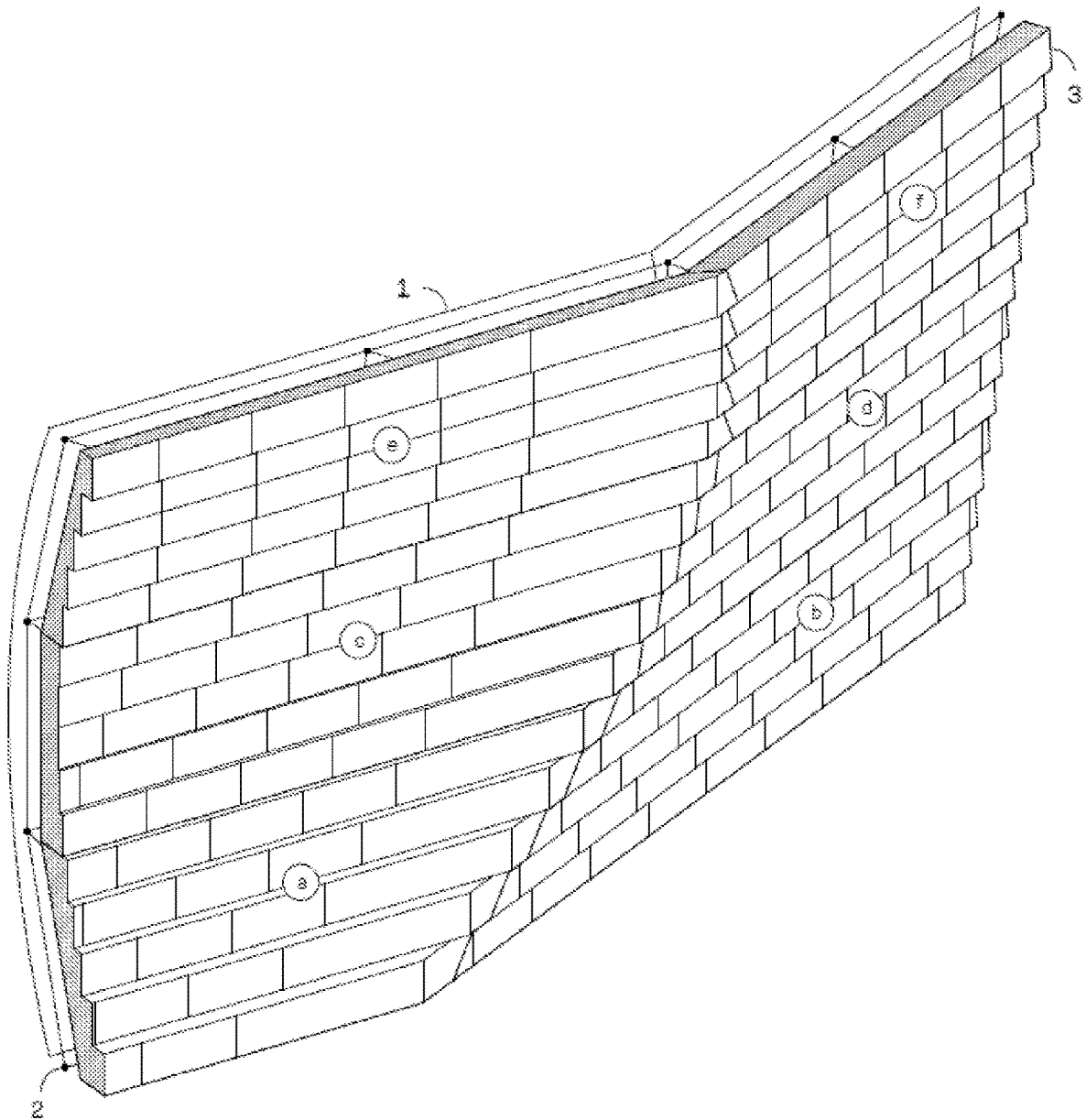

(1) Sheathing Units may perform as a temporary or permanent formwork component for concrete construction
(2) Set of Structural Units may connect to Formwork Units and/or Sheathing Units (See Fig. 25 L and Fig. 25 M for example) and perform as a structural system and/or permanent formwork support for in situ or prefabricated concrete construction
(3) Set of Formwork Units

Fig. 25 I

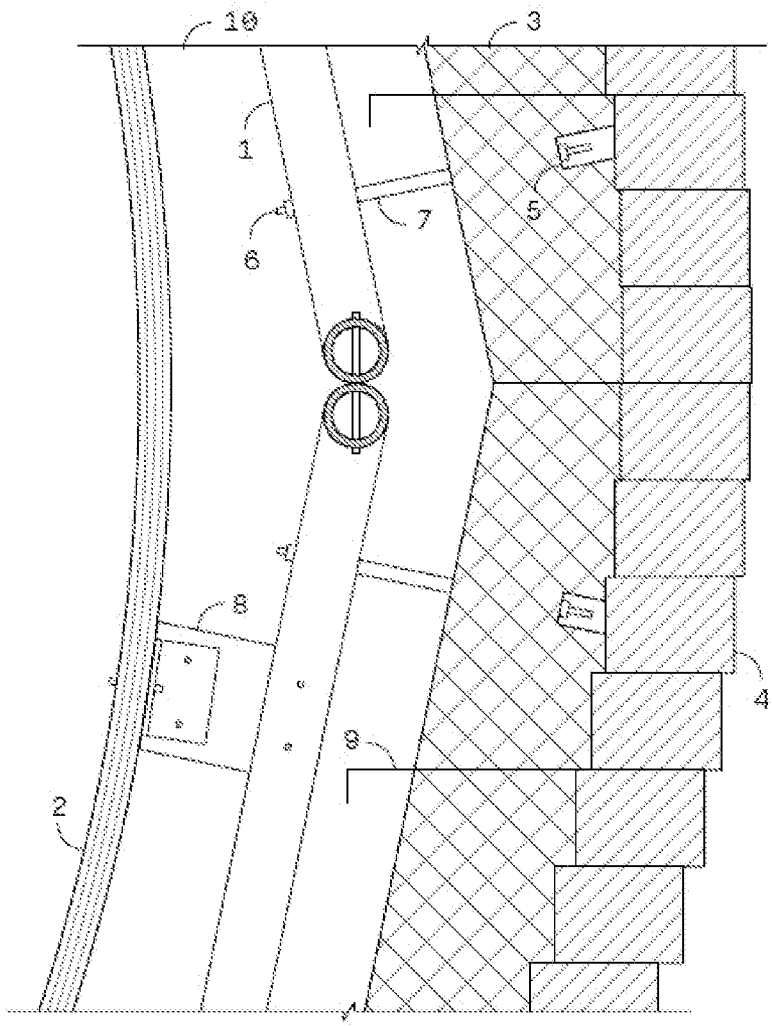

(1) Set of Structural Units: In this example Round Tubes, Flat Plates and Mechanical Fasteners are steel
(2) Sheathing Unit or Set of Sheathing Units
(3) Set of Formwork Units may perform as building insulation and/or air barrier
(4) masonry units (See Fig. 25 J and Fig. 25 K)
(5) notch in one side of Formwork Unit with one side of notch parallel with opposite side of Formwork Unit
(6) Mechanical Fastener
(7) spacer (may be standard size) between Round Tube and one side of Formwork Unit (as shown) or Sheathing Unit
(8) connector between Round Tube and Sheathing Unit (as shown) or Formwork Unit (See Fig. 25 M)
(9) masonry tie (may be standard shape and size) connected to Formwork Unit (using installation reference markings and cuts in the Formwork Unit) prior to pouring of concrete
(10) cavity between Sheathing Units and Formwork Units may be open or filled with other building elements (such as building insulation or concrete)

Fig. 25 L

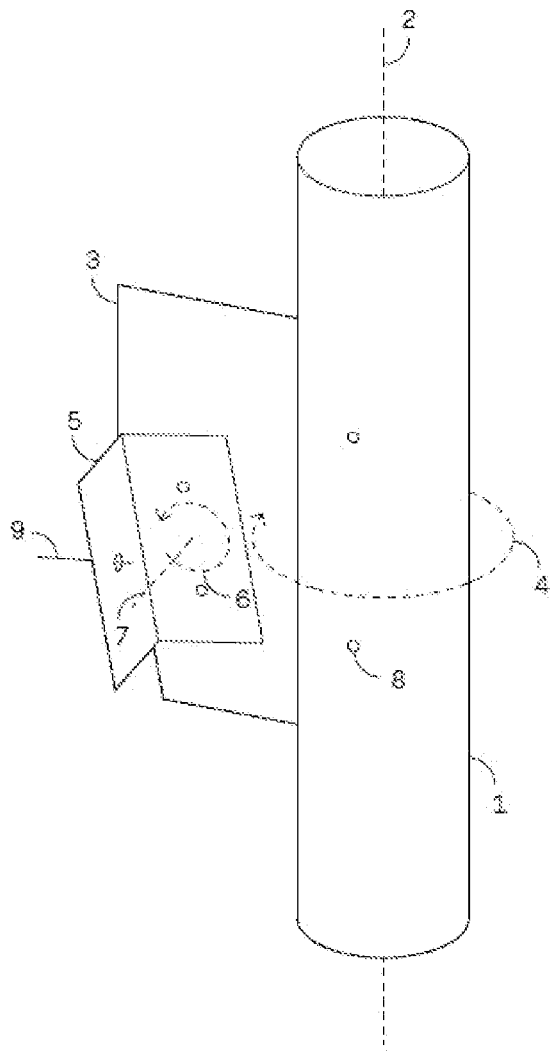

(1) Round Tube
(2) center axis of Round Tube
(3) Flat Plate: the intersection of the plane of the Flat Plate and the center axis of the Round Tube is a line
(4) 360 degree rotational degree of freedom of Flat Plate around center axis of Round Tube
(5) L-shaped angle formed at 90 degrees (may be standard size) and with Mechanical Fastener holes for connecting to Flat Plate and the second part
(6) 360 degree rotational degree of freedom of L-shaped angle around an axis perpendicular to plane of Flat Plate
(7) axis perpendicular to Flat Plate and one leg of L-shaped angle
(8) Mechanical Fastener
(9) Mechanical Fastener: center of axis parallel with the normal direction of the surface of the second part at the point of connection

Fig. 25 M

Alternate Embodiment of Joint Type $j_3$

Key (a) part A material thickness (b) part B material thickness (c) tab length (d) tab end width (e) tab base width (f) notch depth (g) groove width (h) notch width

2802

2804

2806

2808

2810

2812

- LINEAR KITCHEN W/ ISLAND -

- L-SHAPED KITCHEN -

- L-SHAPED KITCHEN W/ ISLAND -

- U-SHAPED KITCHEN -

(a) Window Zone - bottom height  
(b) Window Zone - height  
(c) Work Area - height  
(d) Base Cabinet - height  
(e) Window Zone - center  
(f) Window Zone - width  
(x) Kitchen - width  
(z) Kitchen - height (1) Window  
(2) Window Zone  
(3) Refrigerator  
(4) Wall Cabinet - 2 doors  
(5) Wall Cabinet - 1 door  
(6) Base Cabinet - 3 drawers  
(7) Base Cabinet - sink & 2 doors  
(8) Base Cabinet - 1 drawer & 1 door

AUTOMATED MANUFACTURING ARCHITECTURAL MILLWORK

BACKGROUND

There are currently two basic market solutions for the production of architectural millwork. These primarily include manufacturing units of pre-determined sizes or the production of custom units with less automated methods. While the first method may be more affordable, the realities of construction often require, at a minimum, a combination of both methods when units of fixed dimensions do not fit within the overall dimensions of the installation site, resulting in design and coordination costs that are additional to the purchase and basic installation of the units themselves. Designing solutions for complex object and space problems, such as the design and coordination of custom architectural millwork in a space, may involve the use of drafting and modeling software. Current software solutions may require considerable drafting expertise and familiarity with the design problem. The time and skill required to generate initial valid solutions for consideration with current technologies may be a significant barrier for access to custom architectural millwork products. The design and production of custom units without automated methods may be less affordable than automated methods, but may be of a higher quality. Therefore, it would be desirable to develop an automated design and manufacturing process for creating high quality, made-to-order architectural millwork with customizable dimensions and reasonable costs.

SUMMARY

A system and method for making made-to-order architectural millwork of custom dimensions; including the design of wood joints and a system for deploying them within the overall structural design of individual architectural millwork units, as well as methods for online design (including automated design aids) and ordering, automated writing of machine code, robotic part preparation, and simplified on-site installation. With the automation and generation of digital code for manufacturing custom architectural components, this method makes the formation of distributed manufacturing centers possible. Through this method and with minimum re-tooling and/or training, these centers are able to produce custom millwork more efficiently and effectively than traditional custom millwork woodshops.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
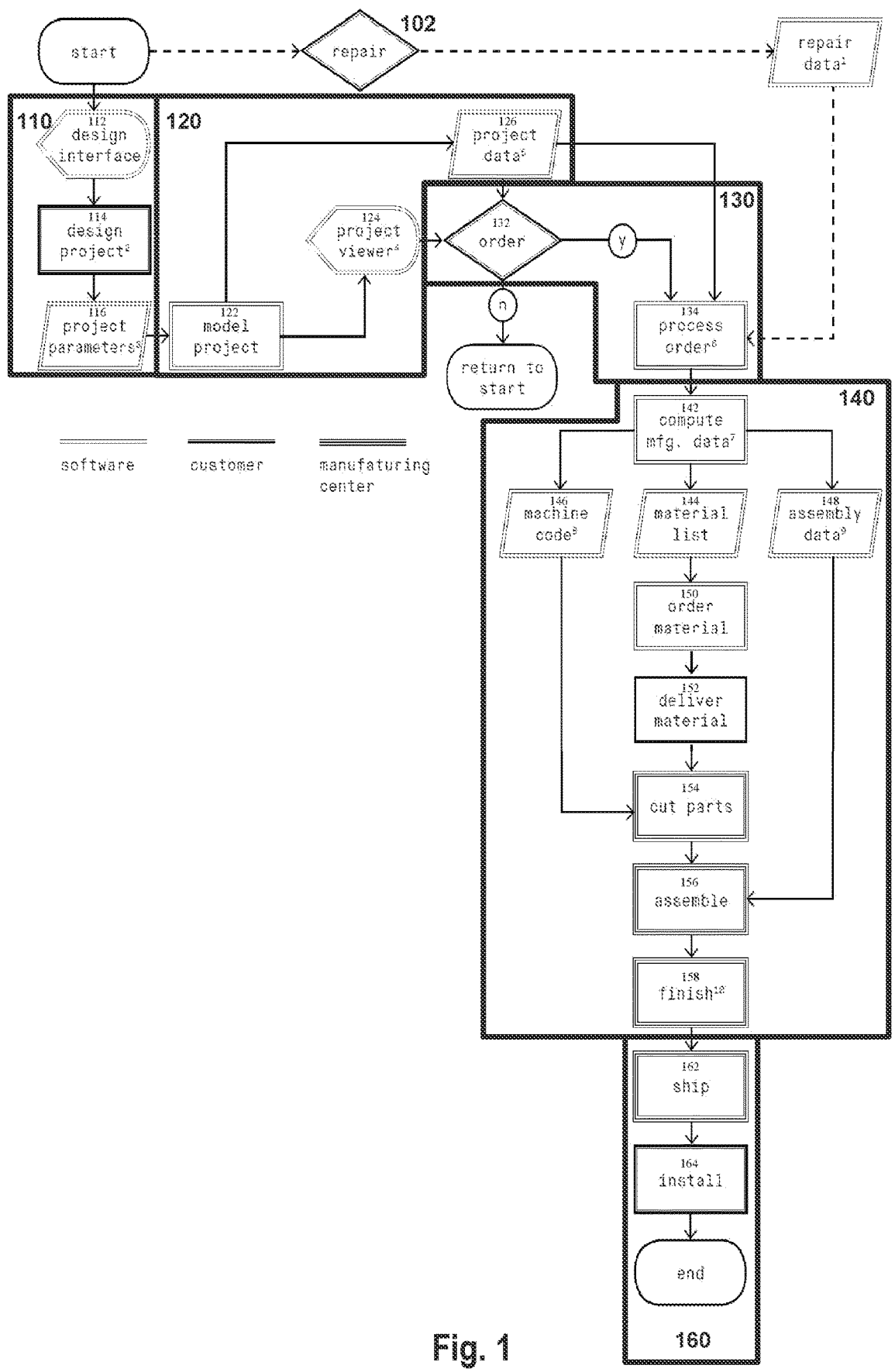
FIG. 1 shows an exemplary diagram of process for making made-to-order architectural millwork of custom dimensions.
Figure 2:
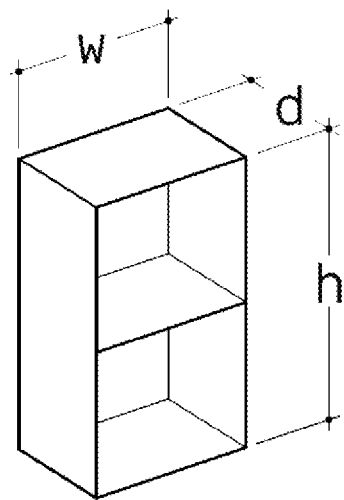
FIG. 2 shows an exemplary embodiment of a unit in the process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring to the Figures generally, a system and a method of an automated manufacturing architectural millwork may be described. According to an exemplary embodiment, such a system and method may produce higher quality architectural millwork with greater storage space and custom dimensions at a competitive price. Increased structural integrity of the product may be achieved with the design of wood joints and a system for deploying them within architectural millwork units. Millwork units with custom dimensions may be efficiently created through the process of automatically computing machine code for robotic part preparation. As a result, custom architectural products may be produced with efficiencies similar to mass production of units of standard shapes and sizes. The manufacturing may be distributed into a network of regional centers (potentially in coordination or in partnership with existing third-party shops); realizing efficiencies in transportation costs and allowing the company to scale and adapt to changes in market demand more easily than centralized manufacturing centers. Also, the ability to fully automate custom part fabrication from custom design parameters, may create greater efficiencies through the creation and practical application of automated online customer-driven design tools.

According to an exemplary embodiment, a manufacturing process may be automated creating high quality, made-to-order architectural millwork with customizable dimensions. Such a process may be applicable to millwork constructions including but not limited to cabinets, shelves, free-standing closets, credenzas, storage boxes, and vanities as desired. In comparison to conventional industry mass production methods, the automated manufacturing process may have a number of benefits. For example, it may eliminate manual cutting and measuring during the creation of dimensionally variable millwork and it may enable the integration of efficient customer-driven design and installation techniques.

In addition, the product may have structural benefits in comparison to conventional solutions. Reproducing proposed designs for connecting parts may be time consuming, require highly-skilled carpentry and may be cost prohibitive with conventional made-to-order methods. The design of these connections as well as the methods for integrating them into a mass production process with machine precision may provide for a product of greater strength (more durable) while using less material (more storage space).

Turning now to exemplary FIGS. 1, 2, 3, 4 and 5, FIG. 1 may show an exemplary diagram of a process 100 for making made-to-order architectural millwork of custom dimensions. According to an exemplary embodiment, the process may include five major phases: design 110, review 120, ordering 130, manufacturing 140 and installation 160. In an exemplary embodiment, the development of a millwork product may begin as a customer-initiated project and ends with the delivery of a coordinated set of custom millwork units for installation. Also, in an exemplary embodiment, the process may provide a web-based interface, and it may allow the customer to drive the design process, and software may generate data and documentation for ordering, manufacturing, shipping and installing the millwork product. Such a process may provide opportunities to reduce overall labor, time, error and costs in comparison to conventional practice.

The process 100 may start with an option to either begin the design phase 110 or repair interface 102. The design interface 112 may present an intuitive user interface. The user may then design the project 114 using the user interface which may supply the user with design aids. In a next exemplary step, the user may enter project parameters 116 (see FIG. 11 for an example of project parameters), such as desired dimensions.

Next, the review phase 120 may begin. In a first exemplary step of the review phase 120, the software may model the user's project 122. Then, the project may be viewed 124. The customer may view the project as a web-based 2D and/or 3D representation. Further embodiments may allow the customer to view virtual reality and augmented reality formats. Some customers may be wary of how a piece of furniture looks on the internet and may instead seek to view the product in person. Virtual reality and augmented reality may allow a customer to view the project as if it is in their room or right in front of them. The customer may view the project in its entirety, including all sets and units, as well as each unit individually within one frame. By isolating the sets or units, the software may facilitate the use of design aids for adjusting parameters such as dimensions and alignments. The customer may then download the custom digital models of the project as computer-aided design (CAD) files in 2D and 3D formats. This may facilitate the coordination of larger projects which the units or sets may be integrated with. In a further exemplary embodiment, scaled 3D models may be downloaded in a format for 3D printing. In another exemplary step of the review phase 120, the customer may view project data 126. Project data may include information for final review and approval before ordering, such as descriptions of each unit and project costs.

In a next exemplary phase, the product may be ordered 132 to begin the ordering phase 130. Once the customer places an order 132, the software may process the order 134. In processing the order 134, the software may save the order to an online account and may also generate assembly data, installation data, order shipping data, order tracking data, drawings, models, and instructions for reference to facilitate with the assembly 156 and installation 160.

After the ordering phase 132 has been completed, the manufacturing phase 140 may begin. In a first exemplary step of the manufacturing phase 140, the manufacturing data may be computed 142. The manufacturing data may be further illustrated in FIG. 18. The manufacturing data may produce the material list 144, generate the machine code for directing the cutting, routing, etching, milling, sawing, bending, forming, welding, pinning, gluing, taping, sanding, painting, finishing, holding, conveying, picking and/or placing machine operations (such as for a CNC machine) 146, may provide assembly data 148, and may provide data to facilitate the installation process. Exemplary assembly data may include data for tracking parts, orienting parts, assembling parts in order, picking parts, holding parts, conveying parts, joining parts, cataloging unit hardware, identifying unit hardware locations, installing unit hardware, picking units, holding units, conveying units, finishing units, packaging units, and cataloging unit adjacencies. Examples of data used to facilitate the installation process may include data for identifying unit locations within an overall designed space (such as a kitchen where the physical units are compared to visualizations of units of automatically generated physical drawings or automatically generated drawings and models visualized on a personal computer or augment reality device), identifying peripherals of a unit that may require separate packaging and on-site assembly, and providing on-site installation instructions (such as unit installation sequence). The assembly data may be delivered to the manufacturing center through various methods as static or interactive text, drawings and modeled illustrations.

Exemplary visualization formats may include automatically generated labels for part identification, orientation, assembly order, and part adjacency indices. These labels may be automatically printed and temporarily adhered to parts manually or automatically with a robotic apparatus. More complex data and instructions may be delivered to the manufacturing center as programs for augmented reality devices or any other type of graphical user interface. Augmented reality models (or models viewed on other computing devices such as a personal computer or mobile device) and visualizations may provide access to assembly data, and may provide the manufacturer with the information needed to complete the task within a single program designed for the assembly of a unit or units. This may allow the company to create programs that automatically design and deliver a model for a custom unit to the manufacturer irrespective of the manufacturer's level of experience assembling like units. Some manufacturers may use the model to access a limited amount of information, while other manufacturers may use the same model to access more information, thus increasing their confidence in the ways in which they are assembling the units. The training manual for all levels of experience may be imbedded in the assembly data for any given unit. This may minimize errors in the assembly process as new manufactures become familiar with the manufacturing process.

Assembly data may also be delivered electronically to programmable apparatuses at the manufacturing center to assist in the shaping, assembly, convey, sorting, and shipping of parts and units, such as carts with electronic displays. Identifying, sorting, and tracking parts may be a considerable challenge with custom units, where every part of a project order is unique. Programs may be created for the carts, where the display panels may be associated with slots or containers of the carts, and may indicate locations for placing parts with unique identification markings corresponding to markings on the display panels of the carts. When parts are removed from the holding apparatus of a CNC machine or assembly station, they may be quickly placed in containers or slots of the carts. The program may direct the positions of each part in the cart so that they may be quickly and sequentially picked from the cart to be placed in another CNC machine holding apparatus or assembled in order. For example, a cart may contain parts for two units of a project.

The parts in the cart could be arranged so that the manufacturer may quickly pick from the cart parts for the first unit in the order by which they are assembled, followed by parts of the second unit in the order by which they are assembled. The cart can then be re-programmed for parts of other units or for sorting and delivering assembled units to another manufacturing station, such as a finishing station. The software may then use the material list to order the material for the project 150, as previously calculated 142. An example of material used in the process is stock material pre-processed to industry standard sizes, such as sheets of wood, boards of wood, sheets of foam, sheets of metal, sheets of plastic, sheets of glass, pipes, tubes, and other metal and plastic extrusions.

In a next step, the material may be delivered from the supplier to the shaping location 152. At the shaping location, the material may be shaped 154, for example, using a CNC machine or by other means. Examples of part shaping may include cutting, routing, milling, forming, bending, and sawing. After shaping, the shaped material may then be assembled 156. The shaped material may then be finished 158, such as by sanding, staining, and painting the assembled units. The material may be finished before shaping, after shaping, or not finished at all.

The final phase may be the installation phase 160. The product may be shipped from the cutting and assembly location to the install location 162. Alternatively, the product may be stored at a regional manufacturing center or at another storage center for convenient pick-up. In a final step, the customer may install the units 164.

Figure 3:
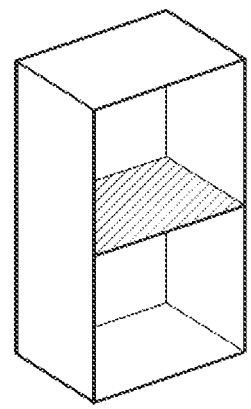
FIG. 3 shows an exemplary embodiment of a unit with shelf in the process.
Figure 4:
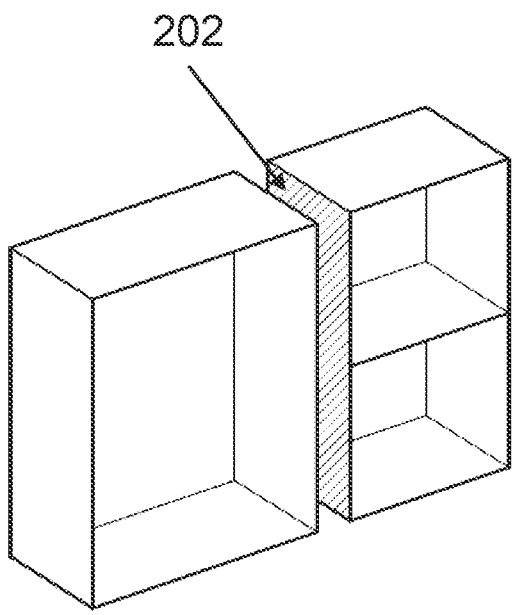
FIG. 4 shows an exemplary embodiment of a set in the process.

Referring now to FIGS. 2, 3, 4 and 5, FIG. 2 may show an exemplary embodiment of a unit in the design process. The 'w', 'd', and 'h' denoted in FIG. 2 may represent the width, depth, and height of the desired object. A customer may enter parameters to specify the width, depth, and height, or a set of recommended specifications may be used. In exemplary FIG. 3, an exemplary embodiment of a unit with a shelf selected in the design process may be shown. In addition to the global parameters shown in FIG. 2, each unit may have internal parameters for adding shelves, drawers, doors, etc. Referring now to FIG. 3, the shelf may be selected, moved, or removed. Further, the shelf may be copied, and an additional identical shelf may be placed on the design. FIG. 4 may show an exemplary embodiment of a set in the design process. The set in FIG. 4 may be aligned such that they are of equal heights and depths. If the units are configured to be combined as an interconnected set, the interior walls 202 may be unfinished and may be fitted with a joint or other means for connecting the two walls.

Figure 5:
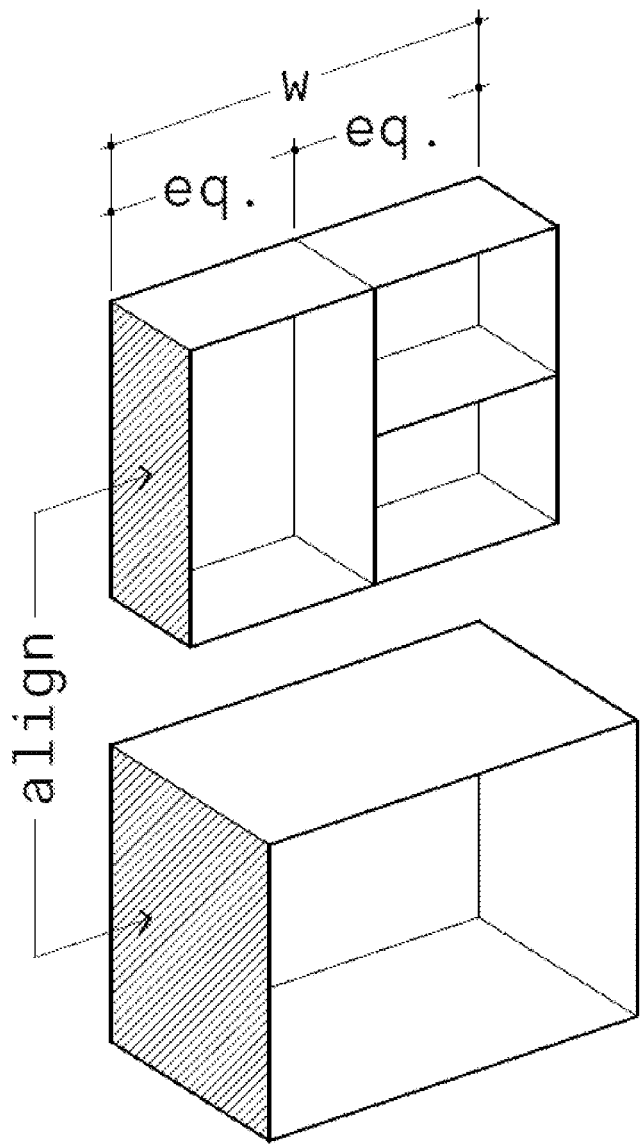
FIG. 5 shows an exemplary embodiment of design aids in the process.

According to an exemplary embodiment, the process may begin with the design phase, which may include customer-driven design using pre-programmed elements. In an exemplary embodiment, the customer may initiate a project which is defined as unit(s) and/or set(s) of units (shown in FIG. 11A) rendered in a web based three-dimensional graphical user interface. FIG. 5 may show an exemplary embodiment of design aids in the design process. Each unit may be added to a web based three-dimensional model at a default set-out position, a customer defined set of coordinates (x, y, z) relative to an origin or object already positioned in the model, or by associating one side of the added unit to a selected side of a unit already positioned in the model, forming a set as shown in FIG. 4 and FIG. 5. According to an exemplary embodiment, the forming of sets may allow the software to catalog adjoining units. There is no limit to how many adjoining units exist in a single set. This information may be used to generate custom documentation and connections that simplify the installation process.

According to an exemplary embodiment, other design aid features of the graphical user interface may include functions for aligning and setting units of equal sizes as shown in FIG. 5. In an exemplary embodiment, the aligning function may facilitate the alignment of two or more sides with parallel planes by identifying a target plane. For each manipulated unit, the function may compute a value that either increases or decreases its overall dimension that is perpendicular to the target plane. Also, in an exemplary embodiment, another function may re-compute vector parameters of equal value for selected units, such that the directions of the parameters are parallel, and their sum value is client defined.

According to an exemplary embodiment, at the conclusion of the design phase, the review phase may begin. The system may compute and render two-dimensional and three-dimensional computer-generated visualizations, a list of project parameters (such as types of units, dimensions, numbers of doors/drawers/shelves), and the project cost. Optionally, the customer may download these representations as files readable by computer aided design software for integration into the design of larger projects requiring greater coordination. The parameters of projects may be saved as closed proprietary specifications for builders. If the customer accepts, the order processing phase may begin. In an exemplary embodiment, order processing may be executed by software that takes the design parameters for each unit as inputs and outputs lists of machine instructions for the automated cutting of parts in preparation for the manufacturing phase. The machine instructions may include details such as the height and width of each piece, the number of pieces, and the shapes of each piece. The pieces may be cut into rectangular shapes. The edges of the pieces may be cut to form a protuberance or aperture to join such that the edge of one piece may join with the edge of another.

Figure 6:
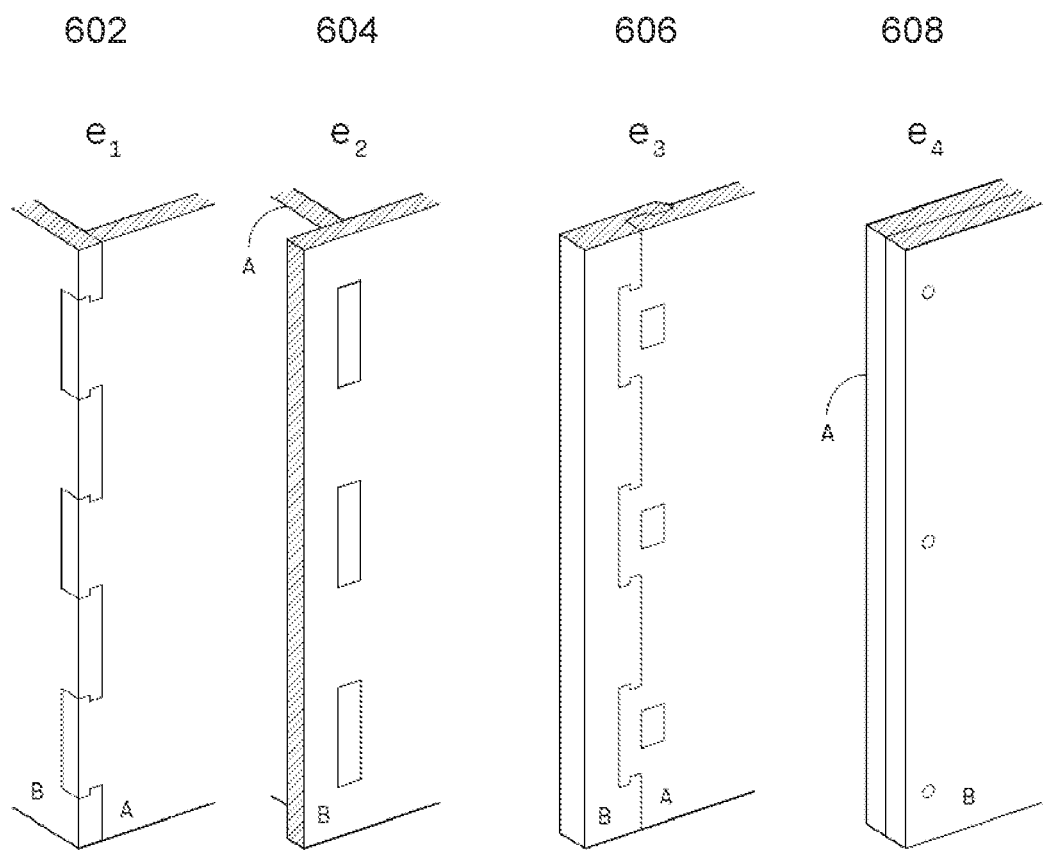
FIG. 6 shows exemplary edge types in the process.
Figure 7:
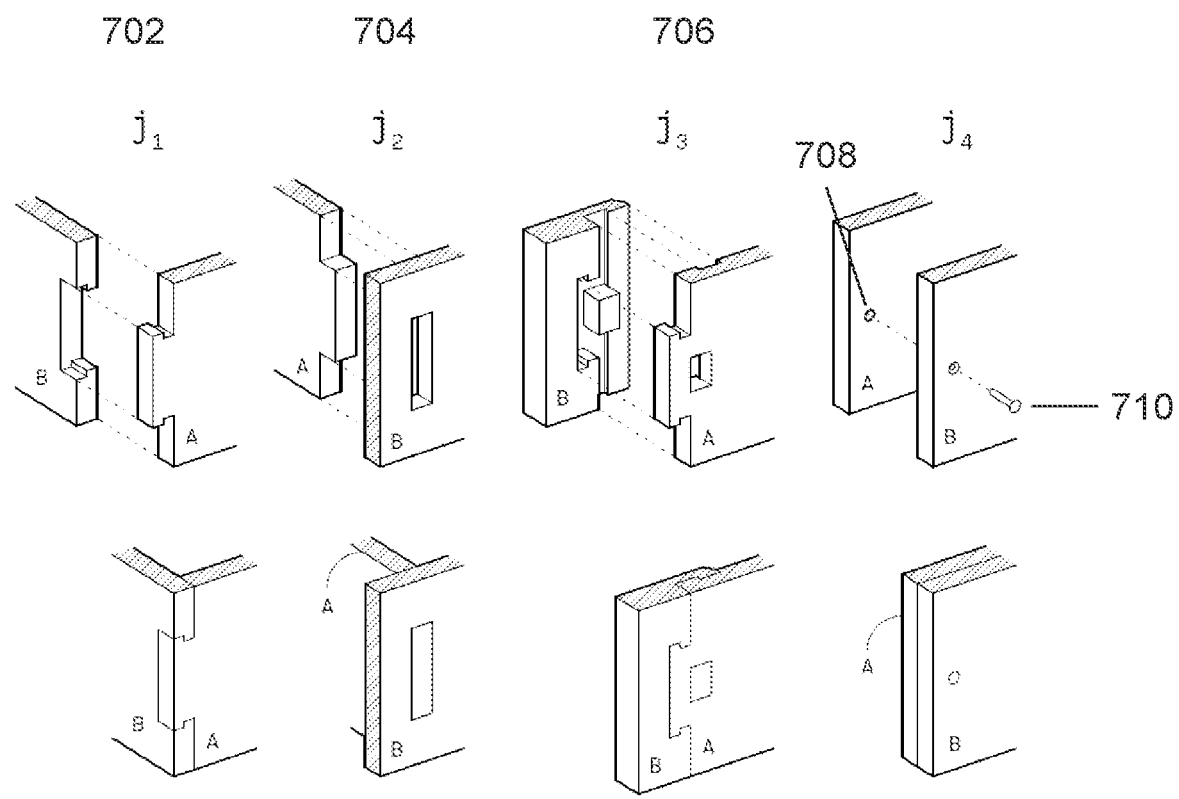
FIG. 7 shows exemplary joint types in the process.

Referring now to exemplary FIGS. 6 and 7, different exemplary joint types and edges may be shown. Each unit may be a programmed set of surfaces and edge types. As shown FIGS. 6 and 7, each edge type may be a set of joints. Any type of joint or combination of types of joints may be contemplated. FIG. 6 may illustrate the application of various joints mortise and hammer-headed tenon joints 602, mortise and tenon joints 604, splice joints 606, and mechanical fasteners 608. One or more mortise and hammer-headed tenon joints 602 may be used to join the edges or corners of two pieces at a 90° angle. One or more mortise and tenon joints 604 may join the edge or corner of one piece to an interior portion of another piece. One or more splice joints 606 may join the corner or edge of one piece to the corner or edge of another piece such that the two pieces run along the same plane to form one flat piece. Additionally, one or more of mechanical fasteners may join two pieces which may be stacked on top of or next to each other such that their surfaces are parallel and connected.

FIG. 7 may show various methods for joining two planar parts of wood. A ninety-degree corner 702 may be formed using a process similar to dovetail joinery where the edges of the two parts interlock. A T-shaped connection where the edge of one piece connects with a center or interior portion of another piece 704 may be formed by creating an aperture in the interior portion of one piece and a correspondingly sized protuberance on the edge of another piece. Further, a splice joint 706 may connect two planar parts of wood of different thicknesses such that they run along the same plane in the same direction, with one piece extending out from the end of the other piece. Additionally, FIG. 7 may also show a method of joining two planar and parallel pieces where one part may have an embedded insert nut 708 and may connect to another part which has a screw 710 which engages the nut 708. Various other types of joints may be implemented into the pieces, such as dovetail or tongue and groove joints.

The number of joints and the spacing between each joint (shown in FIG. 21) may be formulaically calculated from parameters defined in the design phase. Software may compute machine code for all joints and parts required to construct each unit from flat sheets and/or boards of non-metal material (such as plywood and solid hardwood). Parts may be algorithmically arranged in a two-dimensional plane with x and y lengths equivalent to sizes of physical material to be machine cut (This function may be called nesting). Software may then output machine readable digital files for a computer numerical control (CNC) routing machine, as shown in FIG. 8.

Figure 8:
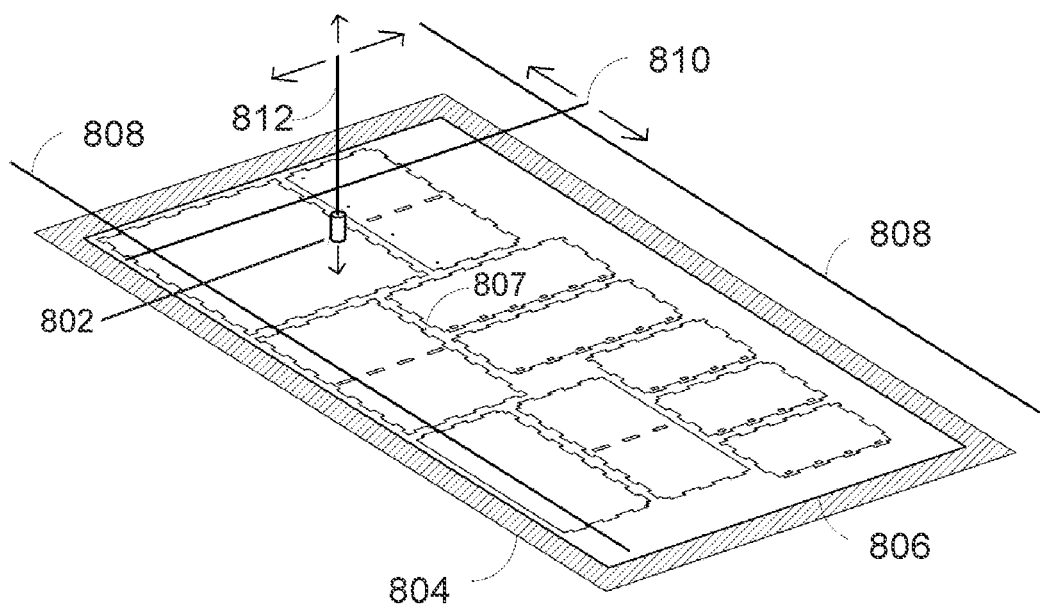
FIG. 8 shows an exemplary CNC Machine in the process.
Figure 25:
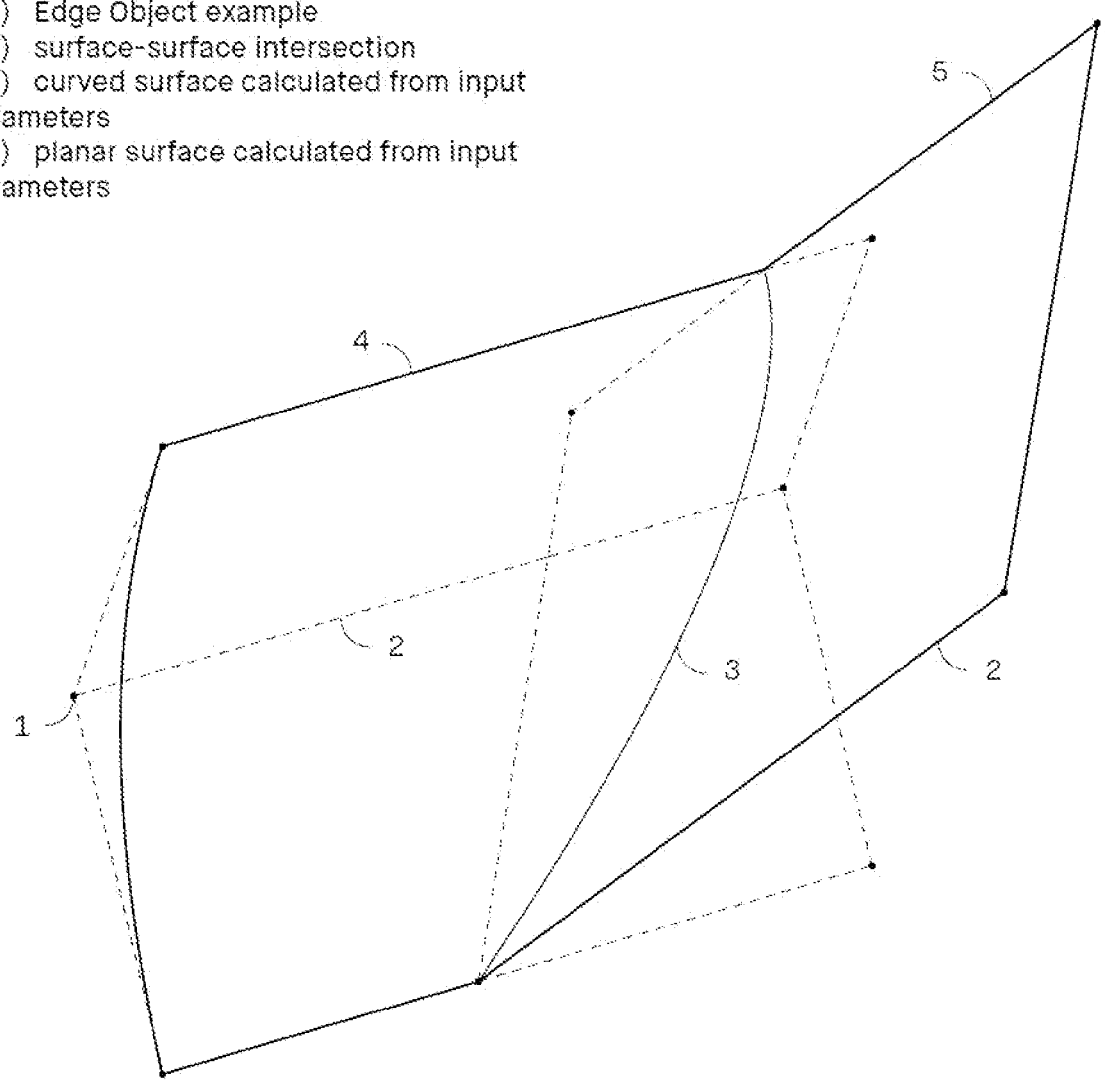
FIG. 25A shows an exemplary building system product.
FIG. 25B shows an exemplary building system product.
FIG. 25C shows an exemplary building system product.
FIG. 25D shows an exemplary building system product.
FIG. 25E shows an exemplary building system product.
FIG. 25F shows an exemplary building system product.
FIG. 25G shows an exemplary building system product.
FIG. 25H shows an exemplary building system product.
FIG. 25I shows an exemplary building system product.
FIG. 25J shows an exemplary building system product.
FIG. 25K shows an exemplary building system product.
FIG. 25L shows an exemplary building system product.
FIG. 25M shows an exemplary building system product.
Figure 25:
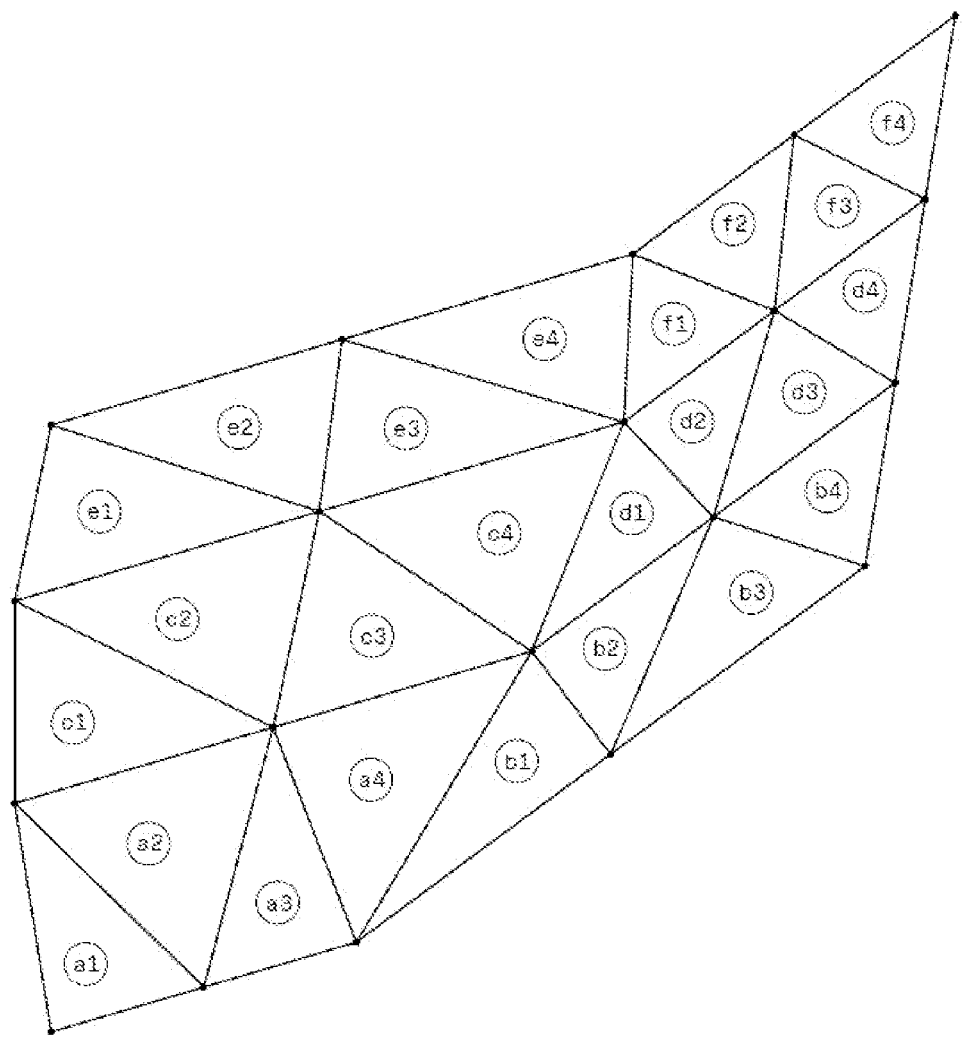
Figure 25:
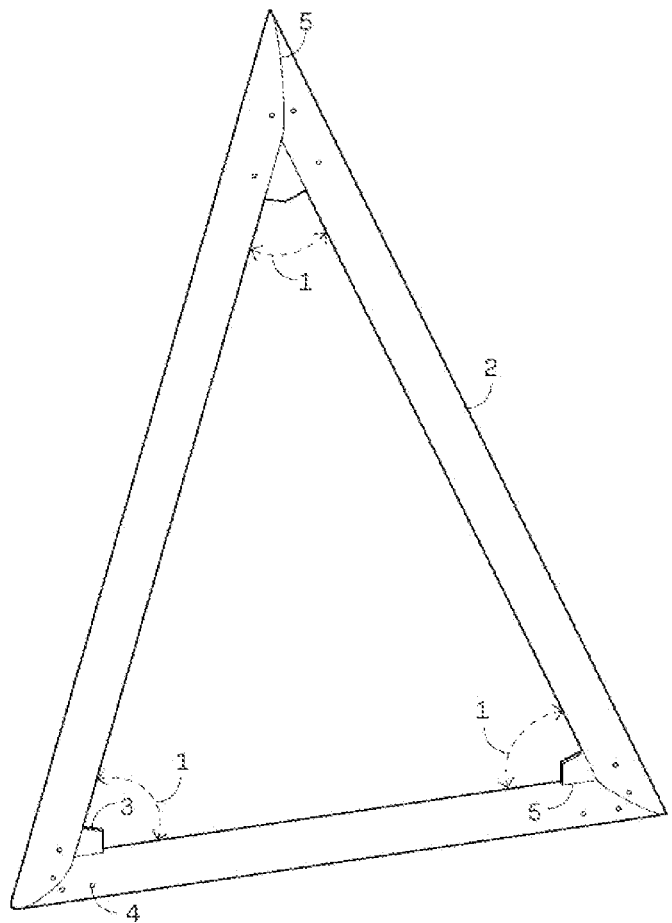
Figure 25:
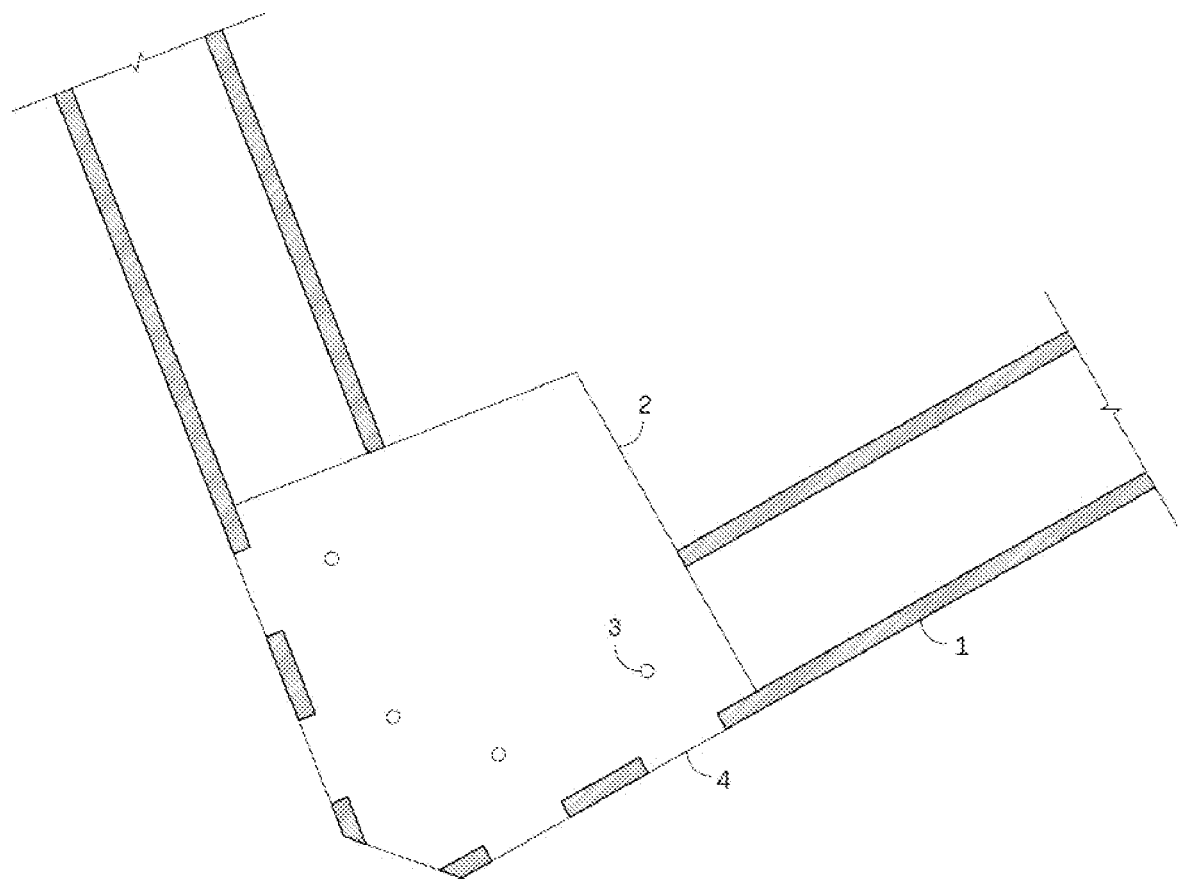
Figure 25:
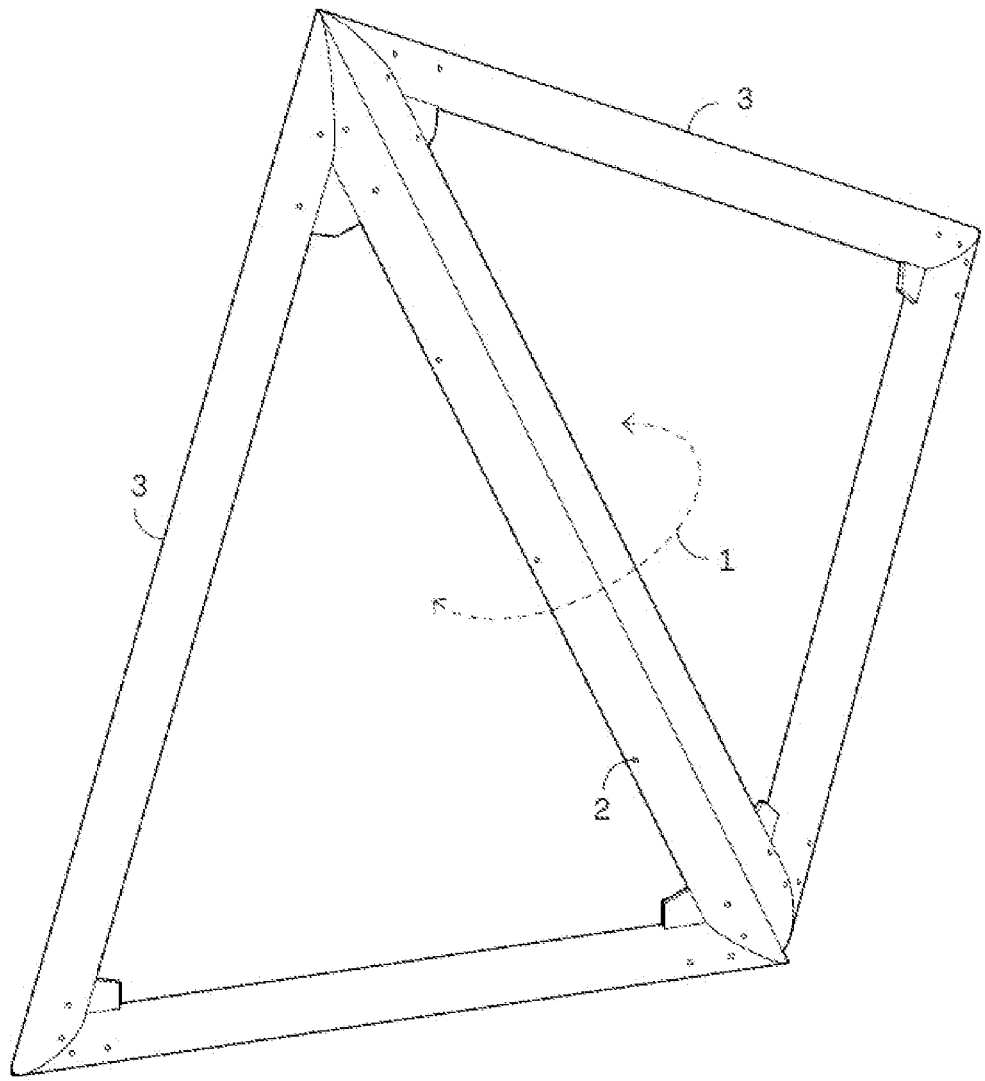
Figure 25:
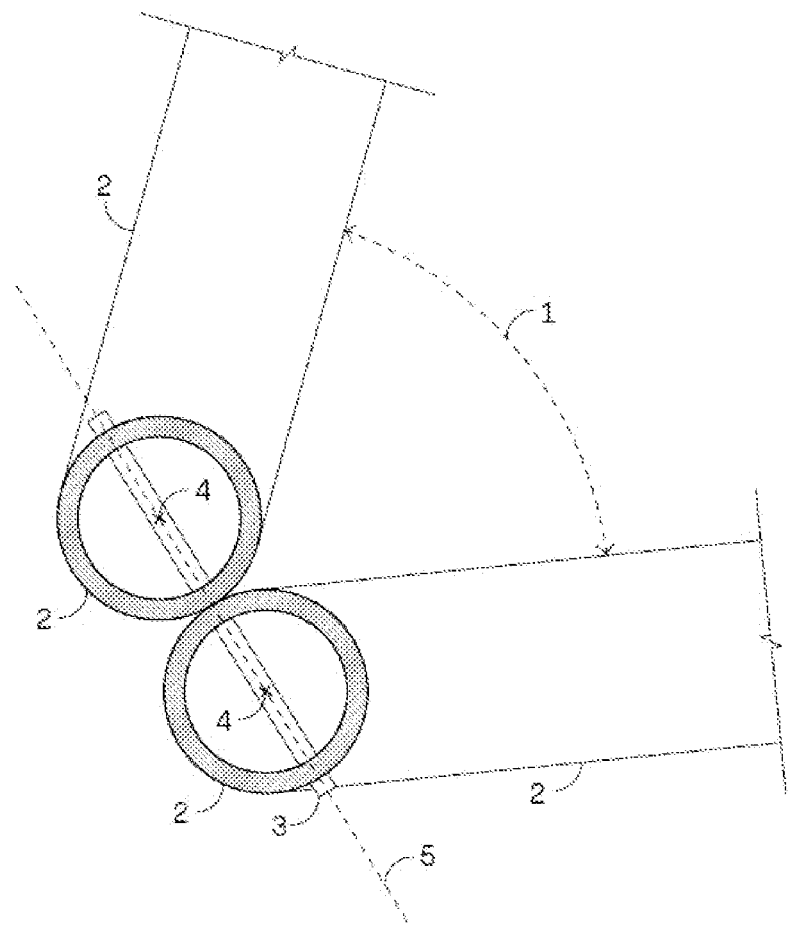
Figure 25:
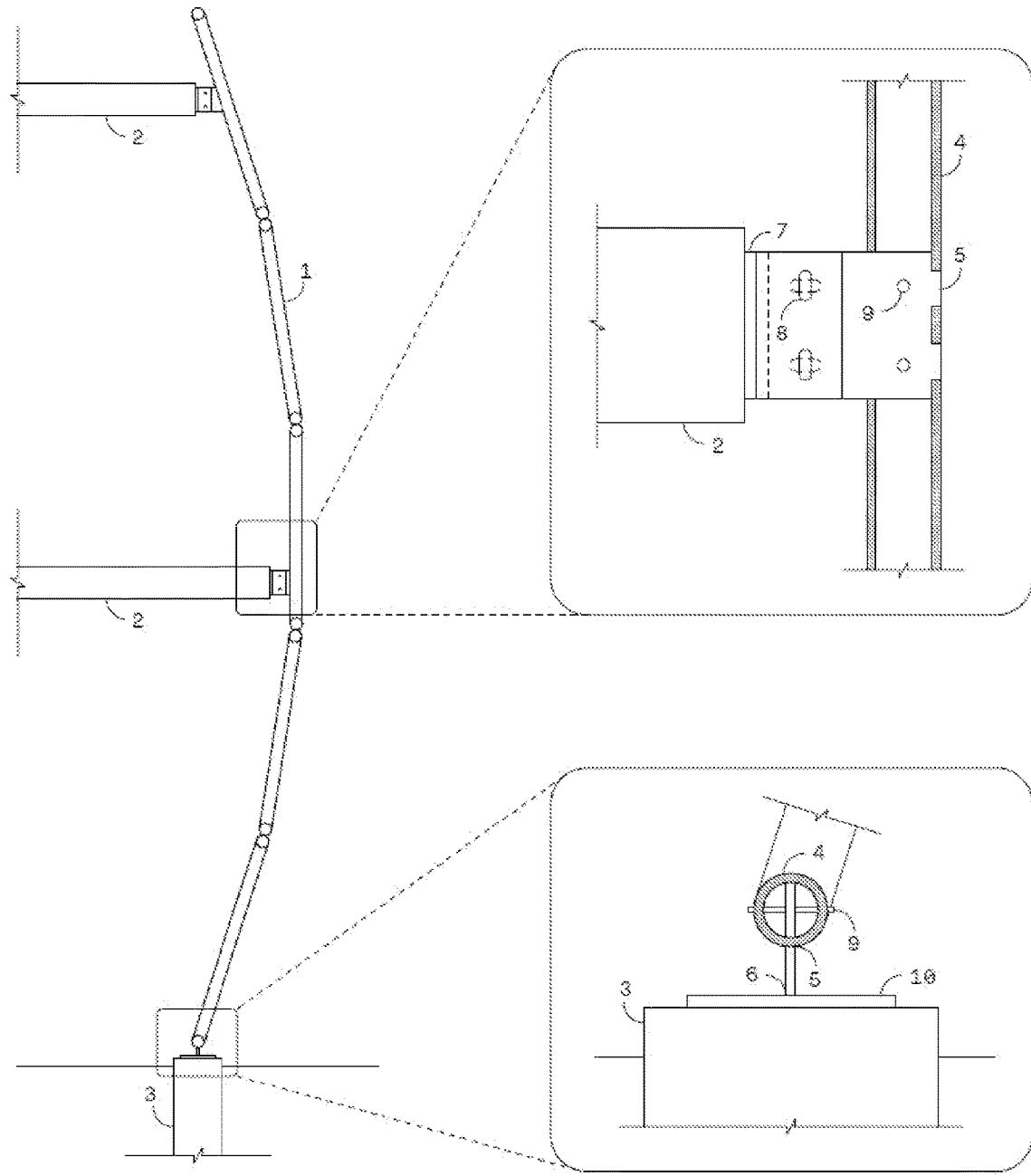
Figure 25:
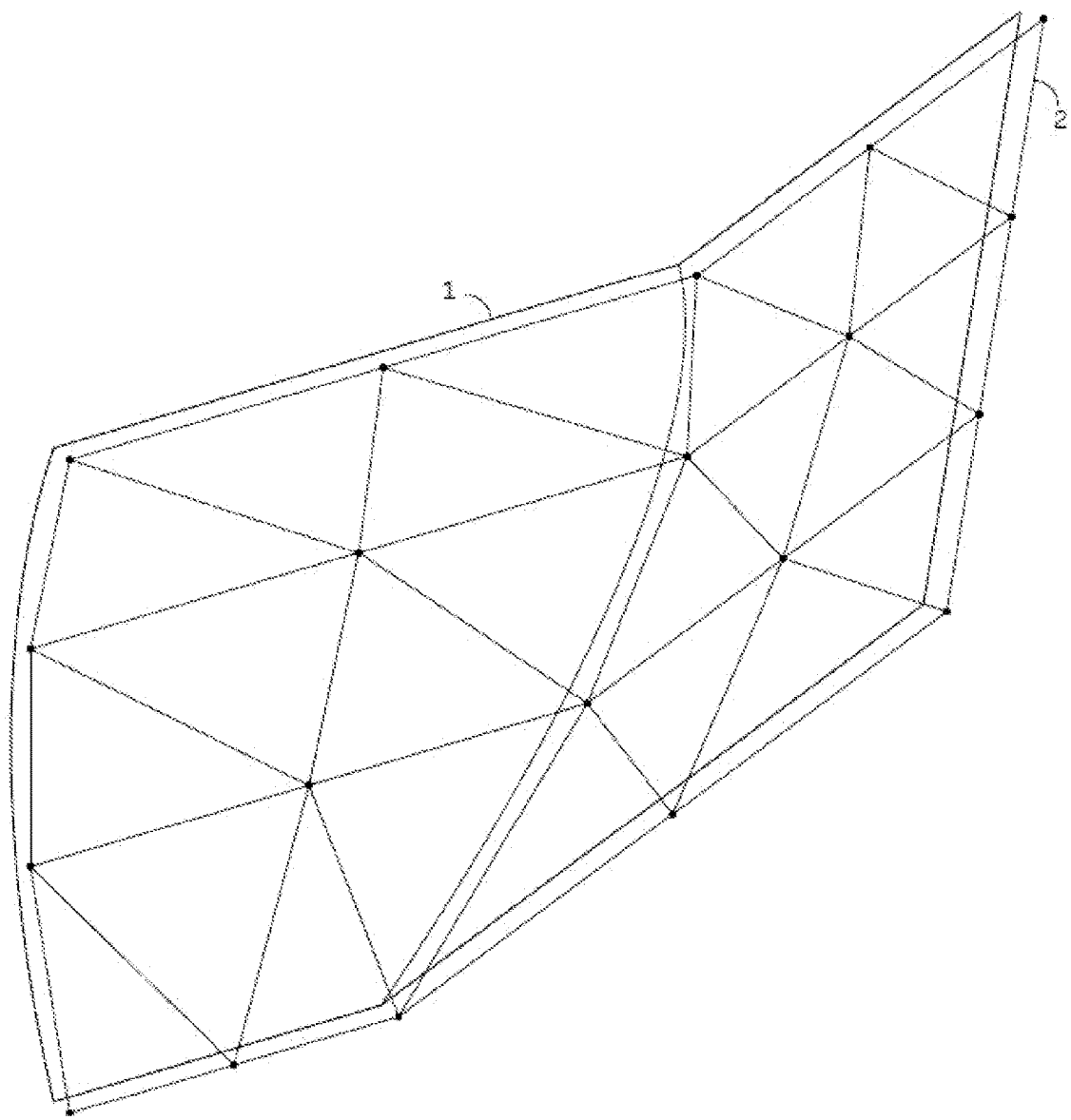
Figure 25:
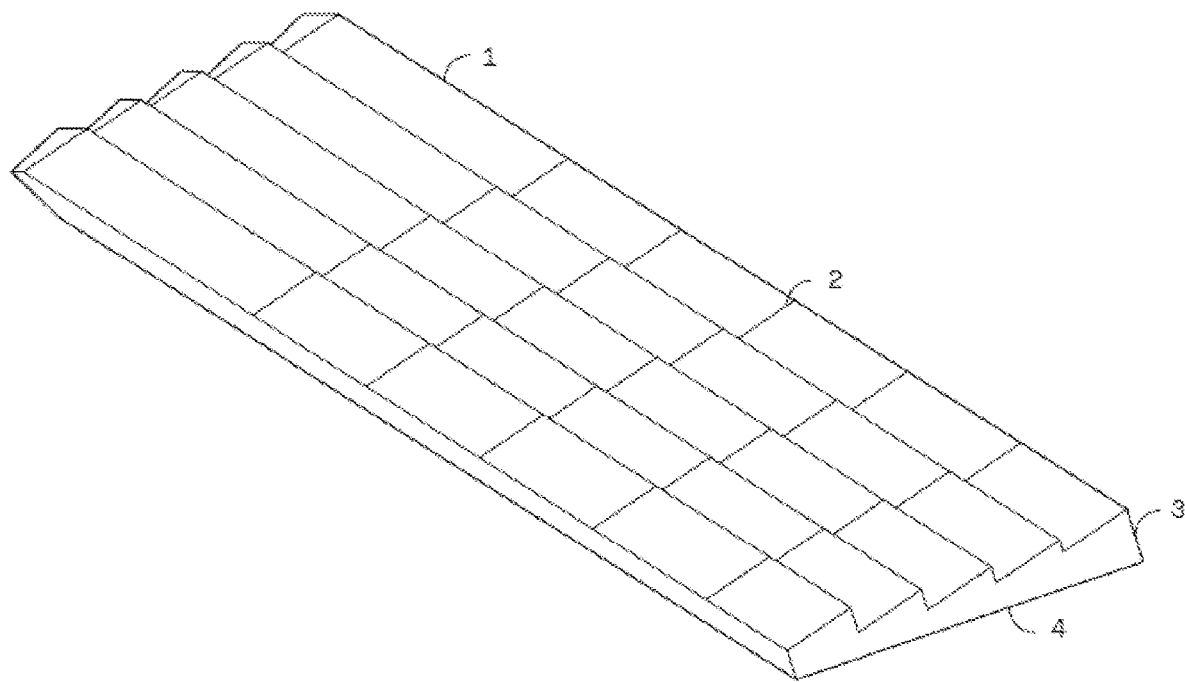
Figure 25:
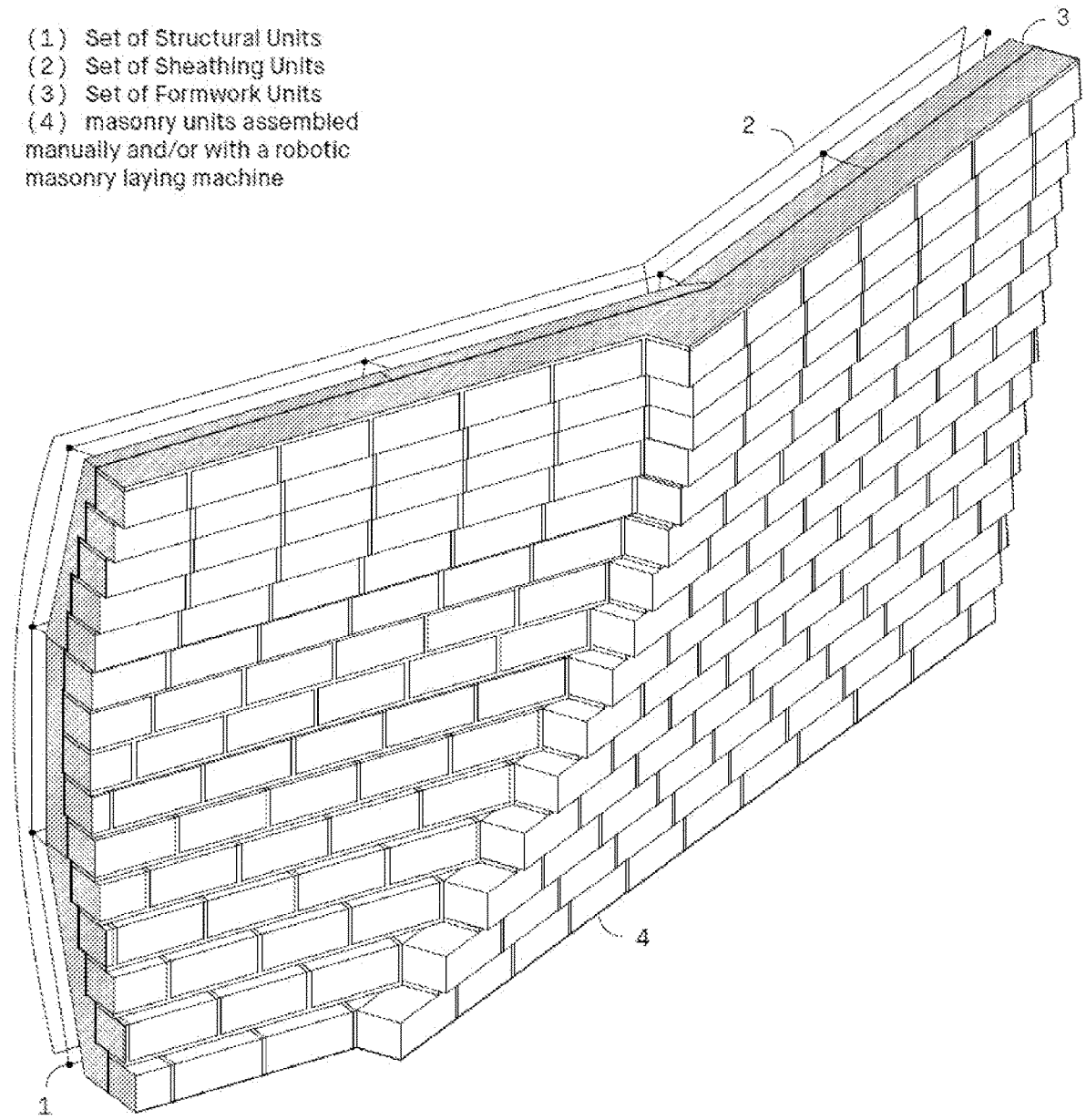

Referring now to exemplary FIG. 8, a CNC routing machine may be shown. The CNC machine may have a router 802 which may be the main cutting element. The router 802 may spin and may be fitted with a cutting surface. The router 802 may be connected to a number of rails which may allow the router to move anywhere along the flat bed 804 of the CNC machine. A sheet of material to cut 806 may be placed on top of the flat bed 804, such that the router may cut any part of the material 806. Multiple parts 807 may be cut from a single sheet of material 806. A fixed x-axis rail 808 may be affixed to a side of the CNC machine. A y-axis rail 810 may be perpendicularly connected to the x-axis rail 808, allowing the y-axis rail 810 to move along the x-axis rail 808. A z-axis armature 812 may be movable connected to the y-axis rail 810, such that the z-axis armature 812 can slide in any direction along the y-axis rail 810. Since the y-axis rail 810 can additionally slide along the x-axis rail 808, the z-axis armature 812 may be moved to anyplace along the plane of the flat bed of CNC machine, in the x and y direction. Further, the z-axis armature 812 may move in a vertical direction, down towards the flatbed 804 and material to be cut 806. In this example, the apparatus for holding the material may be a flat vacuum table 804. Examples of other CNC machines include machines that have an apparatus for holding material and numerically controlling the motion of a tool for shaping parts, including subtractive and additive manufacturing tool heads, of various material types, such as the parts shown in FIG. 25. The material holding apparatus may also be numerically controlled, and capable of moving the held material in the x-axis, y-axis, z-axis, or any combination of the three, while handling or shaping material.

Figure 9:
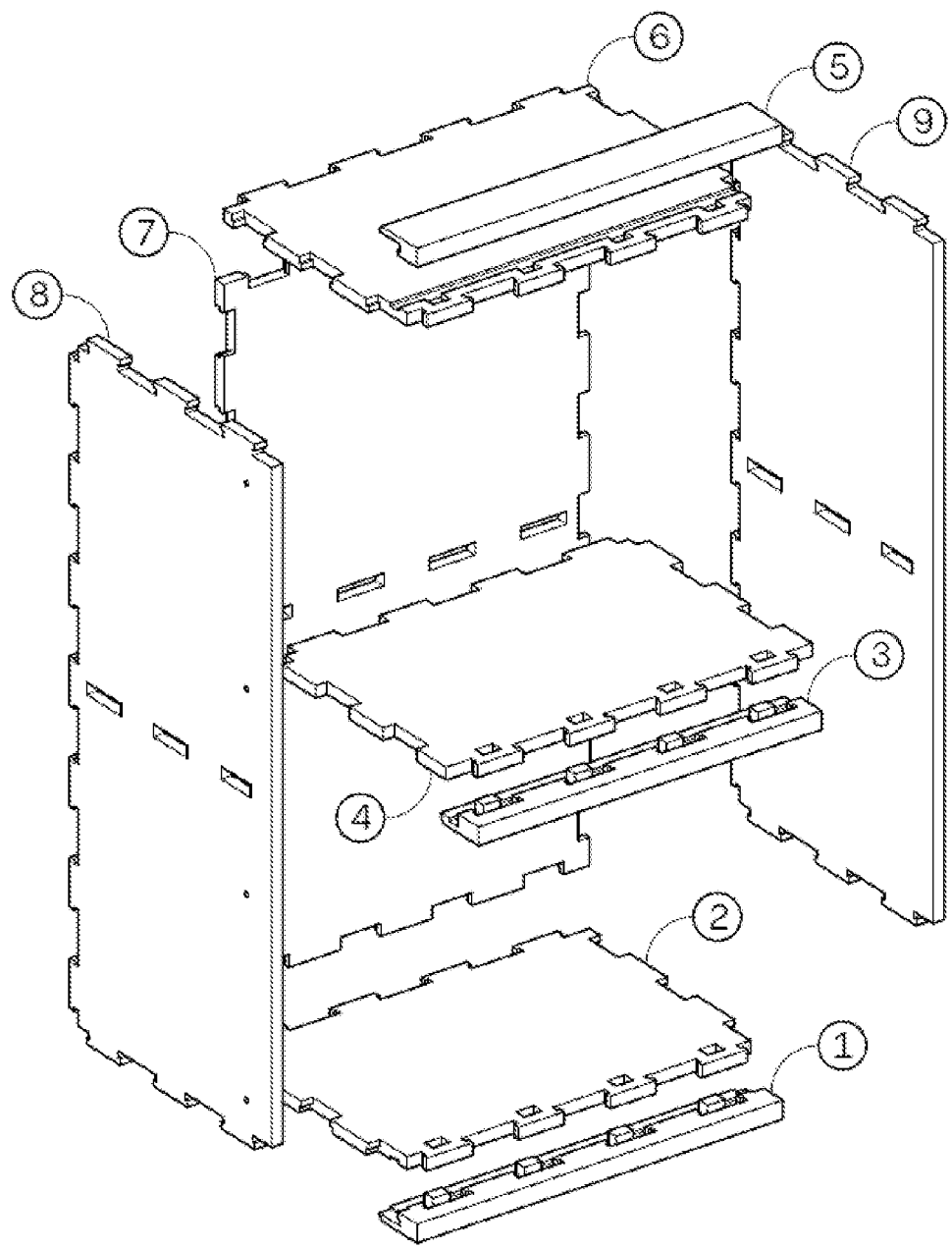
FIG. 9 shows an exemplary unit assembly in the process.

After cutting, the parts may be unloaded from the machine bed and assembled. Each part may have an identification tag indicating the unit type and its place within the assembly sequence as shown in FIG. 9. Adjoining parts may be held together with glue and friction. Lack of rigidity is a common critique of manufactured millwork. This is typically overcome through the use of heavier duty mechanical fasteners and thicker, higher quality materials. The interlocking joinery of the proposed method may yield superior rigidity with material of minimal thicknesses, reducing potential time lost in sending back damaged units while increasing the storage area available to the client. Parts may be assembled with a single tool, such as a mallet and a simple technique, such as hammering. Because the complex cutting may be computed by the software and performed by the CNC machine, fewer labor skills are required to assemble custom sized millwork of superior quality and rigidity.

Figure 10:
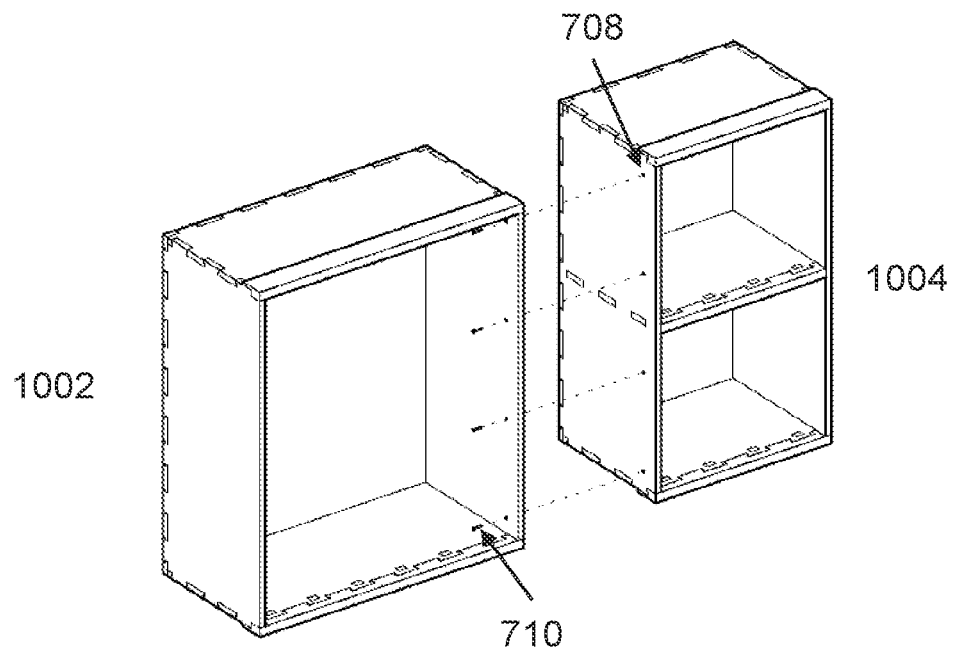
FIG. 10 shows an exemplary installation in the process.
Figure 10:
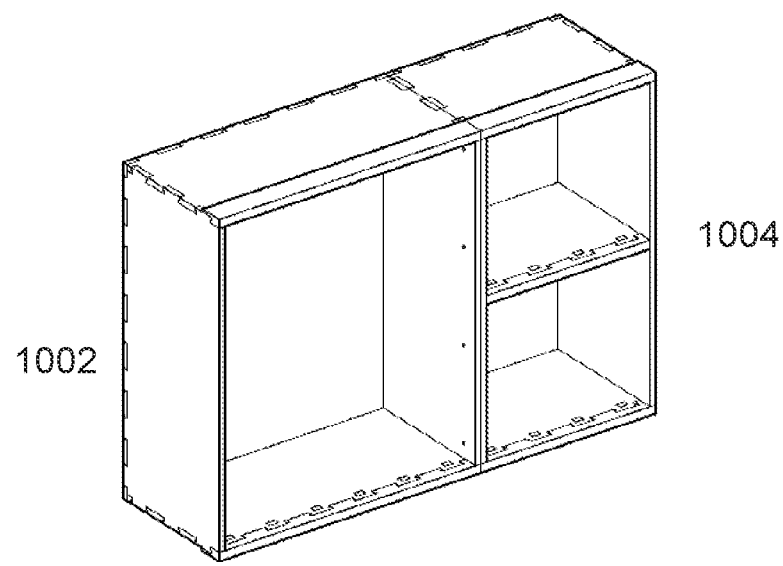
Figure 11:
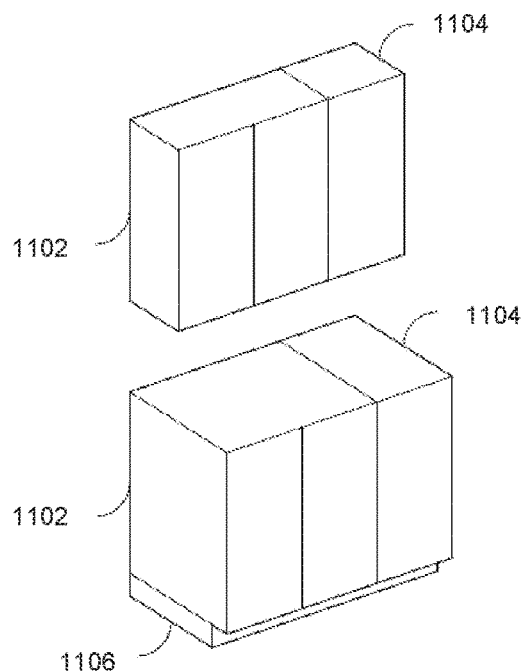
FIG. 11A shows an exemplary project and parameters of the process.
FIG. 11B shows an exemplary project and parameters of the process.
Figure 11:
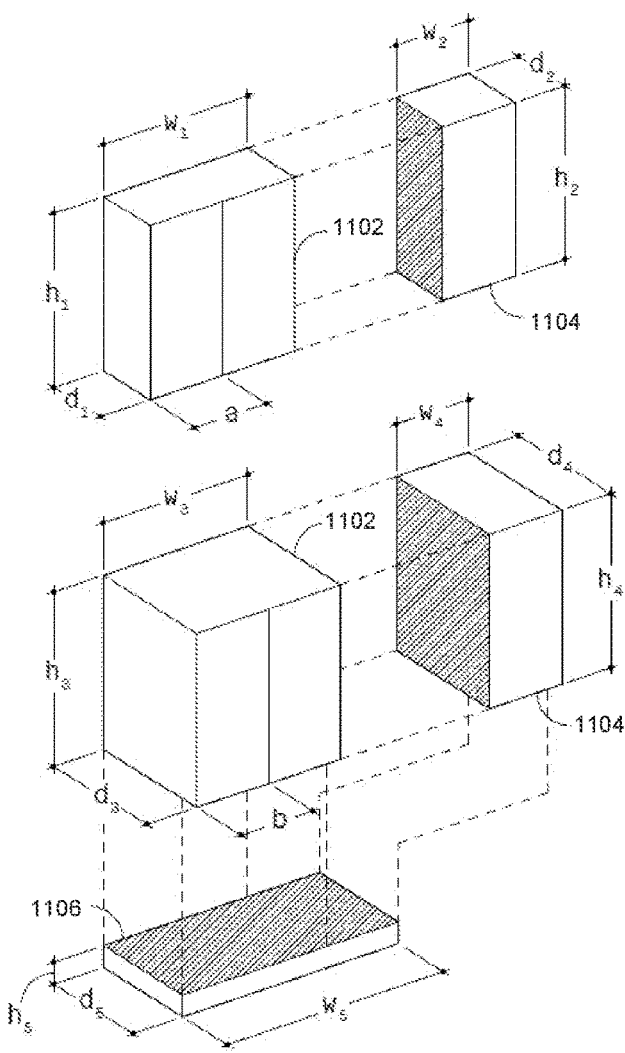

Referring now to exemplary FIG. 10 and FIG. 11, the assembly of a set may be shown. As shown in FIG. 10, a set 1000 may be a combination of a plurality of products. (For example, a given set 1000 may include a unit 1002 having a door which itself constitutes a unit 1004, or may include a cabinet which operates as a unit 1002 defined within another unit 1004, such as a row or column of cabinets.) Unit 1002 and unit 1004 may be similarly sized in the design phase such that they may be placed next to each other as a single unit. Mechanical fasteners may be used to join the first unit 1002 and the second unit 1004. As shown in FIG. 10 and FIG. 7, the mechanical fasteners may be a screw 710 in a first unit 1002 which engages a correspondingly placed nut 708 in the second unit 1004. Multiple mechanical fasteners may be used, depending on the size or structure of the units. In an exemplary embodiment, the first unit 1002 and the second unit 1004 may have equal heights and depths.

FIG. 11A may show an exemplary embodiment of wall mounted cabinets 1100. The cabinets may be a combination of multiple units. In this exemplary embodiment, a double cabinet 1102 is joined with a single cabinet 1104. They may be joined by an adhesive, screws and nuts, or by any other technique. Further, a leveling platform 1106 may be placed under the joined units 1102 and 1104. The leveling platform 1106 may be fixedly attached to the units and may also be fixed to a wall.

FIG. 11B may be an exemplary embodiment of unit parameters related to the exemplary cabinet unit in FIG. 11A. The design software may record these parameters according to a user's specifications, or some of them may be automatically populated by the software. Possible parameters that may be recorded include the type of unit, width, height, depth, number of peripherals, and adjacencies. The type of unit may be a specific style or may refer to the position or place it is to be mounted. The number of peripherals may include doors, shelves, windows, or other fixtures that may be mounted or attached to the furniture. Further, the width, depth, and/or height of each peripheral may be included. The adjacencies parameter may include information about which units may be directly adjacent or attached to the unit being described.

For example, in FIG. 11A the double cabinet 1102 is adjacent and attached to the cabinet 1104, so an exemplary adjacency parameter for cabinet 1102 may contain information defining the side which cabinet 1104 is attached to, such as the left side, and the method of attachment, which in this exemplary case may be screws and nuts. Another adjacency parameter for cabinet 1102 may define the leveling platform 1106 on the bottom of cabinet 1102 and may implement a screw/nut method of attachment. In another exemplary embodiment, the method of attachment may be an adhesive, or any other attachment method such as may be desired. Further, the adjacency information may be stored or viewed in the form of an adjacency graph 1110. The adjacency graph 1110 may show which items are attached to one another as well as the location of their attachment. Additionally, the adjacency graph 1110 may store edge type information.

Figure 12:
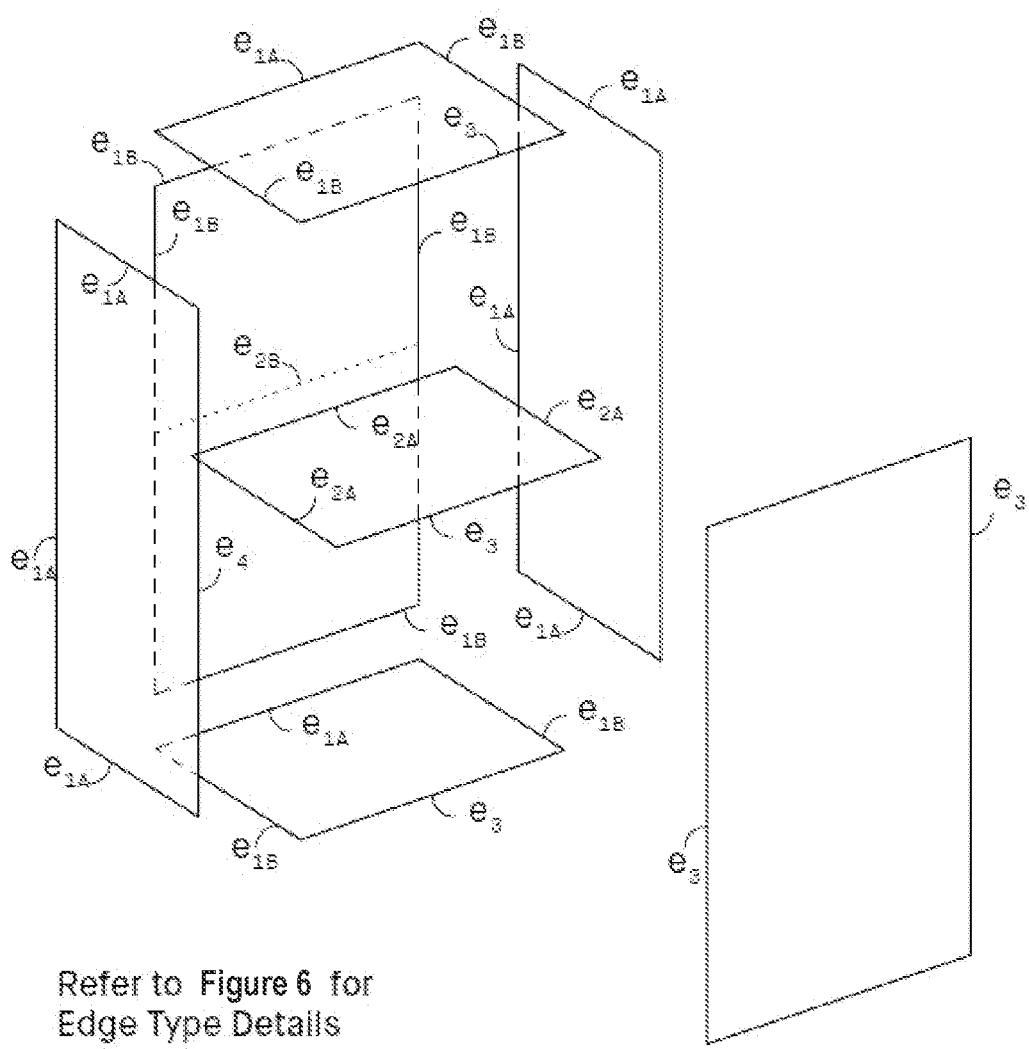
FIG. 12A shows an exemplary coded edge type of the process.
FIG. 12B shows an exemplary coded edge type of the process.
FIG. 12C shows an exemplary coded edge type of the process.
Figure 12:
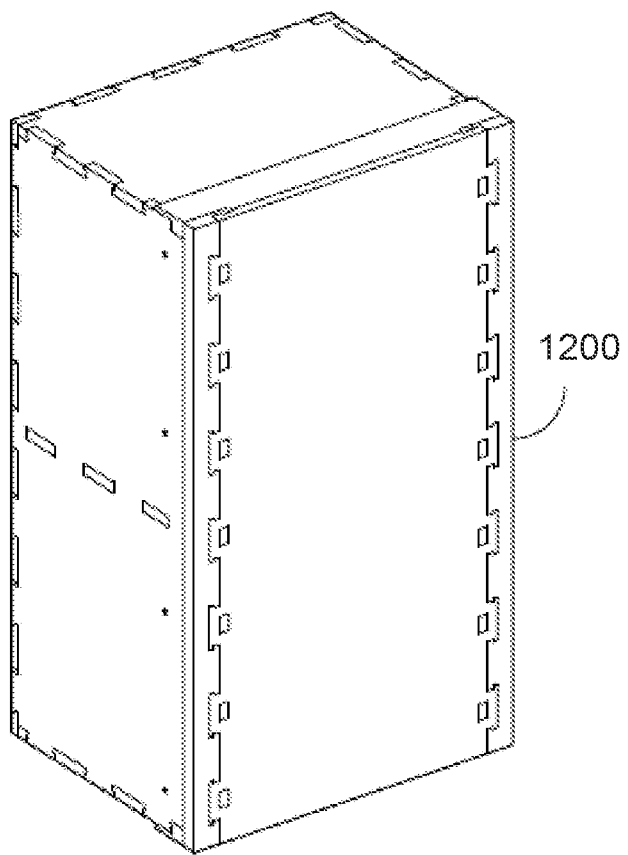
Figure 12:
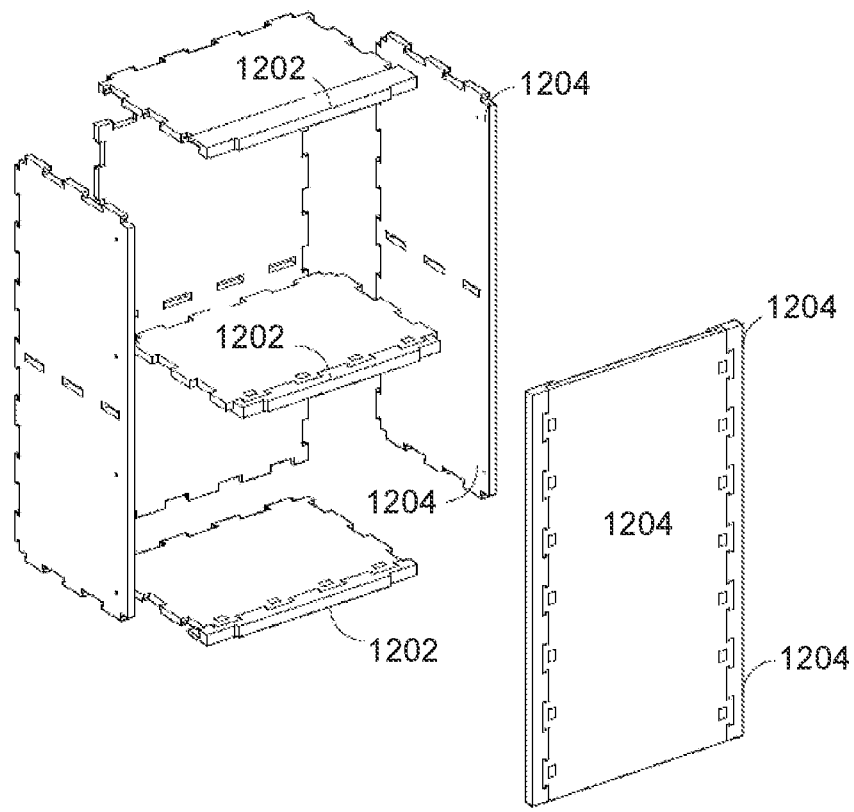

In an exemplary embodiment, edge type information may be stored in a 3D model of the unit, with the edges denoted by an edge type symbol, as shown in exemplary FIG. 12A. In exemplary FIG. 12A, an edge may be denoted by an 'e', and the type of edge may be denoted by the subscript under the e. For example, $e_{2B}$ may represent a mortise shaped edge that may be configured to join a corresponding tenon shaped edge represented as $e_{2A}$. In this exemplary embodiment, the edges may instead be represented by actual drawings of the contemplated edges, as shown in FIG. 12B. The assembled unit 1200 may be a 3-dimensional model which illustrates all the edges and the corresponding joints created.

Referring now to exemplary FIG. 12C, an illustration of the edge types of a unit may be shown. The software may automatically compute the location and type of edges for each piece. The edge information may then be saved in a format that is readable by a CNC machine. The CNC machine may then cut and drill the parts. As a result, the amount of manual labor, such as cutting, drilling, or measuring the parts, may be reduced. Additionally, the edge profile of certain parts, such as the horizontal piece 1202 in FIG. 12C, may follow the inside surface of door 1204, and may run along a portion of door 1204 which is made thinner in order to receive the horizontal piece 1202, thus maximizing storage space. In addition to structural rigidity, the edge detail may produce an inlay appearance, such as when two edges are composed of different materials.

Figure 13:
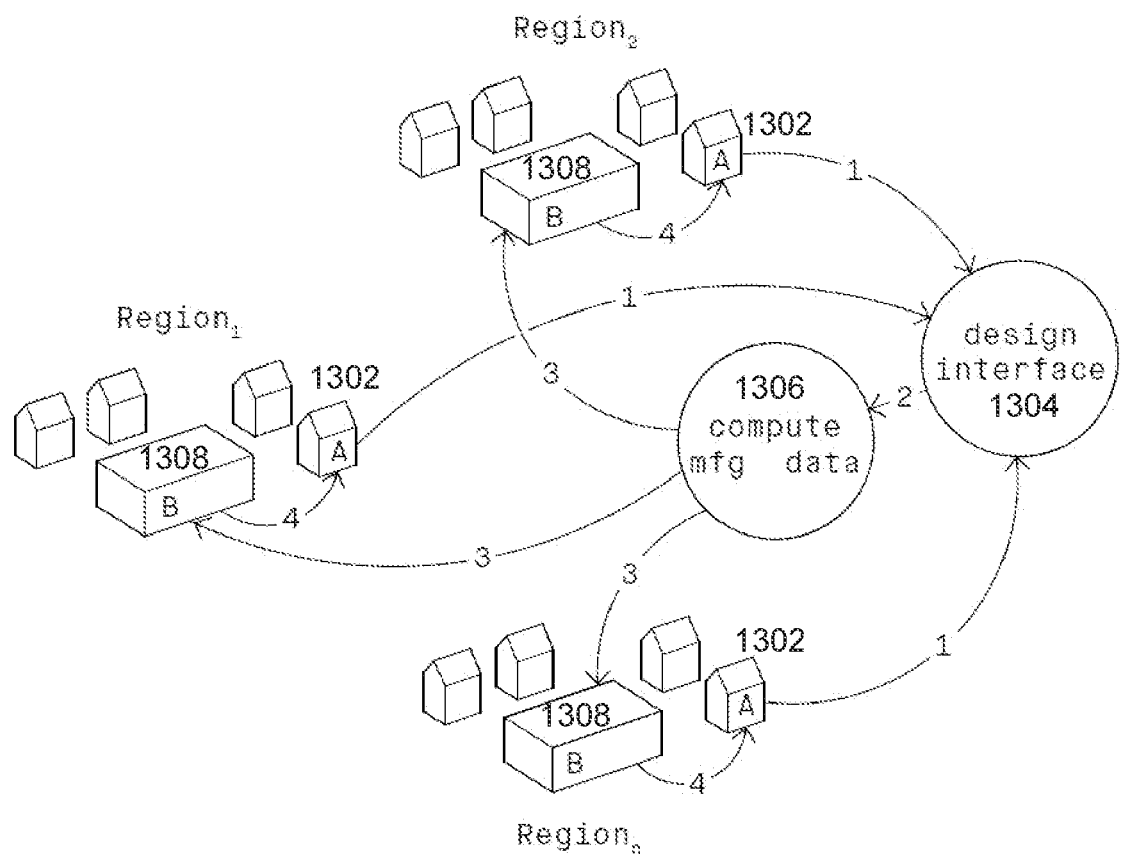
FIG. 13 shows an exemplary diagram of distributed manufacturing with the process.

The automation of manufacturing data (CNC machine code, assembly instructions, and associated project metadata) from customer defined parameters for custom millwork may enable the practical implementation of a distributed manufacturing network shown in FIG. 13. The customers 1302 may place orders by utilizing the design interface 1304. The design interface 1304, as previously discussed, may receive customer input and then may compute manufacturing data 1306. The manufacturing data 1306 may be in the form of code readable by a CNC machine. The data 1306 may then be sent to a manufacturing center 1308. Additionally, the software may also order materials needed or send a list to the manufacturing center specifying the materials needed. Alternatively, the software may send bills of materials to centers. In another exemplary embodiment, the materials may be cut at one manufacturing center 1308 and then sent as flat-packed parts to centers closer to the customer for assembly and finishing. The manufacturing center 1308 may be chosen based on the customer's location.

By selecting manufacturing centers 1308 located close to the customers 1302 placing orders, there may be reductions in transportation and energy costs and representatives from these centers may more easily supply on-site assistance with the pre-order and post-delivery phases. Additionally, the business may be able to develop contracts with existing regional shops already in possession of the skilled labor and/or machinery required for executing the orders. Alternatively, the company may contract the assembly with a third-party shop and supply the shop with flat-packed parts from a separate robotic cutting facility or facilities. With minimum re-tooling and/or training in the manufacturing methodology and techniques, these shops may gain access to a larger market for custom millwork and may complete the work without the challenges associated with drafting, measuring, cutting custom parts, or describing design limitations to customers. In return, the business may gain rapid scalability and resilience to changes in market demand. The company may be able to develop units and sets of other types of architectural products of various materials, by designing new pre-programmed units and engaging shops with other types of CNC equipment such as programmable laser-cutters, water-jet cutters, and five axis machines with custom tool heads.

A customer 1302 may also select a preferred regional manufacturing center 1308 if desired. Representatives from a manufacturing center 1308 may be available to provide services such as direct assistance during the design or installation phase. For example, a representative from the manufacturing center may provide a local installation team that can install the units, or the center itself may employ one or more specialists who can install the units or sets. The representatives may assist customers with on-site measurements, design selection, and configurations. Further, the manufacturing center 1308 may have display models of already manufactured units or sets that a customer may choose to see prior to purchasing or designing their own unit.

The project may be shipped to the customer as ordered set(s) of units for the installation phase. Unit identification tags correspond to the units shown in the project web-based design model and the installer may refer to this model as an installation aid. With the pre-fabricated threaded inserts and pre-drilled holes for machine screws, for example, as shown in FIG. 6, "e4", the installer may rapidly and accurately align units within set(s) as shown in FIG. 10. It is relatively time consuming to utilize these types of fasteners with conventional custom millwork methods and it is impractical with standard manufactured units that are designed and built with no reference to specific adjoining units. On the other hand, in exemplary embodiment, the ability of the software may map the adjacencies within a set of units and translate that information into machine code that accurately positions the fasteners enabling the effective use of this fastener.

Also, in exemplary embodiment, project data may be saved in an online account for reordering parts for repairs. A mechanical fastener solution, for example, as shown in FIG. 7 "j4" may facilitate easy replacement of new parts without residual damage to adjoining parts from the use of typical on-site unit alignment solutions (ex-nails and wood screws).

Figure 14:
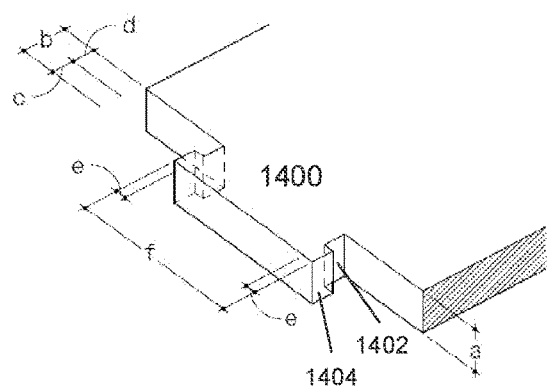
FIG. 14 shows an exemplary joint type of the process.
Figure 14:
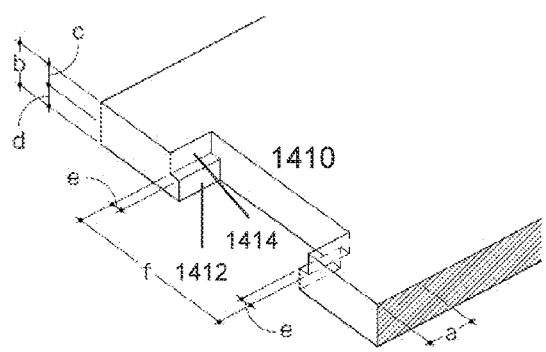

Referring now to the exemplary embodiment in FIG. 14, a mortise and hammer-headed tenon joint may be shown. This type of joint may be implemented when two pieces are connected at a 90° angle. The letters on part A of FIG. 14 correspond with the letters on part B of FIG. 14, such that the same letter indicates the same length on both parts. The hammer-headed tenon 1400 may be shown on part A as a tenon with a neck 1402 and a thicker head 1404. The head 1404 may be sized such that it may be received by the upper portion 1414 of the notch 1410. The lower portion 1412 of notch 1410 may be thicker than the upper portion 1414 such that it may contact the neck 1402 of the tenon. Note that in this exemplary embodiment, the tenon 1400 is configured such that it must be vertically connected to a horizontal mortise 1410, however other configurations are contemplated.

Figure 15:
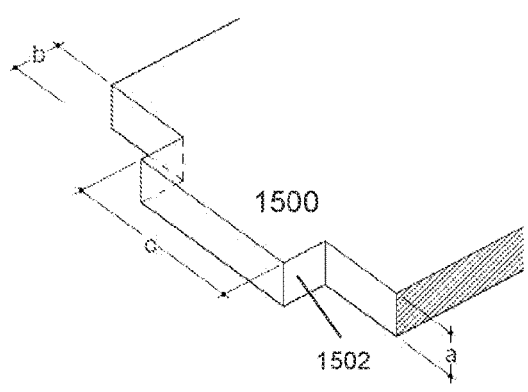
FIG. 15 shows another exemplary joint type of the process.
Figure 15:
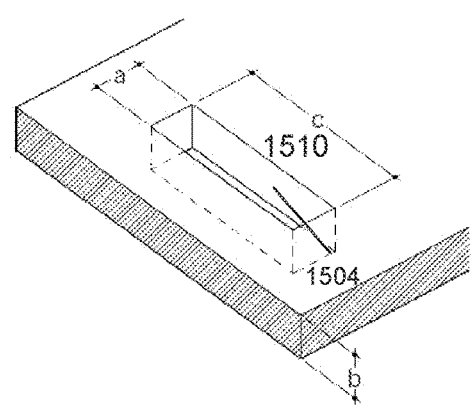

Referring now to the exemplary embodiment of a joint in FIG. 15, a mortise and tenon joint may be shown. A rectangular tenon 1502 on a first part 1500 may be sized such that it may enter a rectangular aperture or mortise 1504 in a second part 1510. The advantage to the mortise and tenon configuration is that the mortise may be placed anywhere along the second part, such as in a middle portion. A mortise and tenon joint may be used to affix shelves, walls, or any other fixtures to a unit.

Figure 16:
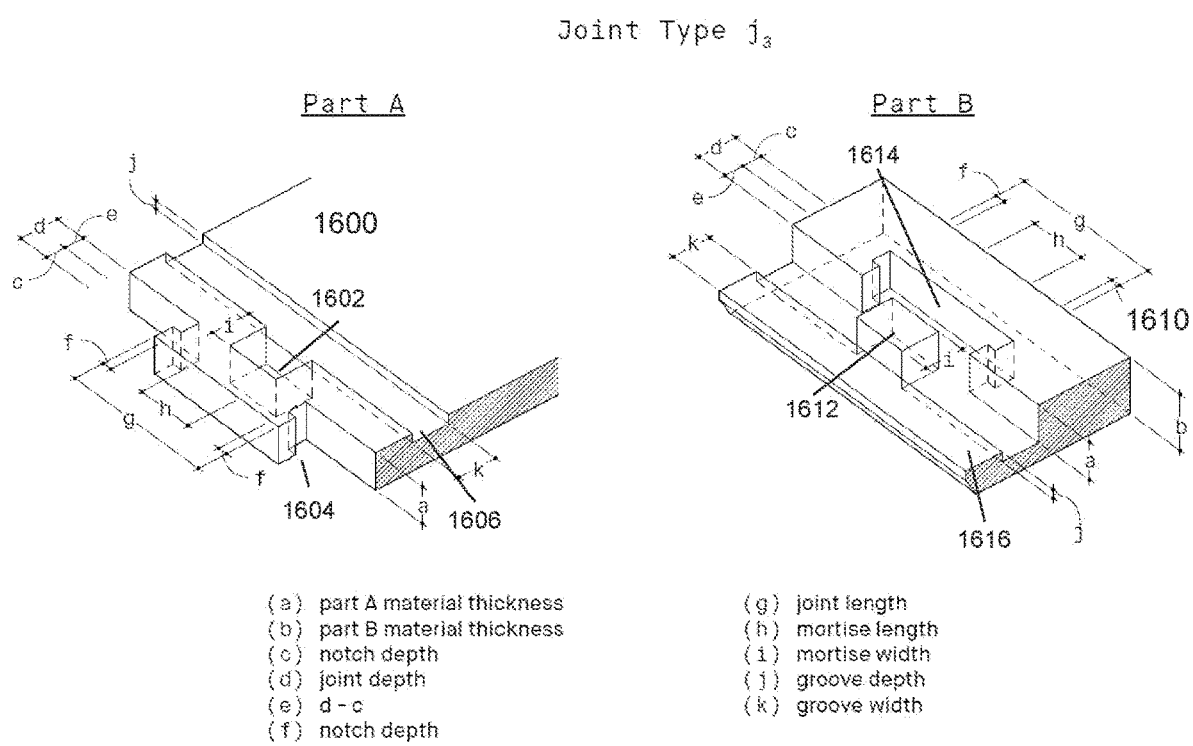
FIG. 16 shows another exemplary joint type of the process.

Referring now to the exemplary embodiment of a joint in FIG. 16, a splice joint may be shown. A small rectangular mortise 1602 on a first part 1600 may receive a correspondingly sized tenon 1612 on a second part 1610. Additionally, a hammer headed tenon 1604 on the first part 1600 may contact a correspondingly shaped mortise 1614 on the second part 1610. Further, a groove 1606 on the first part 1600 may receive a bump 1616 on the second part 1610. The two parts may be joined such that they run along the same plane and extend from one another. By applying multiple types of connections, such as a hammer-headed tenon, a groove, and a rectangular tenon, the joint may be more stable than traditional joints that only use one type of connection.

Figure 17:
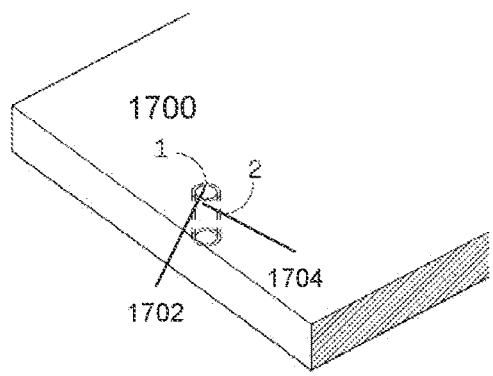
FIG. 17 shows another exemplary joint type of the process.
Figure 17:
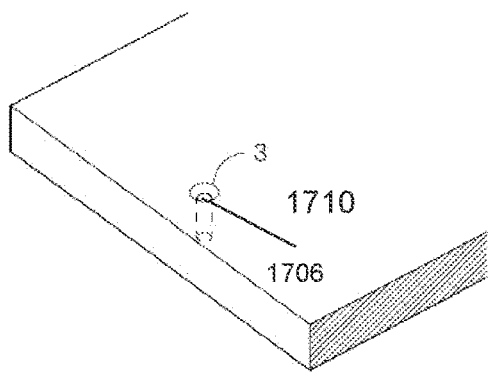

Referring now to exemplary FIG. 17, mechanical fasteners may be shown. A threaded insert nut 1702 may be installed in a first part. The nut may be inserted into a CNC drilled hole 1704. The second part may contain a correspondingly placed CNC drilled hole 1706. A screw may be inserted into and through the hole 1706 in the second part until the screw contacts and threads with the nut 1702 placed in the hole 1704.

Figure 18:
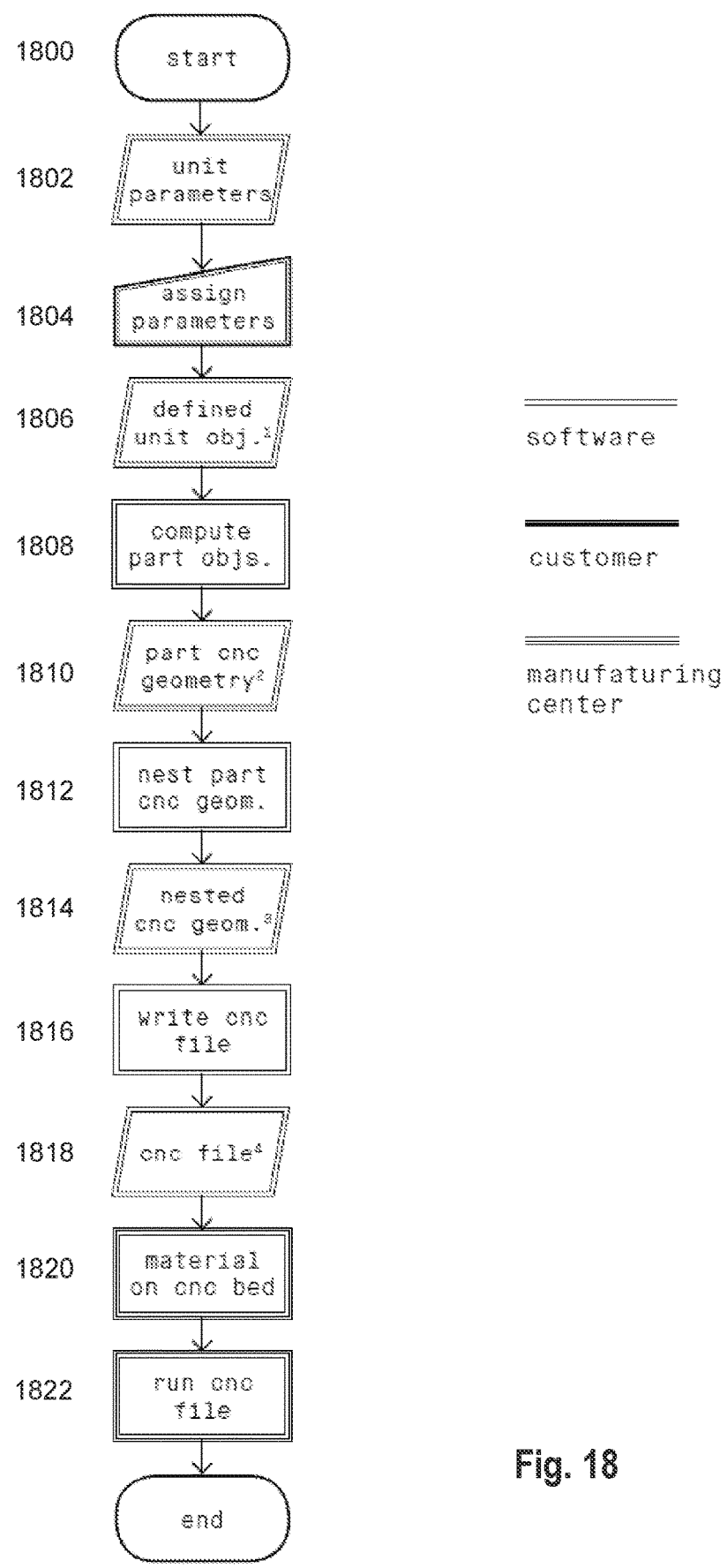
FIG. 18 shows an exemplary machine code generation diagram in the process.
Figure 20:
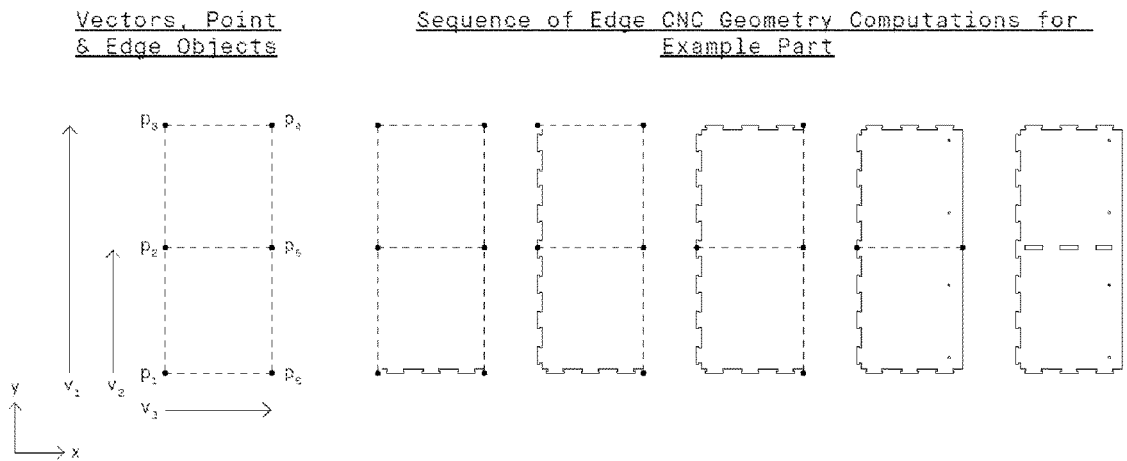
FIG. 20 shows an exemplary parametric part CNC geometry computation in the process.

Referring now to exemplary FIG. 18, a machine code generation diagram may be shown. The process for generating the CNC machine code begins with the default unit parameters 1802. The customer may choose a unit, and the software may provide sample unit parameters 1802. The customer may then assign parameters to the unit 1804 as desired. Once the parameters are finalized, the software may define a unit object 1806, which may be a single unit or product. An object as described in this section may be a 2D or 3D computer aided design object. In a next step, the unit object may be further analyzed to create or compute one or more part objects 1808. The part objects may correspond to the different pieces of the unit, such as the walls, panels, or shelves. When the part objects are computed 1808, each part's CNC geometry 1810 may be produced, including their edges and sizes. FIG. 20 may further describe the computation of CNC geometry. In a next step, the software may apply a nesting algorithm 1812 to nest the part CNC objects, producing a nested CNC geometry 1814. The nesting algorithm may optimize the CNC geometry such that a minimal amount of material is wasted when the parts are cut from sheets. The nested CNC geometry may then be written or saved as a CNC file 1816. The CNC file is then sent to a desired manufacturer 1818. The manufacturer may place a material, such as a wood sheet, on a CNC bed 1820. Finally, the CNC file previously written is run on the CNC machine 1822, cutting the wood sheet as calculated and modeled by the part object geometry.

Figure 19:
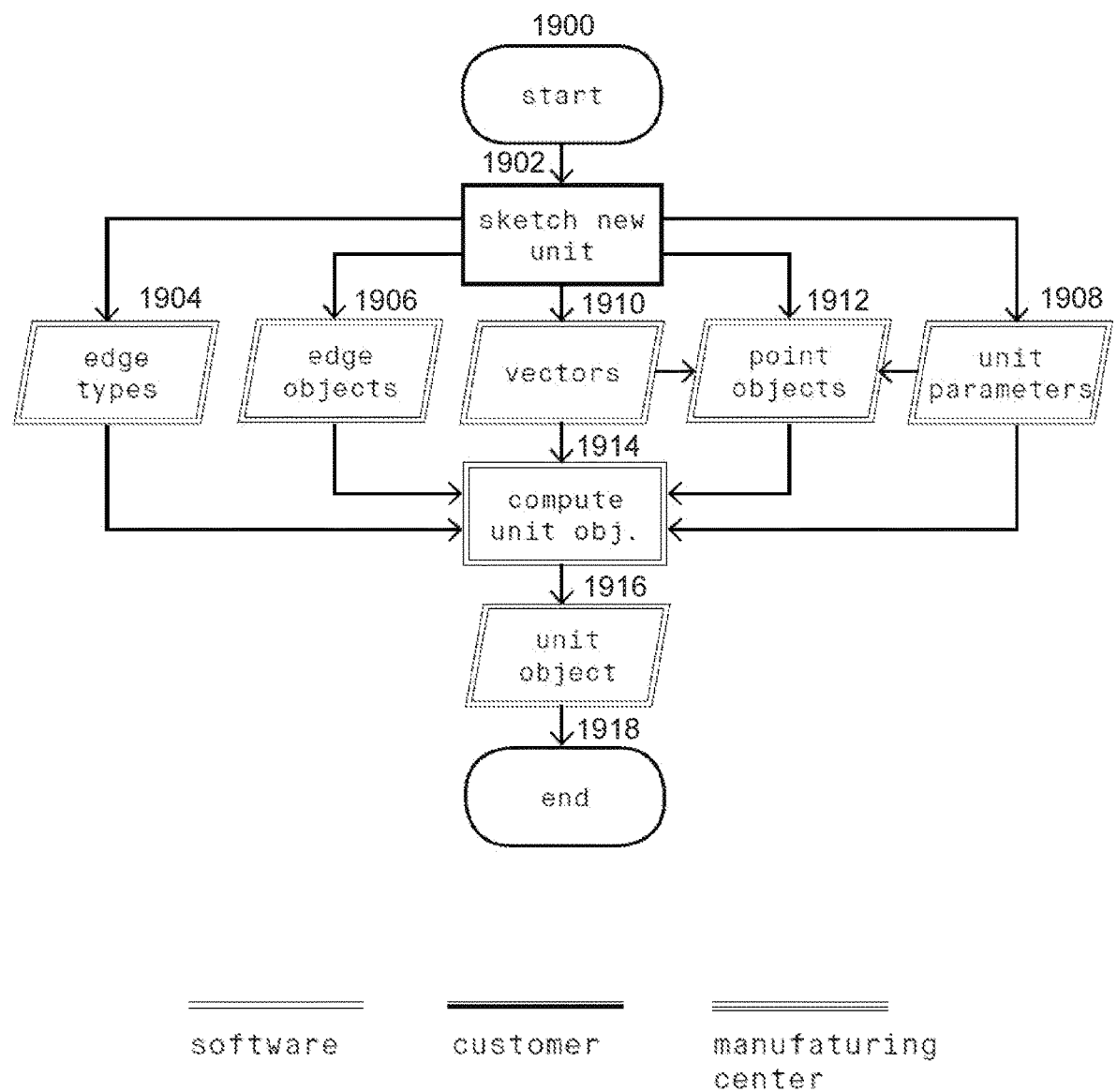
FIG. 19 shows an exemplary diagram for making preprogrammed parametric units in the process.

Referring now to exemplary FIG. 19, FIG. 19 may illustrate how a unit object is computed. First, the user (such as a customer or company) may design or sketch a new unit 1902 through a design interface. The design interface may present an intuitive interface and may be web-based. In a next step, the software may determine the type of edges to be used 1904 as well as which objects contain edges 1906. The software may determine the lengths of the edges of each part (as determined from the unit parameters such as the height, depth, and width) 1908. The lengths and orientations of the edges of each part may be stored as vectors 1910. The vectors may then be used to model parametric points of two or three dimensions 1912 in order to generate toolpath data for each part for shaping (cutting, etching, routing, milling, sawing, bending or forming) with a CNC machine. The data from the vectors, point objects, unit parameters, edge types, and edge objects may be compiled in order to compute a single unit object 1914. The unit parameters may be defined as value ranges rather than discrete values, and the unit object may be stored in computer memory to generate multiple custom units of a similar type with minimal inputs (simply declaring unit parameters with pre-programmed value ranges).

Referring now to exemplary FIG. 20, FIG. 20 may illustrate the sequence of CNC geometry computations, as explained in FIG. 19. $V_{1-3}$ may illustrate vectors that represent the length and orientation of a single edge of a part. $P_{1-6}$ may be different point objects which may define the start points, end points, and adjacencies of the edges. For example, the first edge with start point $P_1$ and end point $P_3$ may be adjacent to the second edge with start point $P_3$ and end point $P_4$ (the end point of the first edge is the same as the start point of the second edge). The coordinates of points $P_{2-6}$ are calculated from an origin point $P_1$ after the part parameters are defined. In this example the length of $V_3$ may be equal to the width of a unit, while the length of $V_1$ may be equal to the height of a unit. From a catalog of edge types with their own sets of vectors, points, edges, and joint types, toolpath data for the part may be generated and compiled into a CNC file. The CNC machine may then shape the desired edges and joints according to the given CNC file.

Figure 21:
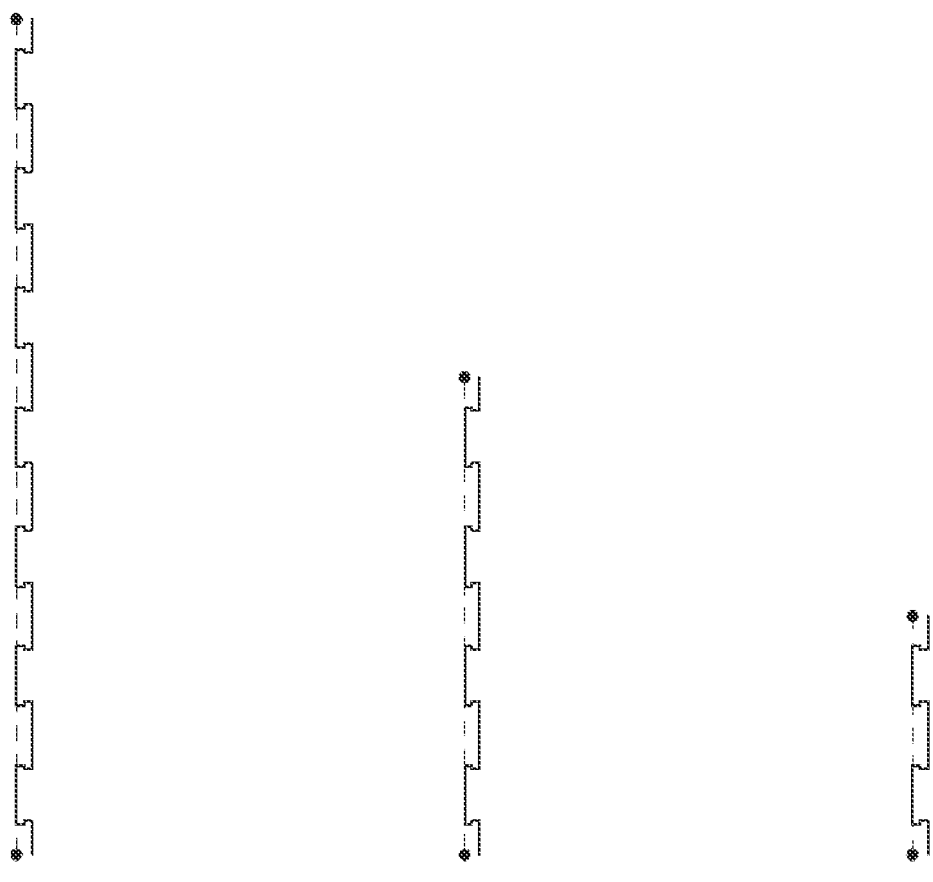
FIG. 21 shows exemplary joints per edge relative to distances between point objects in the process.

Referring now to exemplary FIG. 21, the number of joints per edge relative to distances between point objects may be shown. A longer edge 2102 may have more joints per edge than a shorter edge 2104. The software may compute the number of joints per edge based on the distance between point objects.

Figure 22:
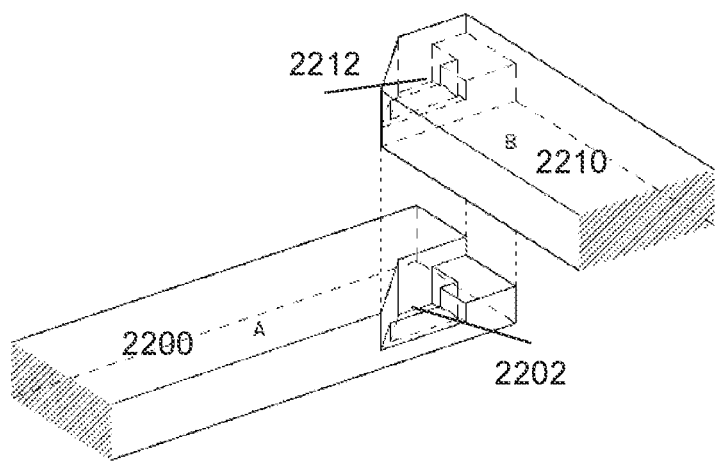
FIG. 22 shows another exemplary joint type of the process.
Figure 22:
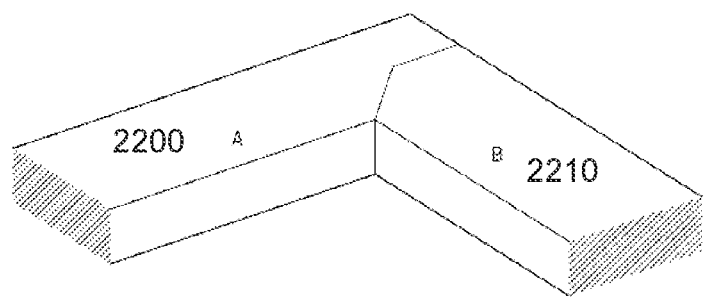
Figure 23:
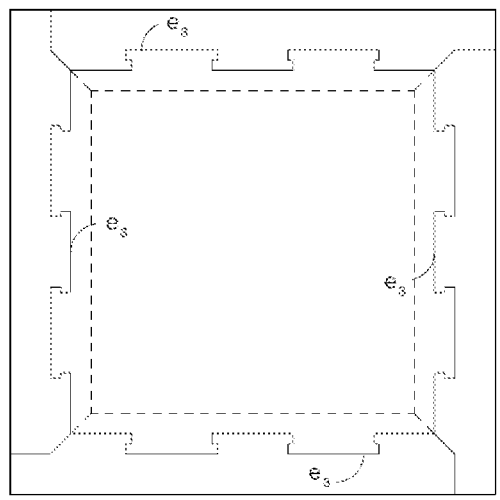
FIG. 23 shows an exemplary panel with one edge type and two joint types in the process.
Figure 23:
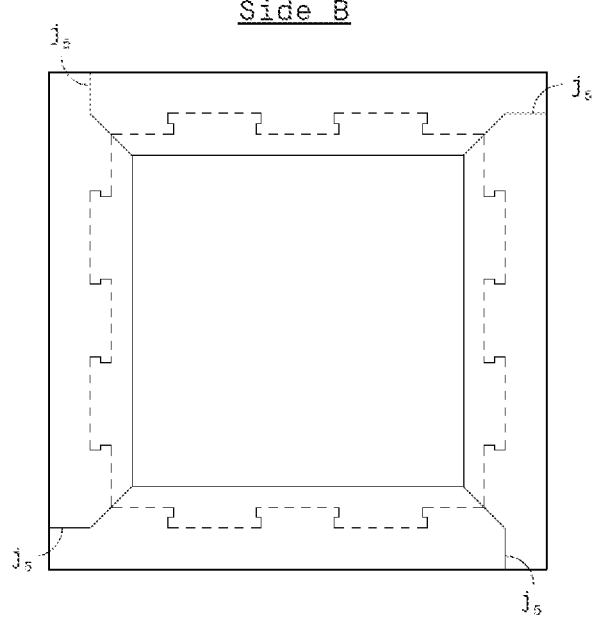
Figure 24:
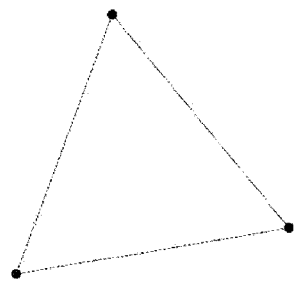
FIG. 24 shows an exemplary interior design product in the process.
Figure 24:
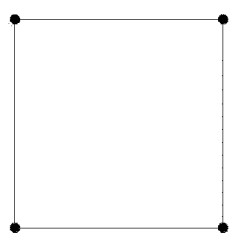
Figure 24:
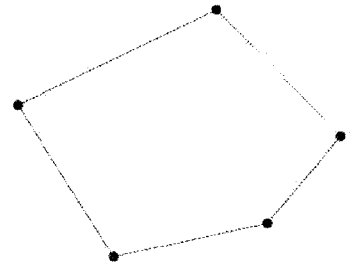
Figure 24:
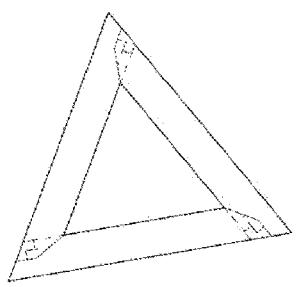
Figure 24:
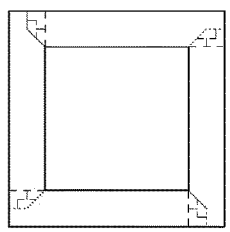
Figure 24:
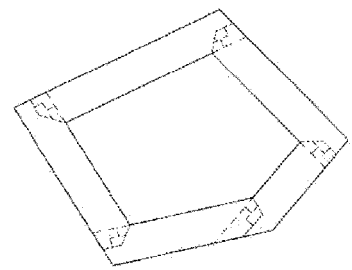

Referring now to exemplary FIG. 22, FIG. 23, and FIG. 24, a corner joint type may be shown. A slanted mortise 2202 on object 2200 may receive a slanted tenon 2212 on object 2210. FIG. 23 and FIG. 24 may show an example panel with the corner joint. The corner joint may be implemented in a unit with any number of sides and variable angles between adjoining sides, as shown in FIG. 24. Using the same process previously described and outlined in FIG. 1, a picture frame such as the ones shown in FIG. 24 may be created. The customer may choose any desired number of sides, shapes, or sizes for the picture frame. Additionally, the CNC technology may enable the integration of custom engravings into the face of the frame material.

With the processes outline in FIGS. 1, 18, and 19, a customer may use a web-based user-interface to design digital surfaces by positioning point objects and declaring edge objects in a 3D graphical user interface. The customer may use functions of the interface for joining surfaces as one or more sets. The software may compute the intersection of these surfaces and render the result in the 3D graphical user interface. Other customer input parameters may include building system types. These inputs may be referred to as design inputs. Various design inputs may allow the software to compute manufacturing data from pre-programmed and parametric unit objects. Unit objects may include structural units, such as in FIG. 25B, sheathing units such as in FIG. 25H, and formwork units as in FIG. 25I. An advantage of these processes and pre-programmed units may be shown in FIG. 25. These processes and pre-programmed units allow a customer to construct complex geometric architectural form while minimizing the amount of manual measuring, cutting, or assembling necessary, thus reducing the time and labor necessary to complete such a task.

The term "set of structural units" may refer to an ordered set of structural units. For example, FIG. 25B may show a set of structural units. The structural units in this figure form a complex doubly curved surface. The surface may have u- and v-coordinates that correspond to x- and y-coordinates of a flattened design surface. The flattened design surface may be a network of sets, like the network of sets illustrated in FIG. 27. For instance, a low level set within the network may be the combination of regions e1 and e2 in FIG. 25B, where the combination of these regions has a width and a height parameter. Similarly, regions c1 and c2 may represent a set, and regions a1 and a2 may represent another set in FIG. 25B. These three sets may be grouped in another set to form a column. Prior to generating CNC manufacturing data for the units, unit and part edge point locations as well as vector lengths and orientations may be calculated by mapping these coordinates from the x- and y-coordinate system of the flattened design surface to the u- and v-coordinate system of the three-dimensional design surface. FIG. 25C may show a single structural unit. The structural unit in exemplary FIG. 25C may be a set of assembled parts. In this exemplary case, the unit is a triangle formed from round tube, flat plates and mechanical fasteners. An alternative to the mechanical fasteners may be welded connections performed by a CNC welding machine. A structural unit may be composed of various materials, such as round tubes or flat plates which may be cut from stock material using a CNC machine. FIG. 25D may show a section through corner connection of a structural unit. FIG. 25E may show the connection between two structural units, creating a set. FIG. 25F may show a cross-section of a connection of two structural units. The angle between the two units may vary and may be calculated from customer defined inputs. FIG. 25G may show the connections between a set of structural units and other building components.

Exemplary FIG. 25H may show a set of sheathing units. A sheathing unit may be sheet material that may be formed from a doubly-curved surface, and may consist of an ordered set of parts with shapes, sizes, and manufacturing data computed from design inputs by software. Manufacturing data may include cuts, holes, and markings on the parts as well as locations to connect a sheathing unit to other parts, units, or building components. Parts of a sheathing unit may be cut with a CNC machine.

Exemplary FIG. 25I, FIG. 25J, FIG. 25K may show sets of formwork units. A formwork unit may be a part cut by a CNC machine from a thick sheet, such as rigid foam, or a thick sheet of a composite of laminated materials. One side of a formwork unit part may be cut with a CNC machine such that the cut surface may be parallel to one surface of a masonry wall, and where each masonry unit may be positioned at varying angles relative to adjacent masonry units. Reference graphical markings on the formwork unit may be used as guides for locating masonry units of standard sizes and may be used to communicate dimensional data for cutting of masonry units or may be used for calibrating the position of a robotic masonry laying machine in the physical 3D environment. This may reduce accrued error and conflicts from discrepancies between the designed virtual model of the wall elements and adjustments required to meet other physical architectural building components of other construction methods with varying degrees of accuracy. Similar to the structural units shown in FIG. 25B, the rigid foam unit shown in FIG. 25J may be designed as a low level set within a network of sets, such as the full assembly of rigid foam units shown in FIG. 25K. In addition to the perimeter compound saw cuts, each course with markings for bricks as joint types may be an edge type used in the design of the unit modeled with software. Angles for the compound CNC saw cuts, and routing depths of the CNC milling machine shaping the rigid foam unit may be calculated after mapping the x- and y-coordinates of the unit object in the flattened design surface to the u- and v-coordinates of the three-dimensional design surface. Parts of a foam unit may be glued together with a CNC gluing machine.

FIG. 25L may show a cross-section of the assembly of a building system. The building system may be a combination of sets of units defined through design inputs. A building system may contain a set of structural units connected to one or more sets of structural units, sheathing units, and/or formwork units.

Referring now to exemplary FIG. 25M, FIG. 25M may illustrate the connection detail between non-parallel building components. A round tube of a structural unit may be connected to a second part, such as a sheathing unit, a formwork unit, or any building component. The normal surface vector at the point of connection with the second part may not be perpendicular to the center axis of the round tube.

Figure 26:
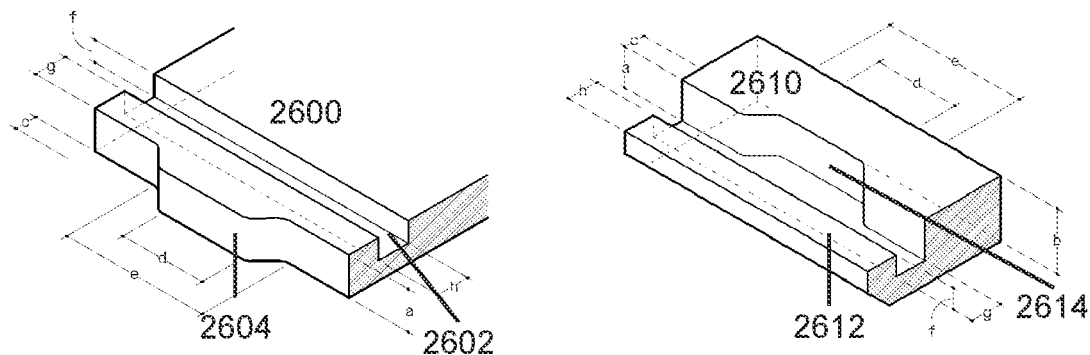
FIG. 26 shows an exemplary embodiment of a joint type.

Referring now to exemplary FIG. 26, FIG. 26 may illustrate an alternate embodiment of a splice joint. The splice joint in FIG. 26 may connect two pieces of different materials. The first part 2600 may contain a notch 2602 and a tab 2604. The notch 2602 may receive the tenon 2612 on piece 2610, and the tab may be inserted into the corresponding tabbed notch 2614. This joint may be used when it is desired that the material of part 2600 is concealed.

The following examples may illustrate a method for structuring data for solving two-dimensional and three-dimensional design problems. The problem spaces may be explored manually through an intuitive graphical user interface (the interface may be web-based) as well as automatically with generative design algorithms. Problem spaces may be structured as layered networks of sets where sets may represent design elements, such as units, peripherals of units, other design elements like empty space (required for space planning), and groupings of design elements. The features may show various methods or ways of manipulating the different dimensions of the units or sets. The following examples may focus on altering just one dimension, such as the width, for the sake of simplicity and illustration, although it may be contemplated that they may be applied to any other dimensions of the object, such as the length, the height or the depth, as desired. Structuring of the problem space in this way may allow for cohesion and consistency in modeled design solutions while the networks of sets are generated and edited. As a result, functions for generating and editing the sets may be programed to be called manually by a user through a design interface or automatically by generative design algorithms, such as a genetic algorithm. One or more of the set division, set editing, and set generation features and functions described below may be used in the generation of a set as a set generator function. In much the same way that a design professional may provide recommended design solutions as well as alternatives to a client, the generative design algorithm may present the customer (user of the software) with suggested designs for consideration. Because the underlying structure of the problem space may be the same for both manual and automatic generation and editing of design solutions, the client, with limited design experience with the problem space, may be directly engaged in the creative design process.

Figure 27A:
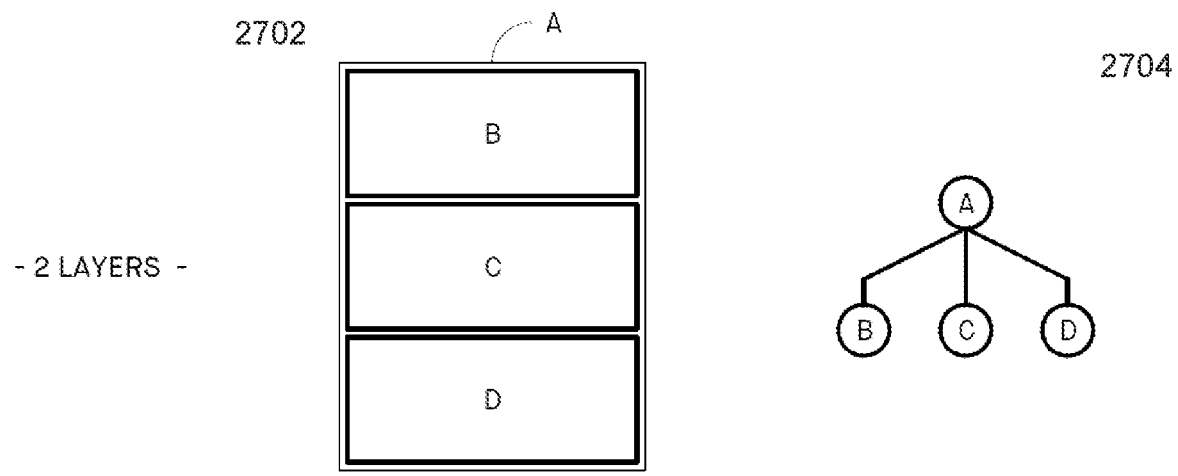
FIG. 27A shows an exemplary embodiment of a set with 2 layers.
Figure 27B:
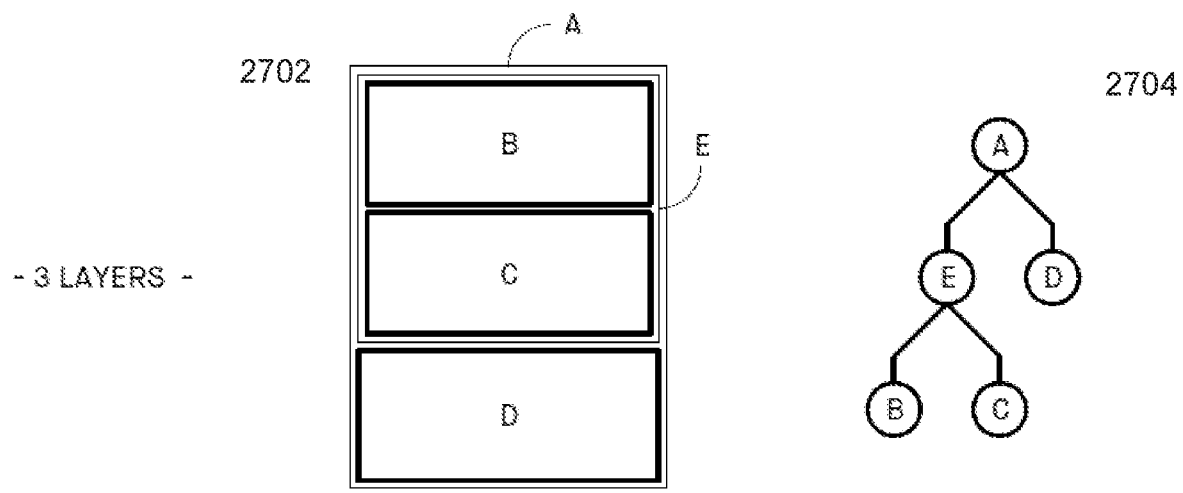
FIG. 27B shows an exemplary embodiment of a set with 3 layers.
Figure 27C:
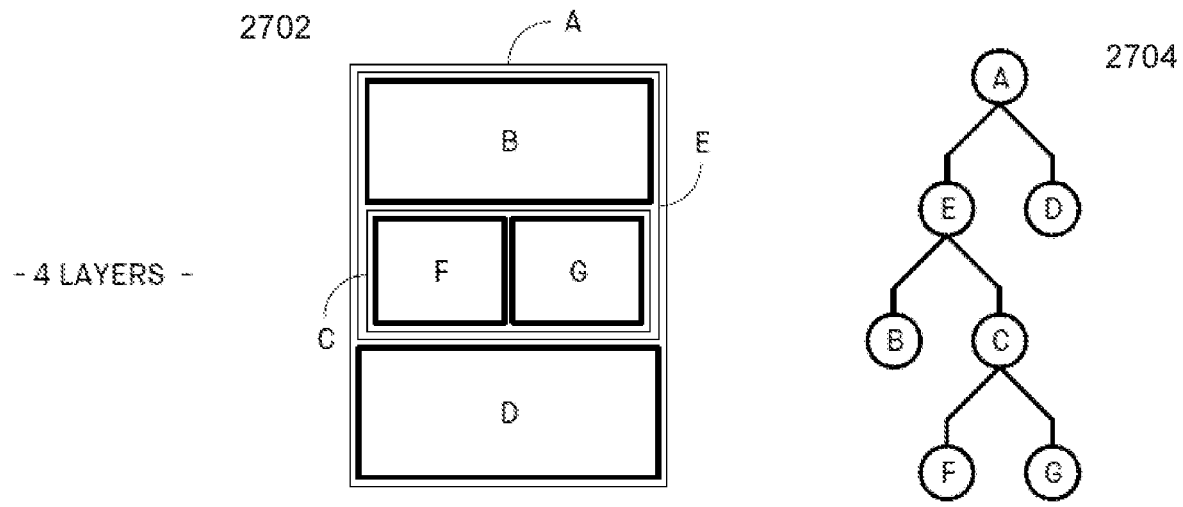
FIG. 27C shows an exemplary embodiment of a set with 4 layers.

Referring now to exemplary FIGS. 27A, 27B, and 27C, FIG. 27A may illustrate a set and subsets as dimensional drawings and layered graphs. The dimensional drawings 2702 may show the relative dimensional variables of the sets, such as height and width. The layered graph drawings 2704 may show the hierarchical data structures for each network of sets. In this exemplary embodiment, the first set A may have two free dimensions, such as height and width. Further, there may be subsets on layers below set A, which may share one or more dimensions inherited from the parent set. They may also have one or more free dimensions which may be a fraction of the corresponding dimension of their shared parent set. In an exemplary embodiment, the sum of the free dimensions may equal the shared parent dimensions. In the exemplary embodiment illustrated in FIG. 27A, the heights of sets B, C, and D are each a fraction the height of set A, and their combined heights may equal the height of set A. The width of sets B, C, and D may be equal to the width of set A. FIG. 27A may illustrate two layers of ordered sets, where sets B, C, and D are subsets of set A. FIG. 27B may illustrate an alternate embodiment, where sets D and E are subsets of set A, and sets B and C are subsets of set E, which is a subset of set A. The heights of sets B and C are each a fraction the height of set E, and their combined heights may equal the height of set E. Sets B and C may be characterized as a third layer, since they are a subset of set E which is a subset of set A. Exemplary FIG. 27C may illustrate a configuration with four layers. In this exemplary embodiment, sets F and G are subsets of set C, which is a subset of set E, which is a subset of set A. The widths of sets F and G may be free dimensions; however, they may inherit their heights from set C.

Figure 28:
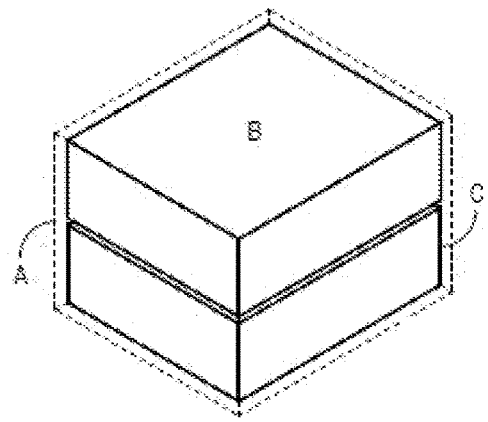
FIG. 28 shows an exemplary embodiment of different sets.
Figure 28:
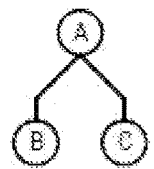
Figure 28:
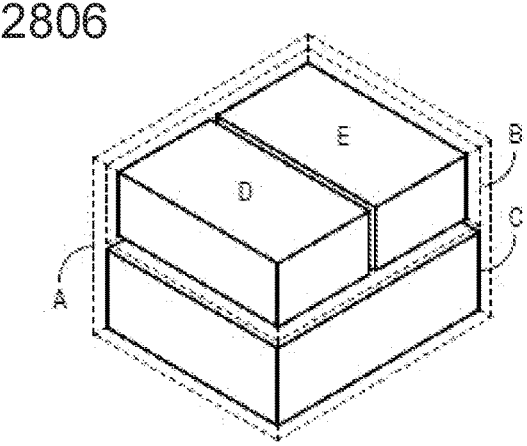
Figure 28:
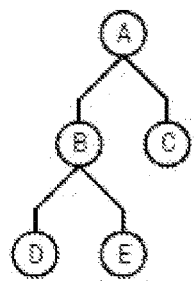
Figure 28:
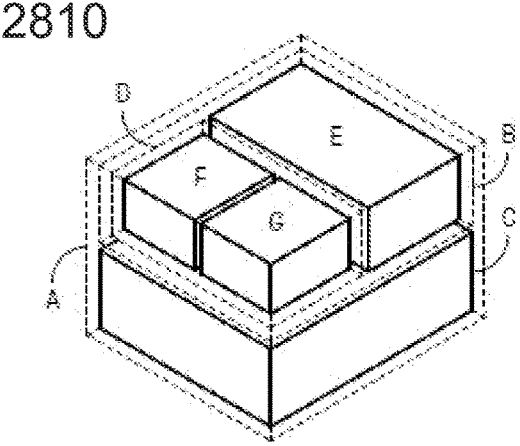
Figure 28:
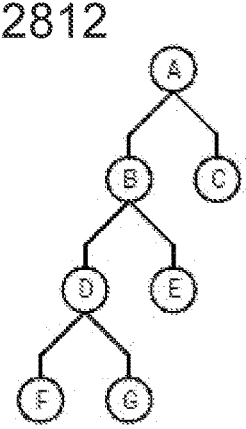

Referring now to exemplary FIG. 28, FIG. 28 may illustrate sets and subsets in three dimensions. The sets and subsets may be modeled with a height, width, and depth. The set 2802 may contain a set A which may have 3 free dimensions. Set A may further include subsets B and C, as modeled by the layered graph 2804. Three-dimensional subsets may have one free dimension and two inherited dimensions. Sets B and C of the set 2802 may share the width and depth of set A, while having a free height. In this exemplary embodiment, the combined height of subsets B and C is equal to the height of set A.

The set 2806 may contain a third layer, in which subsets D and E may be subsets of set B, as modeled by the layered graph 2808. The subsets D and E share a height and depth with set B, and their combined width may equal the width of set B. The set 2810 may contain a fourth layer, in which subsets F and G are subsets of set D, which is a subset of set B, which is a subset of set A, as modeled by the layered graph 2812.

Figure 29:
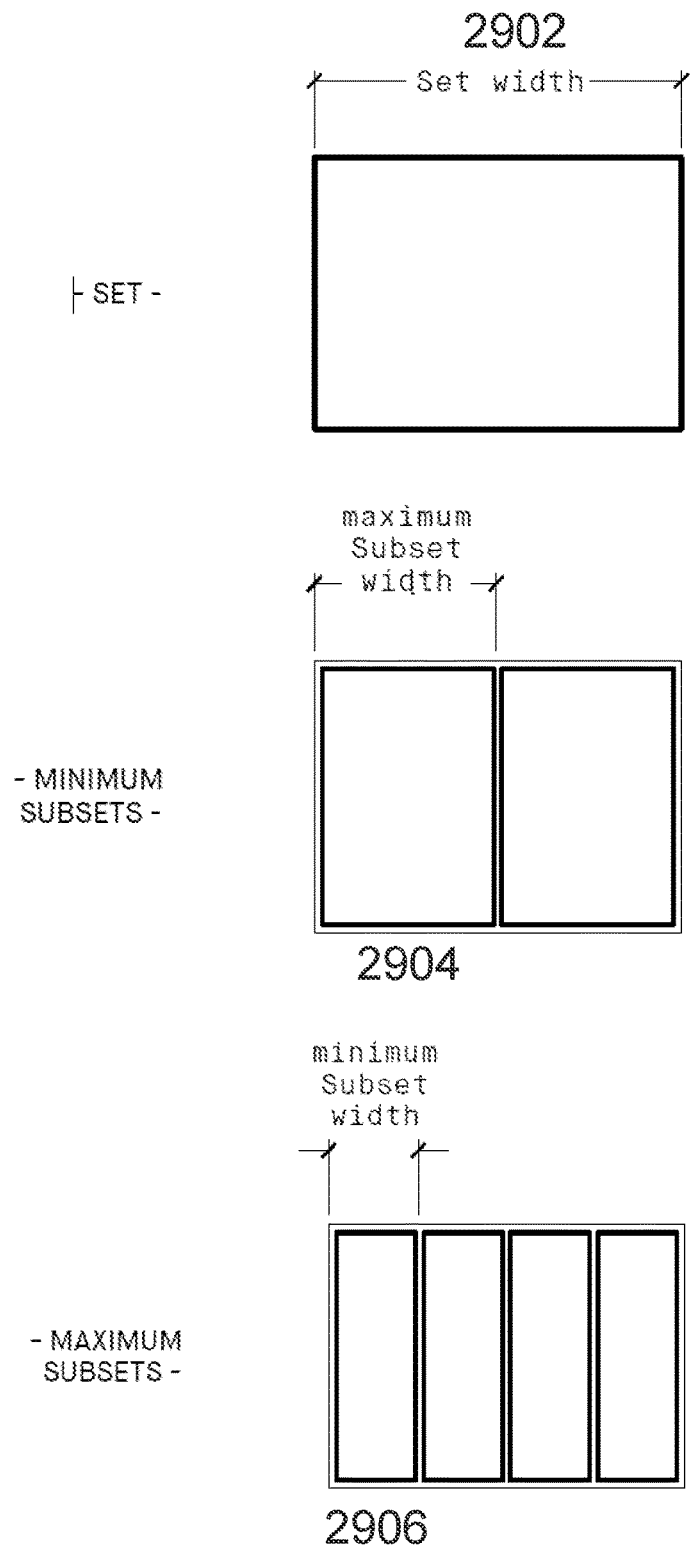
FIG. 29 shows an exemplary embodiment of a set divided into maximum and minimum numbers of subsets.

Referring now to exemplary FIG. 29, FIG. 29 may illustrate an example of how an algorithm may calculate a value range for a variable of a set. For example, the algorithm may determine a maximum and a minimum height, width, or depth of a dimension of a set. In an exemplary embodiment, the algorithm may use the total set width 2902 to calculate a maximum subset width 2904. Additionally, the algorithm may calculate a minimum subset width 2906. The determination of the maximum and minimum subset width may allow the algorithm to determine a maximum or minimum number of subsets each set can hold.

Figure 30:
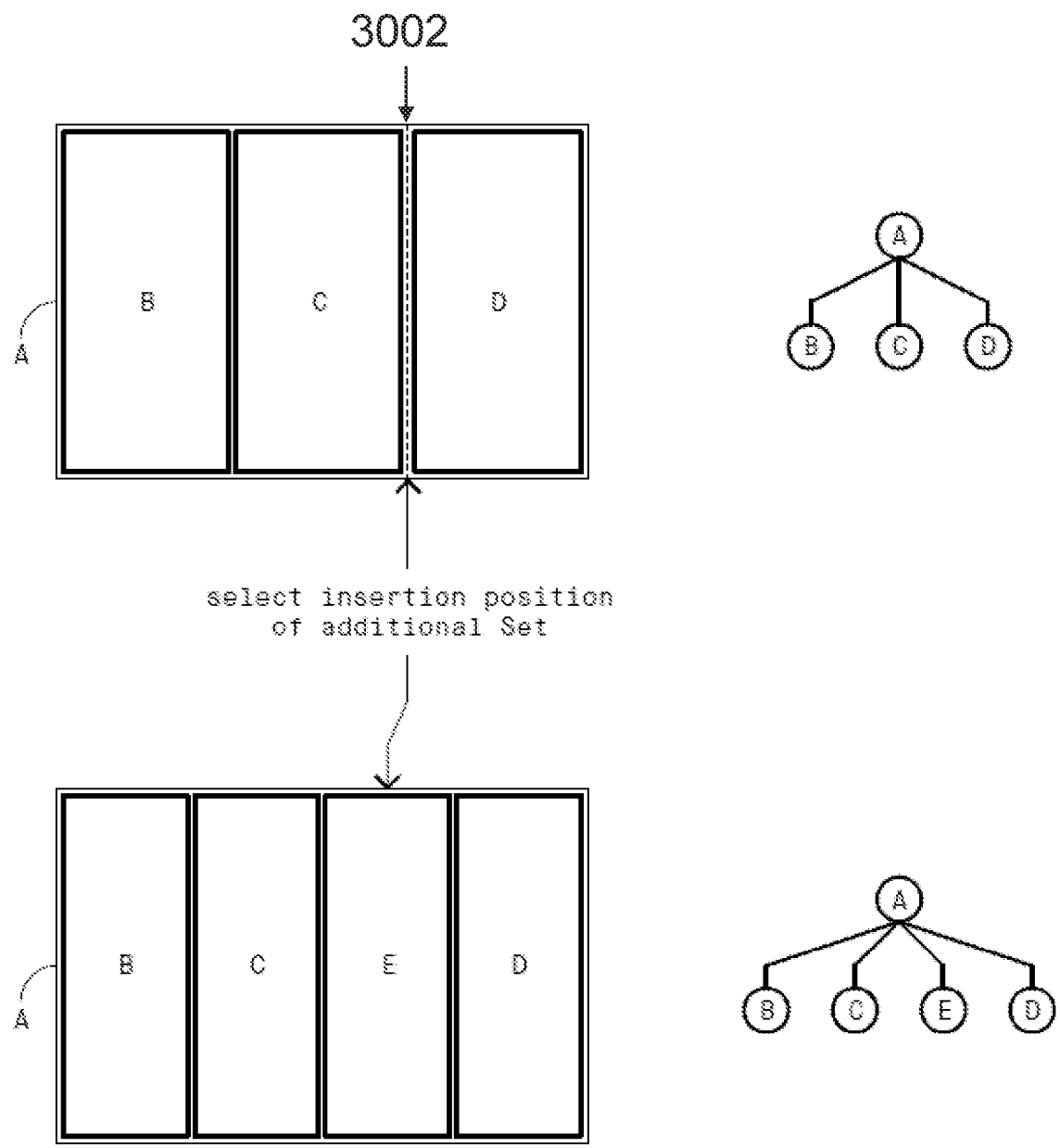
FIG. 30 shows an exemplary embodiment of a set insertion function.

Referring now to exemplary FIG. 30, the implementation of a set editing function may be illustrated. In this exemplary illustration, set A may have three subsets, and the user may add a fourth subset. It is understood that in this example and all subsequent examples of set editing functions and set generating functions, an automation algorithm may substitute for the user, where the parameters and decisions are probabilistically or heuristically determined. The user may click on the insertion position 3002 to select where the additional set is to be inserted. In this exemplary case, the user selected the insertion position 3002 between sets C and D, and an additional set E was added. It may be contemplated that the user may have chosen one of any number of possible insertion points, such as the point between sets B and C. If the user attempts to insert a set in a dimension where the maximum number of sets has already been reached, an error message may appear to explain to the user why the additional set may not be added. The algorithm may not add the additional set if the sum of the minimum widths for sets B, C, E, and D exceeds the width of set A.

Figure 31:
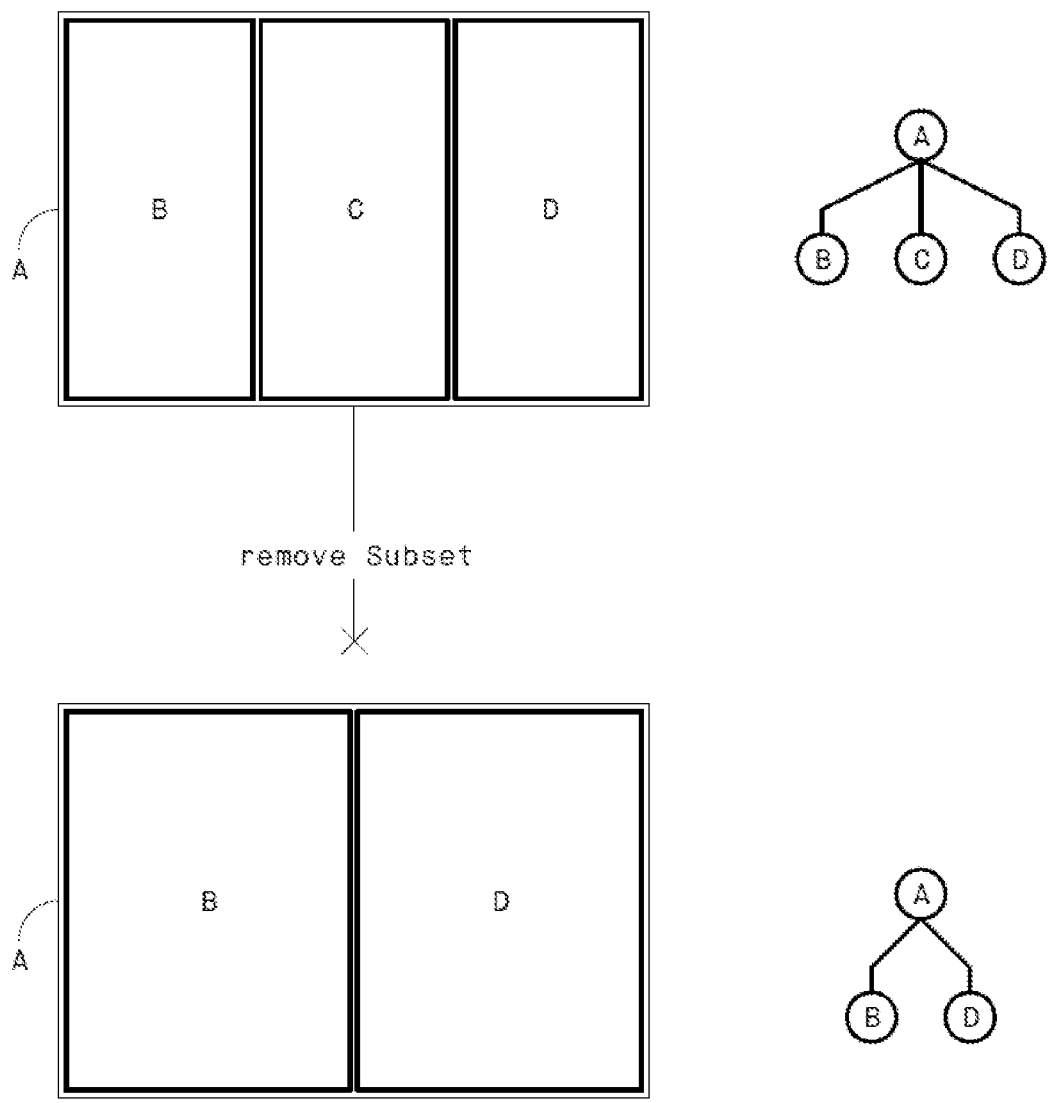
FIG. 31 shows an exemplary embodiment of a set deletion function.

Referring now to exemplary FIG. 31, an exemplary set editing function may be shown where a subset is removed from a set. The algorithm may take the subset to remove as the input. The user may select which subset is to be removed. In this exemplary embodiment, the user selected subset C to be removed. As a result, the algorithm removed subset C and increased the widths of subsets B and D so that their widths equal the width of the parent set A. Before removing set C, the algorithm may check if the maximum widths of the remaining sets B and D are equal to or greater than the width of set A. If the maximum widths of the remaining sets is less than that of the parent set, the selected subset may not be removed. Additionally, when a subset cannot be removed the algorithm may display an error message to inform the user of the anomaly.

Figure 32:
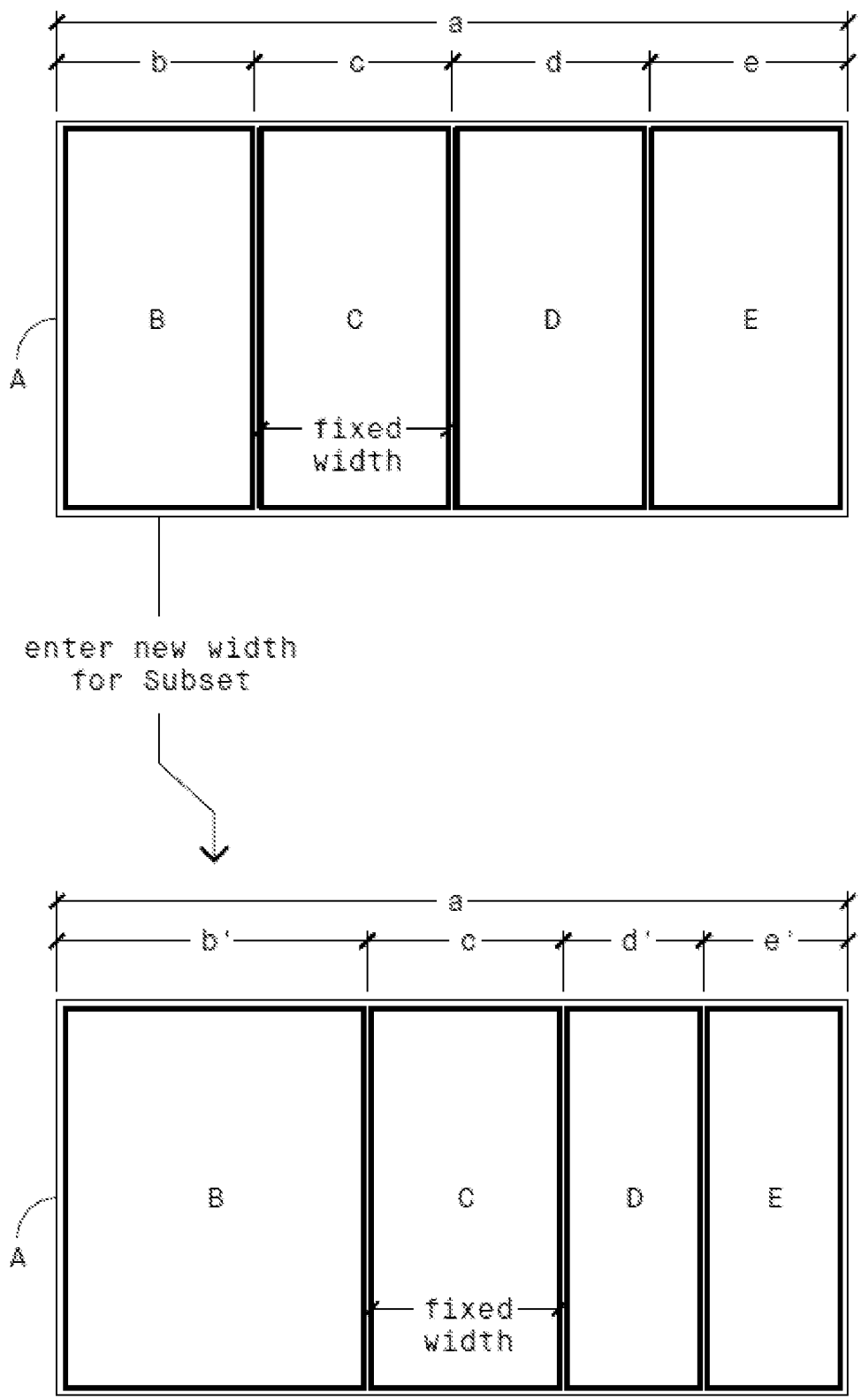
FIG. 32 shows an exemplary embodiment of a set editing function.

Referring now to exemplary FIG. 32, FIG. 32 may illustrate an example of a set editing function where one free dimension of a subset may be changed. The user may select a subset to change and input a new subset dimension. In this exemplary embodiment, sets B, C, D, and E may be subsets of set A. The user may enter a new width for set B, the width of set C may be fixed, and the widths of sets D and E may be variable. The algorithm may then calculate new widths for sets D and E, while changing the width for set B corresponding to the user input. The difference between the old value for the width of set B and the new value for the width of set B may be proportionally divided between the variable sets, in this case sets D and E.

Figure 33:
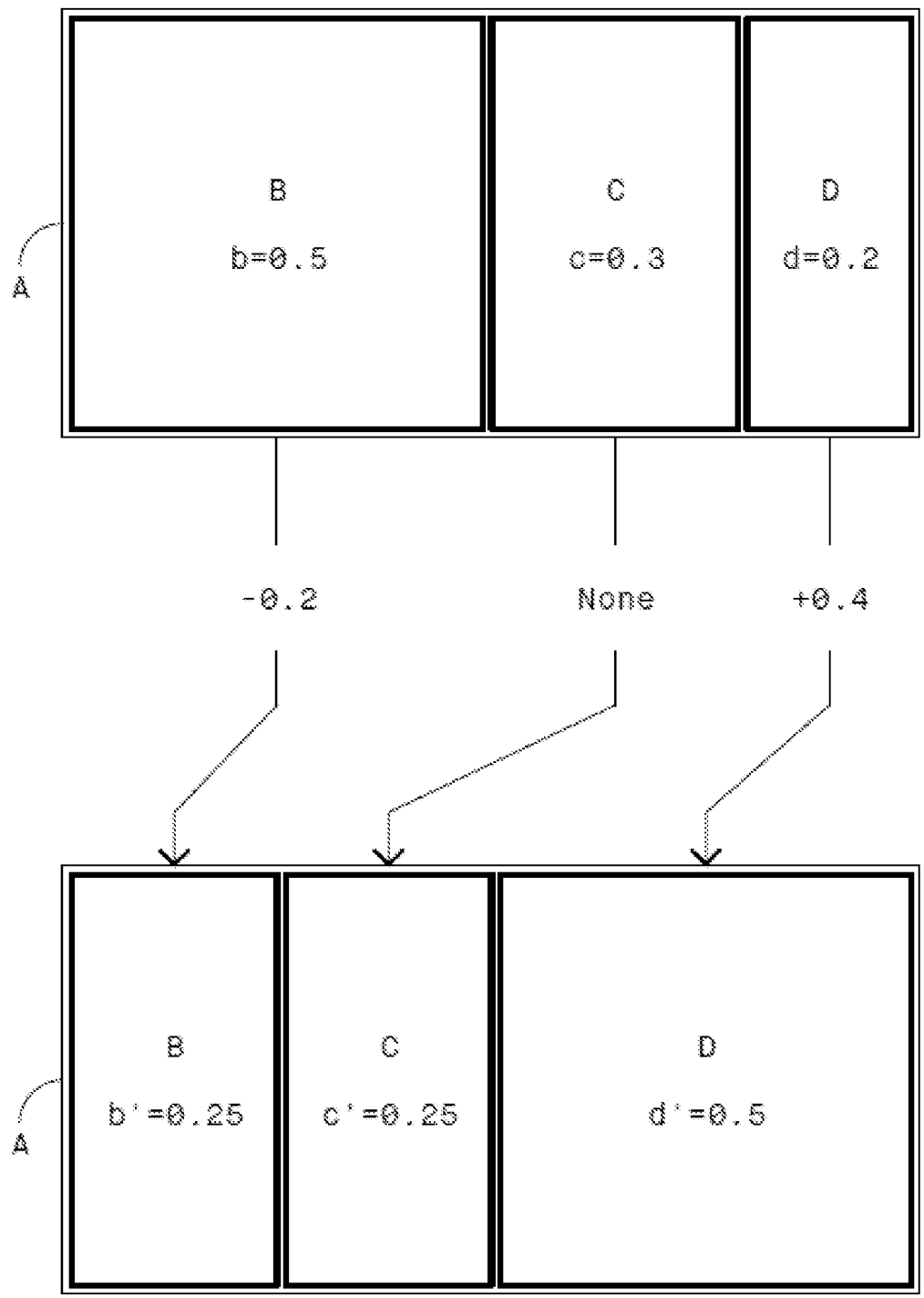
FIG. 33 shows an exemplary embodiment of a set editing function.

Referring now to exemplary FIG. 33, FIG. 33 may illustrate an exemplary set editing function where free dimensions of multiple subsets may be changed simultaneously. The user may select a set and may choose the dimensions of the subset to alter. In this exemplary embodiment, the widths of sets B, C and D are represented as fractions of the width of set A, where their combined proportions equal 1.0. New width values of any real number are either assigned to the sets or are calculated by adding these new width values to the previous width values as shown in this example. The array of ordered values is then normalized by the algorithm to generate values for sets B, C and D that are proportions of set A. In this exemplary embodiment, the width of set B is decreased by 0.2, the width of set C is not changed, and the width of set D is increased by 0.4. The resultant ordered array of values for sets B, C and D are 0.3, 0.3, and 0.6. As shown in the exemplary embodiment, the normalized values for the array of values are 0.25 (width of set B), 0.25 (width of set C), and 0.5 (width of set D). In another case, the user may change the free dimensions of multiple subsets sequentially. In this exemplary embodiment, the user selected sets B and D, and then chose to reduce the width of set B by 0.25 while increasing the width of set D by 0.3. The algorithm may then allocate any remaining space to the unselected variable widths, in this case the width of set C was reduced by 0.05. The user may select a ratio or proportion to reduce, for example by decreasing the width of set B by 0.25 or 25% of the total width. Alternatively, the user may reduce the dimensions directly, such as by selecting an option to reduce the width of set B by 0.25 feet.

Figure 34:
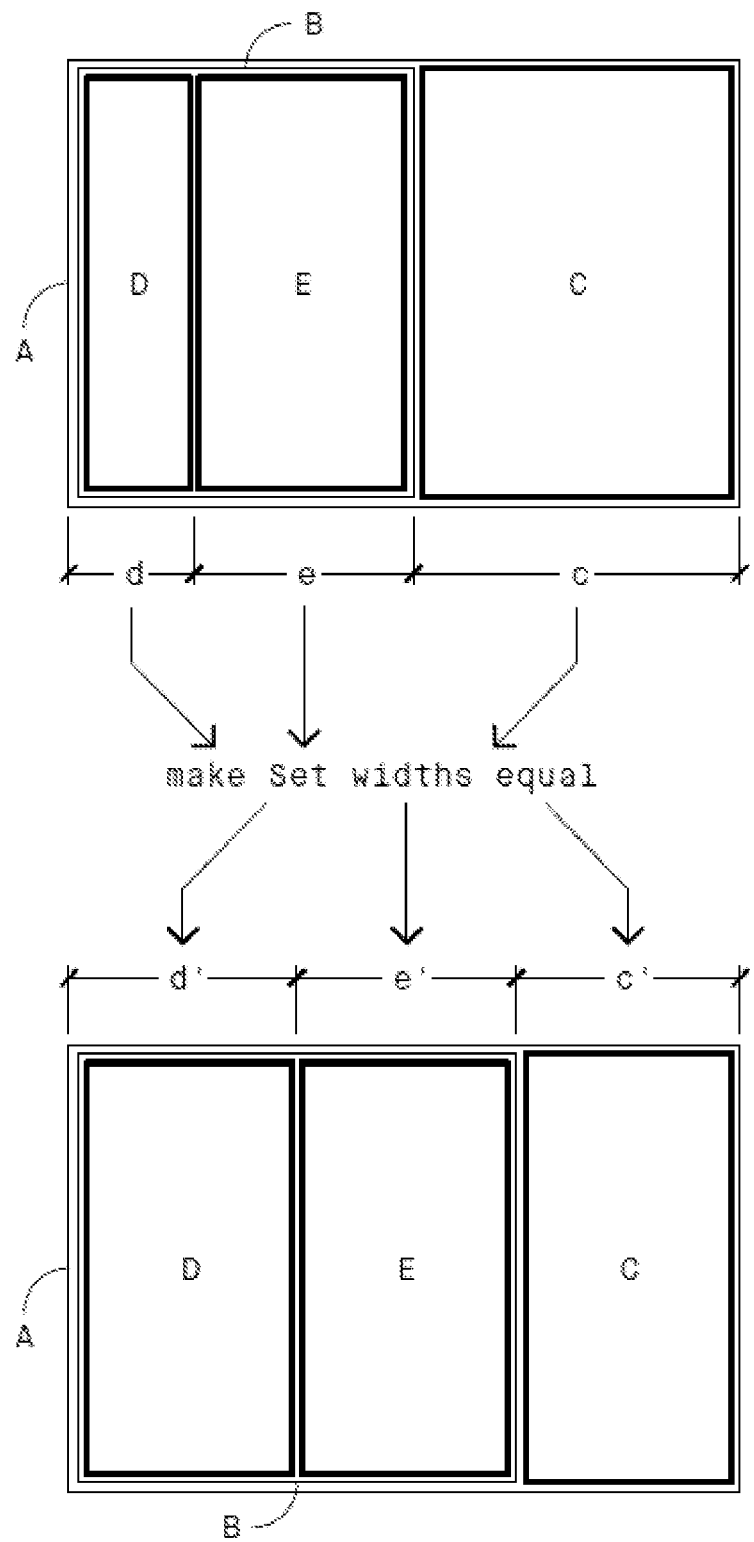
FIG. 34 shows an exemplary embodiment of a set editing function.

Referring now to exemplary FIG. 34, FIG. 34 may illustrate an exemplary set editing function where the widths of multiple sets within a network of sets are made equal. The user may select multiple sets, and the algorithm may automatically set the network of sets to have equal widths. In the exemplary embodiment illustrated in FIG. 34, the user may select D, E, and C, and the algorithm may allocate equal widths for each of the selected sets.

Figure 35:
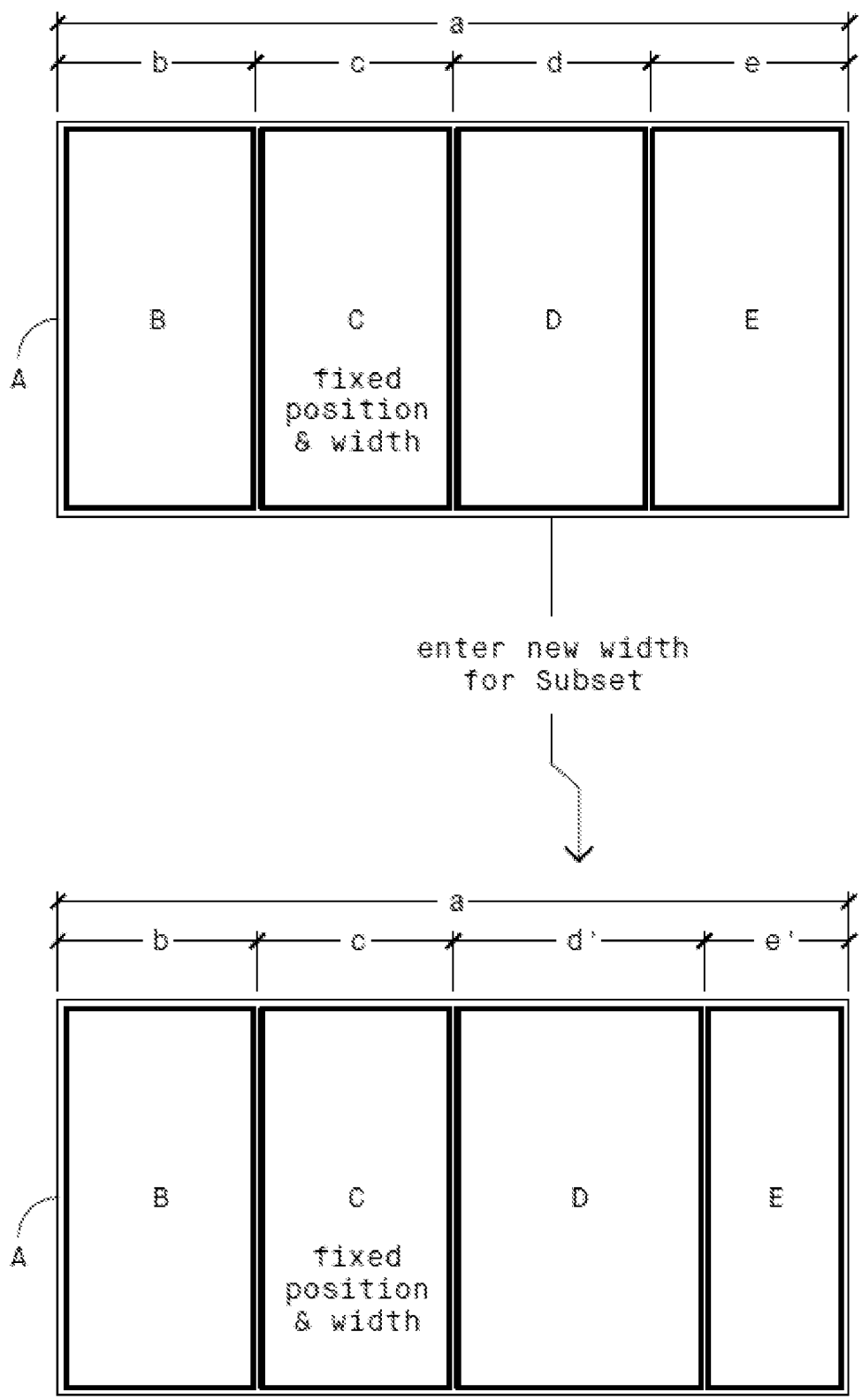
FIG. 35 shows an exemplary embodiment of a set editing function.

Referring now to exemplary FIG. 35, FIG. 35 may illustrate an exemplary set editing function which may change the free dimension of a subset while the position and width of another subset of the same set is fixed. The function may take the set to change and the new value for the set as inputs. In this exemplary embodiment, sets B, C, D, and E are subsets of A, and the position and width of set C is fixed. When the width of set D is changed, the width of set B may stay the same because altering the width of set B may change the position of set C. As a result, the width of set E is the sole dimension which is reduced to compensate for the extension of the width of set D.

Figure 36:
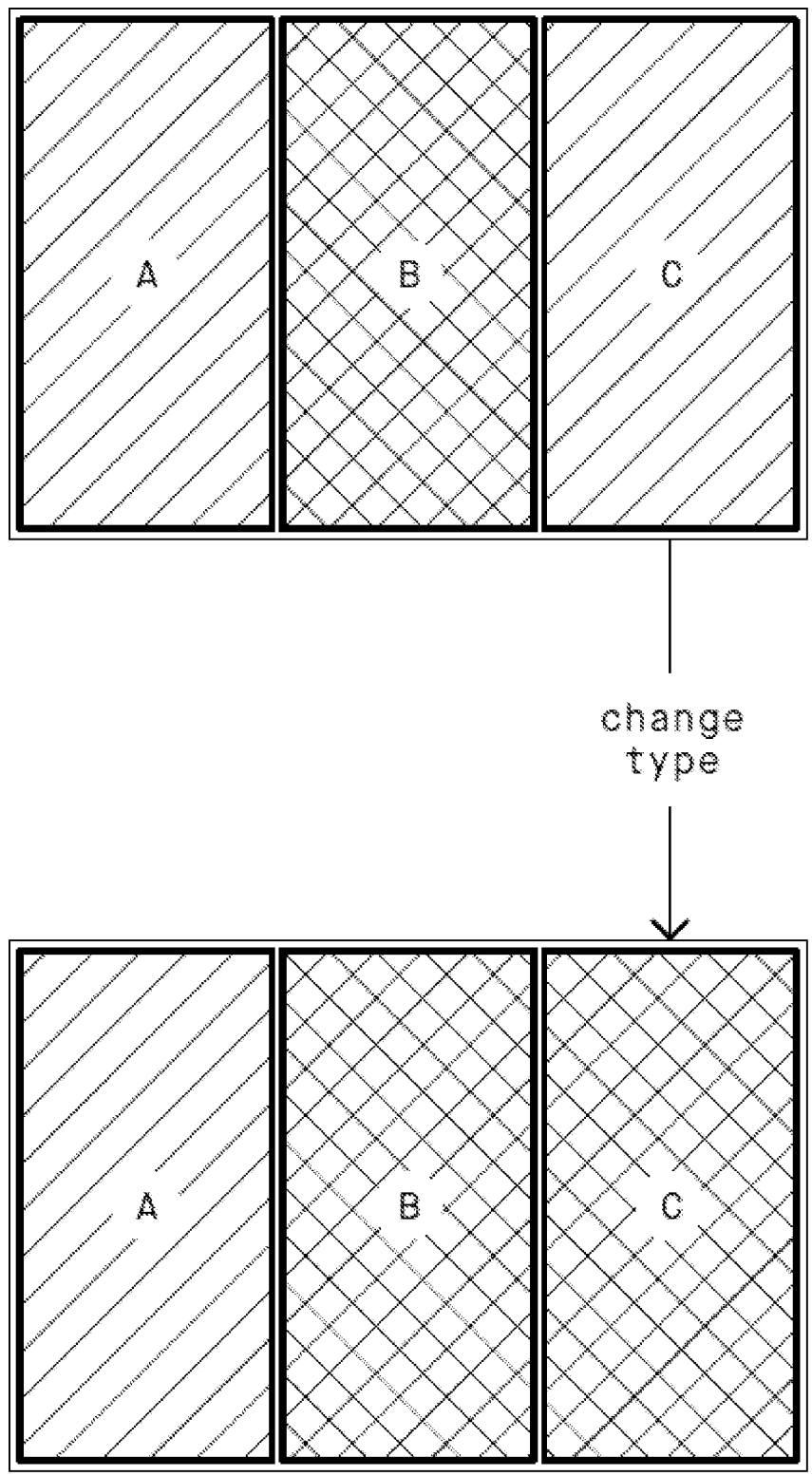
FIG. 36 shows an exemplary embodiment of a set editing function.

Referring now to exemplary FIG. 36, FIG. 36 may illustrate an exemplary set editing function which may change a non-dimensional variable of a set. A user may select a set to change, and then may select a variable to change as well as the new type or value of the variable. In this exemplary embodiment, the type of material of set C is changed.

Figure 37:
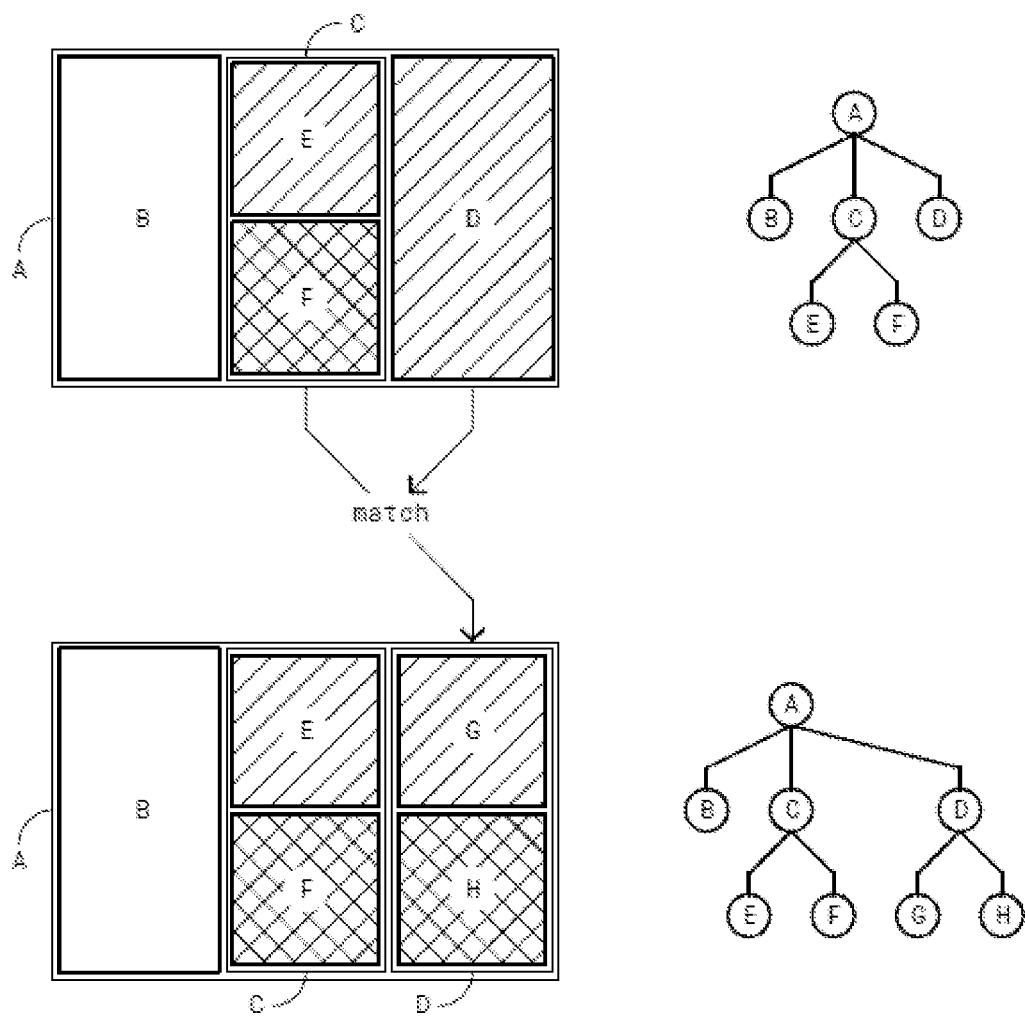
FIG. 37 shows an exemplary embodiment of a set editing function.

Referring now to exemplary FIG. 37, FIG. 37 may illustrate an exemplary set editing function which may replace dimensional and/or non-dimensional parameters of a set with parameters copied from another set. In the exemplary embodiment illustrated in FIG. 37, the dimensions of set C, consisting of subsets E and F, are copied over to set D. As a result, set D may have the same subsets as set C, and may further include the same materials, widths, and heights. The algorithm may not copy all parameters and subsets from the reference set to the target set. The algorithm may copy as many subsets and parameters as possible. For instance, if the width of set D is fixed, the algorithm might copy subsets and their materials and heights, but not widths.

Figure 38:
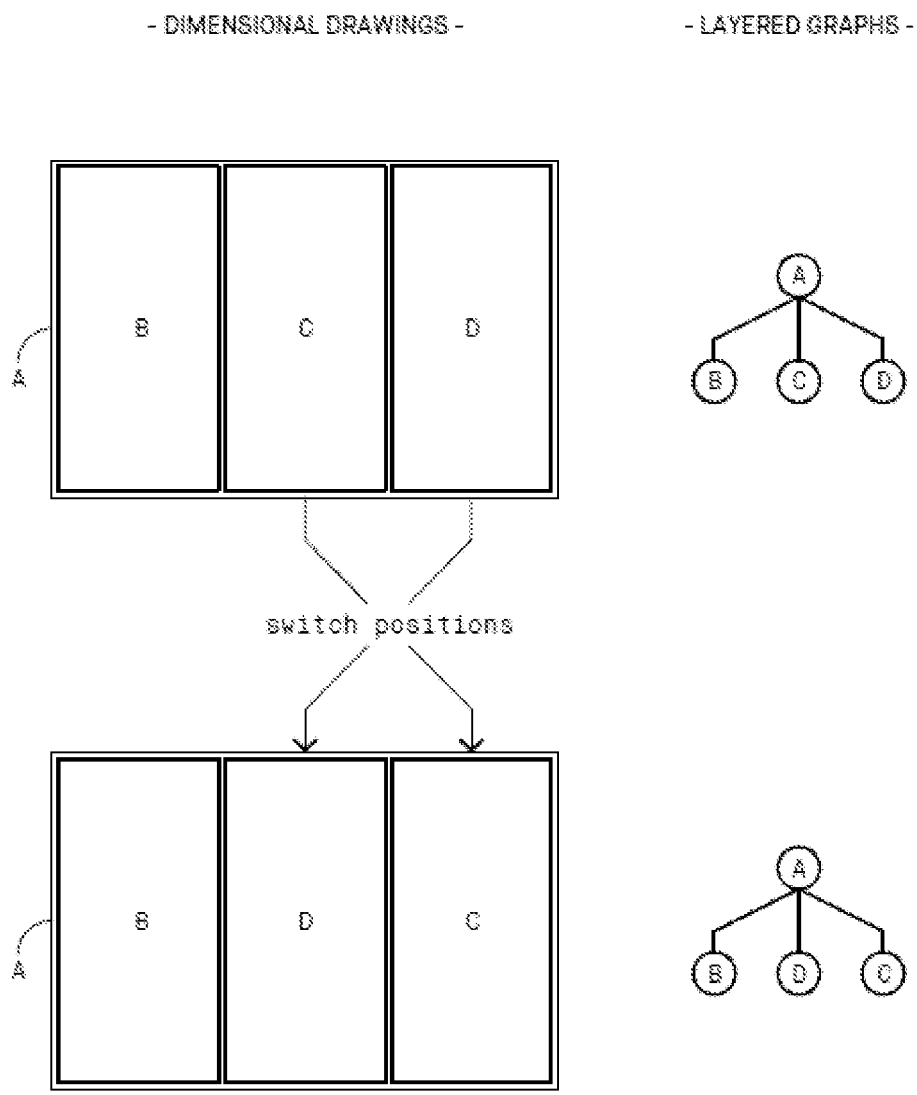
FIG. 38 shows an exemplary embodiment of a set editing function.

Referring now to exemplary FIG. 38, FIG. 38 may illustrate an exemplary set editing function which may change or swap the positions of sets within a network. A user may select one or more sets and select one or more new positions for those sets. In the exemplary embodiment illustrate by FIG. 38, the user selected sets C and D and switched their positions such that set C was now in the position set D previously occupied, and vice-versa.

Figure 39:
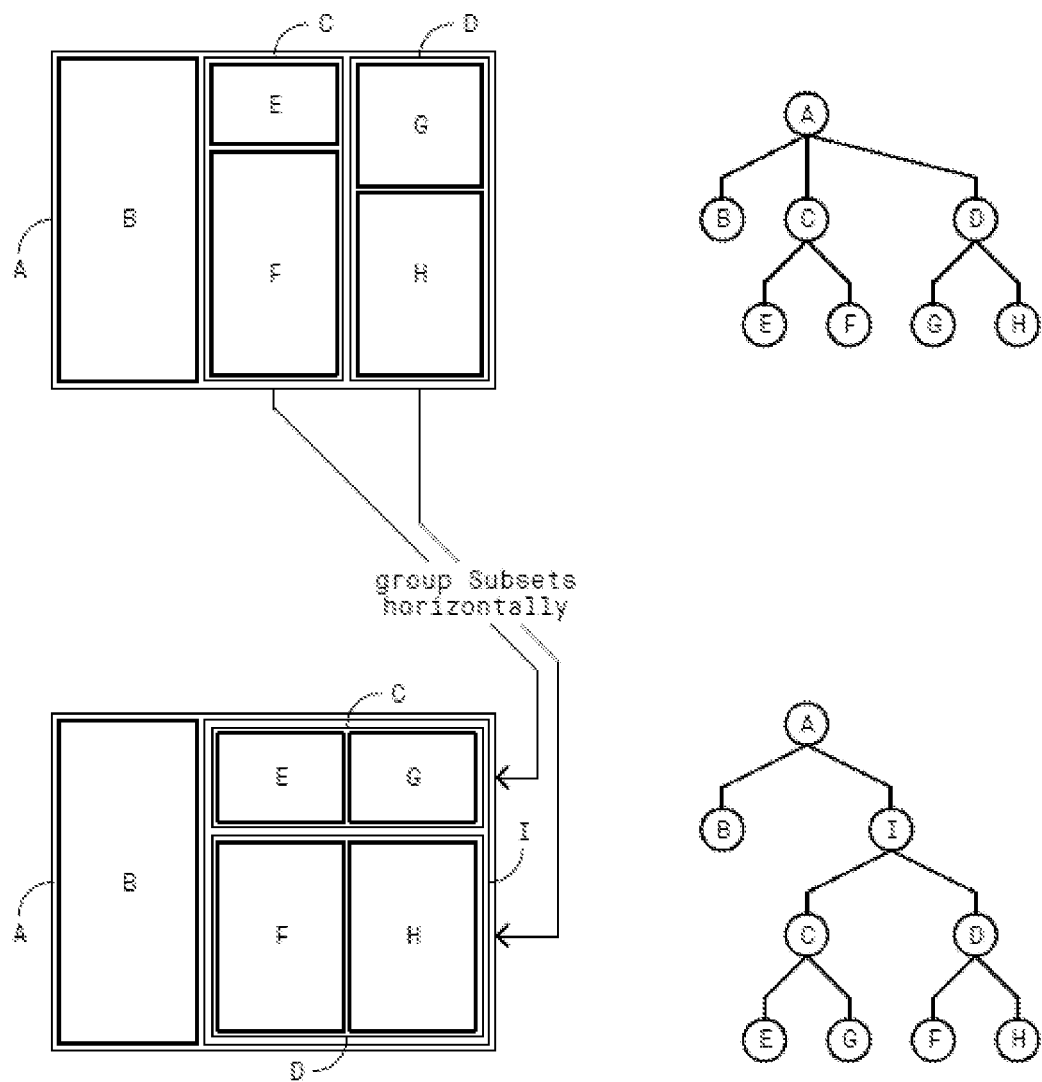
FIG. 39 shows an exemplary embodiment of a set editing function.

Referring now to exemplary FIG. 39, FIG. 39 may illustrate an exemplary set editing function which may group neighboring sets. Multiple sets which are near each other may be selected by a user and may be grouped to become one set which may share some dimensions. In this specific exemplary embodiment, set C contains subsets E and F, and set D contains subsets G and H. Sets F and H are selected and grouped together, such that they may share the same height. Further, sets E and G may be selected and grouped together such that they share the same height.

Figure 40:
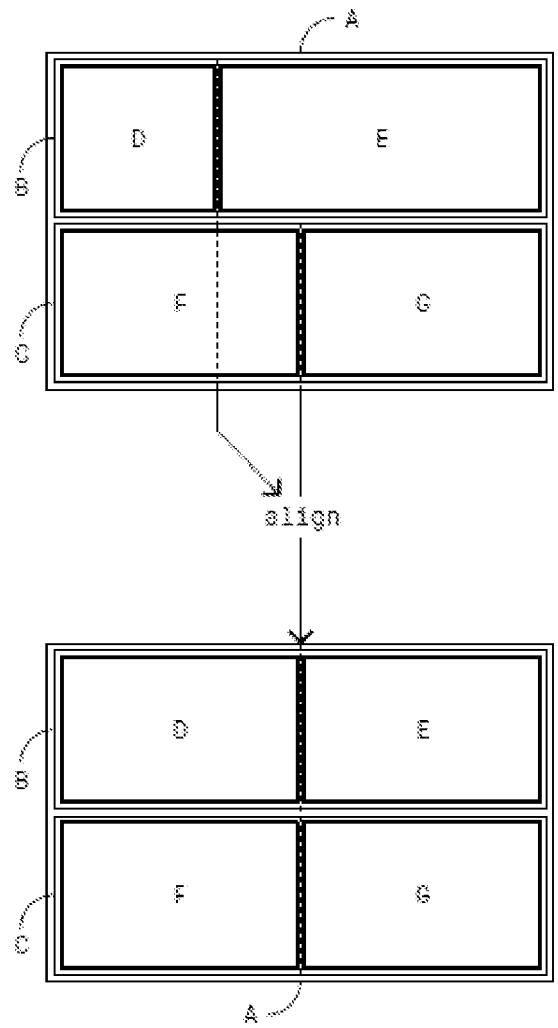
FIG. 40 shows an exemplary embodiment of a set editing function.

Referring now to exemplary FIG. 40, FIG. 40 may illustrate another exemplary set editing function which may align the division between sets or subsets. A user may select a dividing line between two sets, and may select another dividing line to line it up with. In the exemplary embodiment illustrated in FIG. 40, the dividing line between sets D and E is selected and aligned with the dividing line between sets F and G.

Figure 41:
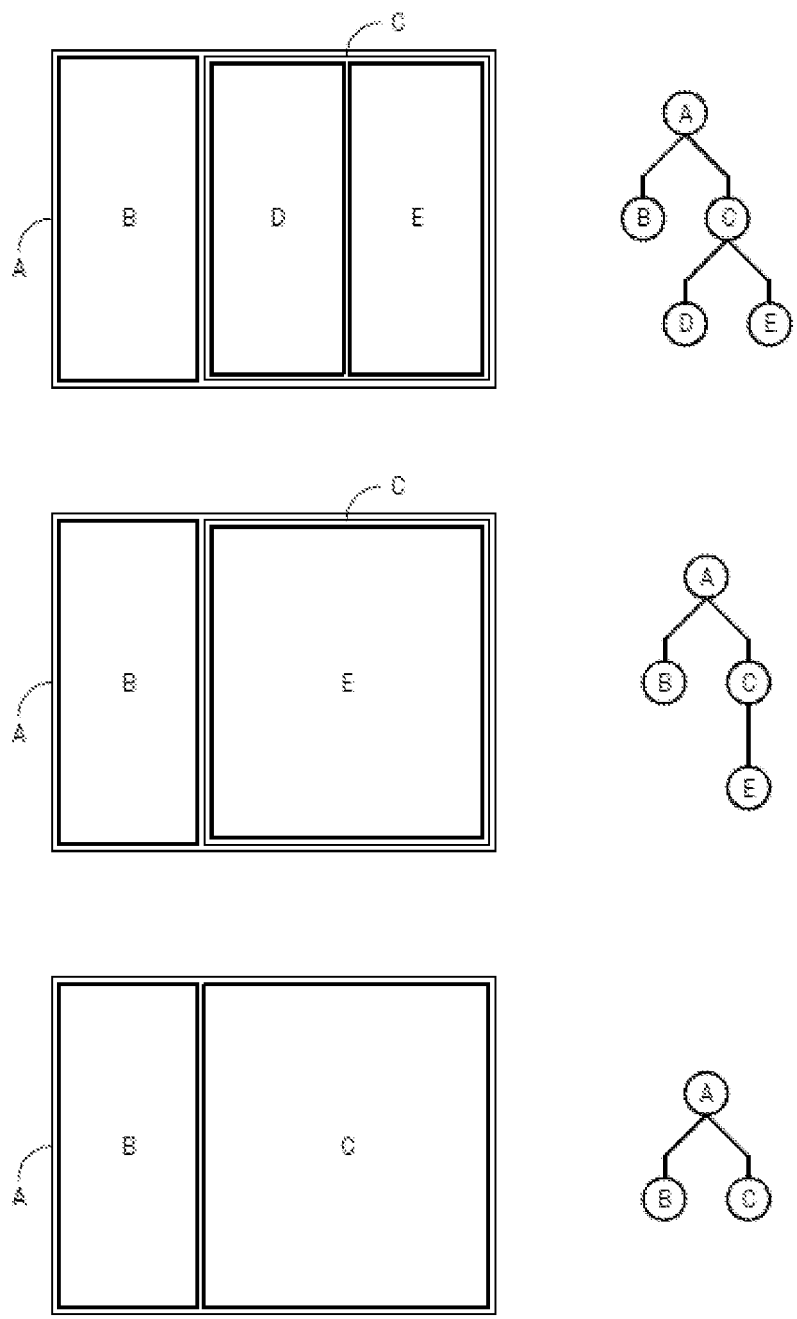
FIG. 41 shows an exemplary embodiment of a set editing function.

Referring now to exemplary FIG. 41, FIG. 41 may illustrate a graph optimization function. In this example, subset D was removed from set C. As a result, set C had just one subset, set E. The graph optimization function may then remove subset E since it may be the only remaining subset of set C, and its dimensions may equal those of set C.

Figure 42:
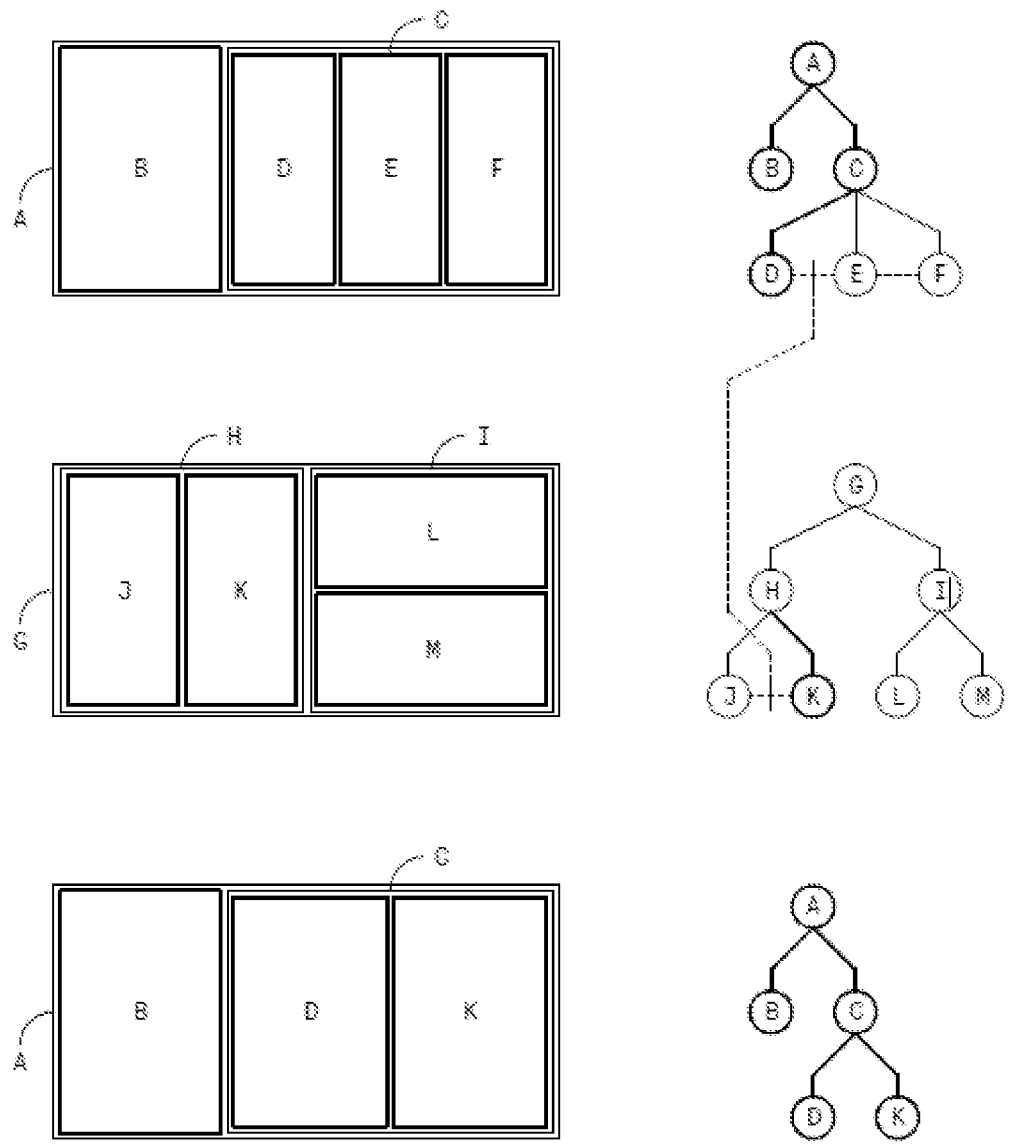
FIG. 42 shows an exemplary embodiment of a set editing function.

Referring now to exemplary FIG. 42, FIG. 42 may illustrate an exemplary set editing function (one point crossover set generator function of a genetic algorithm) which may generate a new set by splitting two input sets and combining one portion of the first input set with a portion of a second input set. The function may take one input set, a crossover point from the first input set, a second input set, and a crossover point from the second input set as inputs. In this specific exemplary embodiment, the first input set (set A) may have two ordered subsets (sets B and C). Set C may have three ordered subsets D, E, and F. The second input set (set G) may have two ordered subsets (sets H and I). Sets H and I may each have two ordered subsets. The first crossover point may be between neighboring sets D and E. The second crossover point may be between the neighboring sets J and K. The output may be a new set, a copy of set A, with ordered subsets (copies of sets B and C), where the copy of set C has two ordered subsets (copies of sets D and K).

Figure 43:
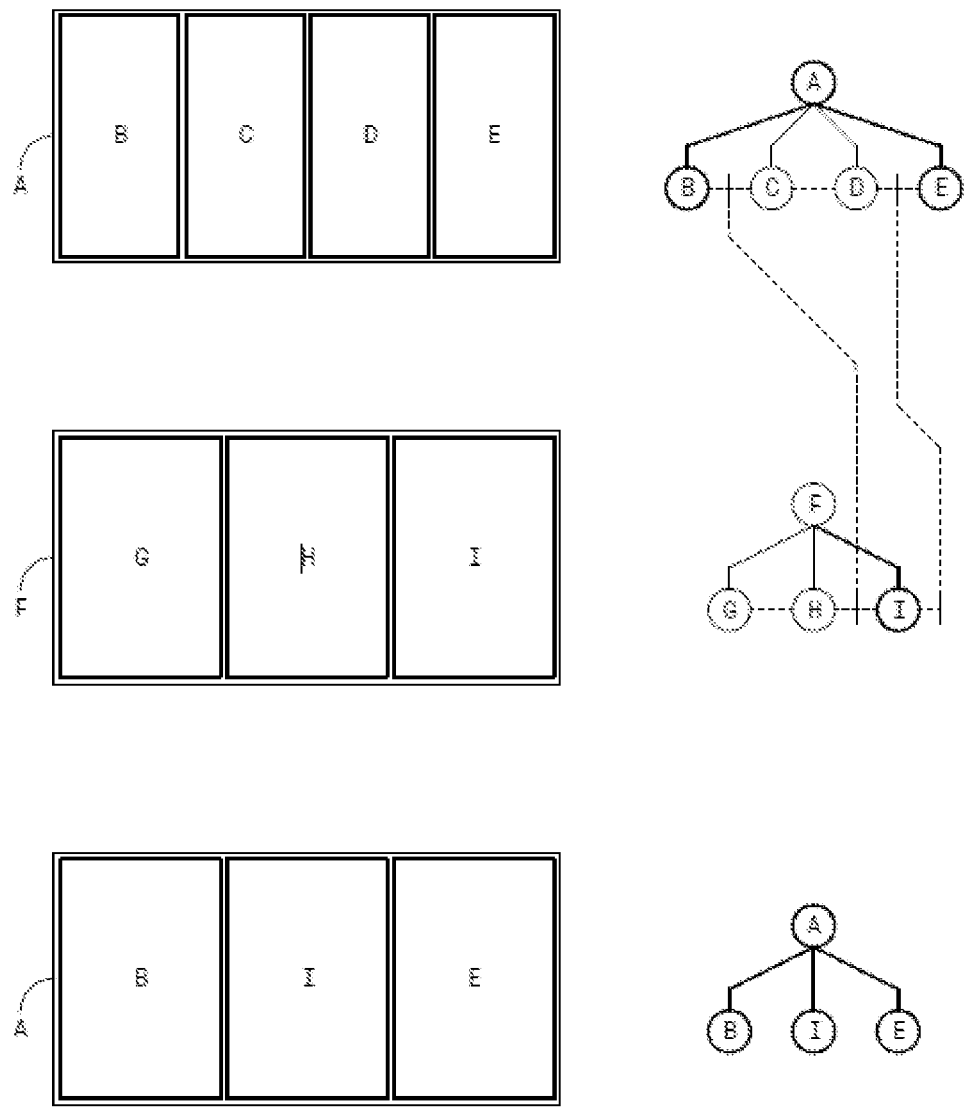
FIG. 43 shows an exemplary embodiment of a set editing function.

Referring now to exemplary FIG. 43, FIG. 43 may illustrate an example of a set editing function (two point crossover set generator function of a genetic algorithm) which may generate a new set by splitting two input sets and combining portions of the first input set with portions of a second input set. In this exemplary embodiment, the function may take one input set, multiple crossover points from the first input set, a second input set, and multiple crossover points from the second input set as inputs. In this example, the first input set (Set A) has four ordered subsets (Sets B, C, D, & E), and the second input set (Set F) has three ordered subsets (Sets G, H, & I). Crossover points for the first set are between B & C and Sets D & E. Crossover points for the second set are between Sets H & I and after Set I. The output may be a new set (a copy of Set A) with ordered subsets (copies of Sets B, I, & E). Other exemplary set generator functions with more than two crossover points may be considered.

Figure 44:
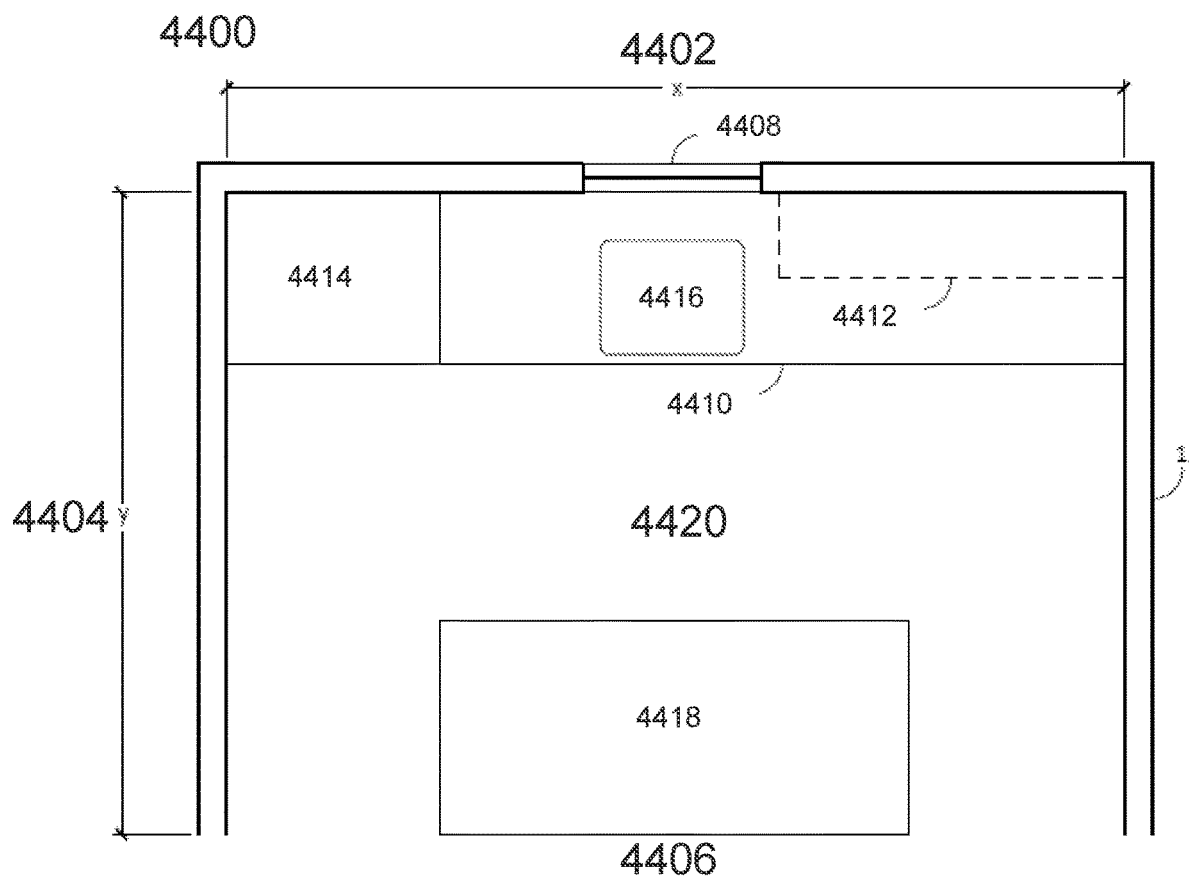
FIG. 44 shows an exemplary embodiment of a layout of a room.

Referring now to exemplary FIG. 44, FIG. 44 may illustrate an exemplary kitchen plan layout. The room for the kitchen design may have overall dimensions, such as a length 4402 and a width 4404 (x, y), an open side 4406, three walls, and one window in one of the walls 4408. The kitchen design may include base cabinet units 4410, wall cabinet units 4412, an appliance 4414 and a sink 4416 along the wall with the window. It may also include kitchen island cabinets 4418, an aisle 4420 between the kitchen wall and kitchen island, and aisles between the kitchen island and side walls.

Figure 45:
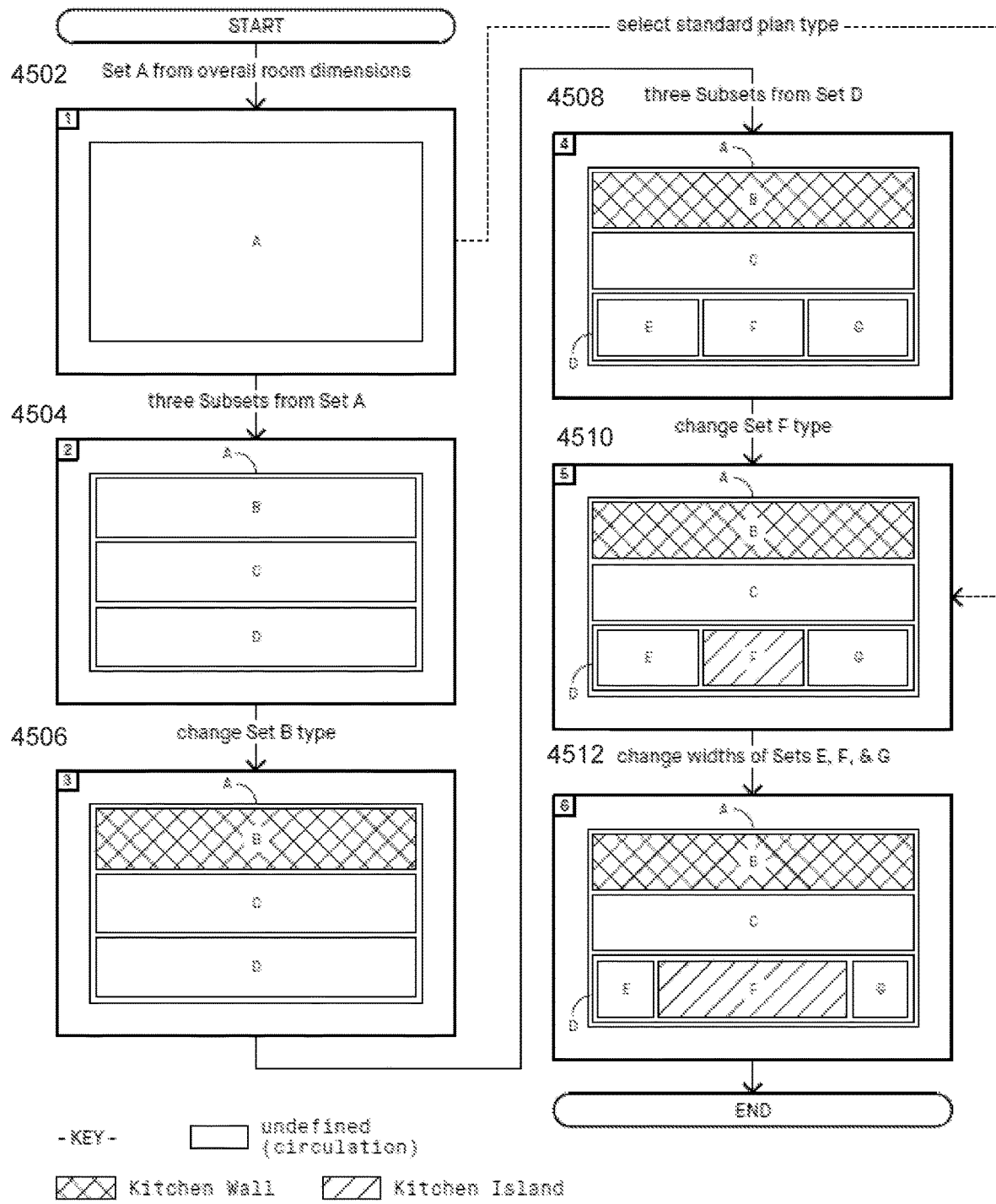
FIG. 45 shows an exemplary method for generating a layout of a room.

Referring now to exemplary FIG. 45, FIG. 45 may illustrate an exemplary method for generating the kitchen plan layout design shown in FIG. 44. The method may generate and edit a network of sets, shown here as dimensional drawings. First, the overall room may be shown 4502 as set A, where the width may be equal to the x-dimension of the space and the height may be equal to the y-dimension of the space. Next, the space (Set A) divided into three zones 4504 (Sets B, C, & D as ordered subsets of Set A). In a next step, the type parameter of Set B (zone along the wall with the window) may be changed 4506, such as to 'Kitchen Wall'. In a next exemplary step, a set, set D (zone next to the room edge open to another space) in this case, may be divided into three zones 4508 as ordered subsets (Sets E, F, & G). Further, the type parameter of Set F may be changed 4510, such as to 'Kitchen Island' in this exemplary embodiment. In a next exemplary step, new width parameters may be set 4512 for the sets. In this exemplary embodiment, the widths of sets E, F, & G were changed. Alternatively, the previous steps may be skipped by selecting a standard kitchen plan layout type from a list of standard pre-programed kitchen plan layouts.

Figure 46:
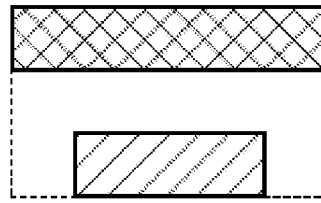
FIG. 46 shows an exemplary embodiment of pre-programmed layout types.
Figure 46:
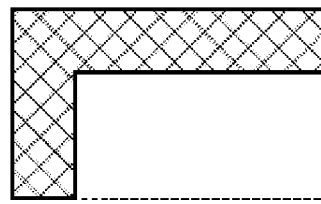
Figure 46:
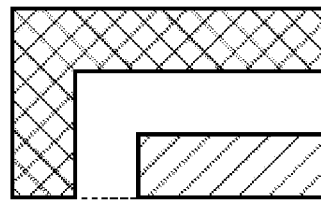
Figure 46:
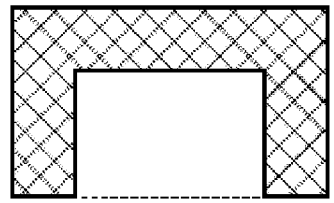

Referring now to exemplary FIG. 46, FIG. 46 may illustrate exemplary pre-programmed subsets. These subsets may allow for completely pre-programmed kitchen plan layout types. By using pre-programmed kitchen plan layouts or sets, the user may save time by decreasing the number of required steps in generating a kitchen plan layout design. Additionally, the pre-programmed sets may be examples of room designs that may be subsets of networks of sets representing floor plan configurations of buildings. The pre-programmed kitchen plan layouts may have relative and standard free dimension parameters that enable conformity with the overall room dimensions of a set.

Figure 47:
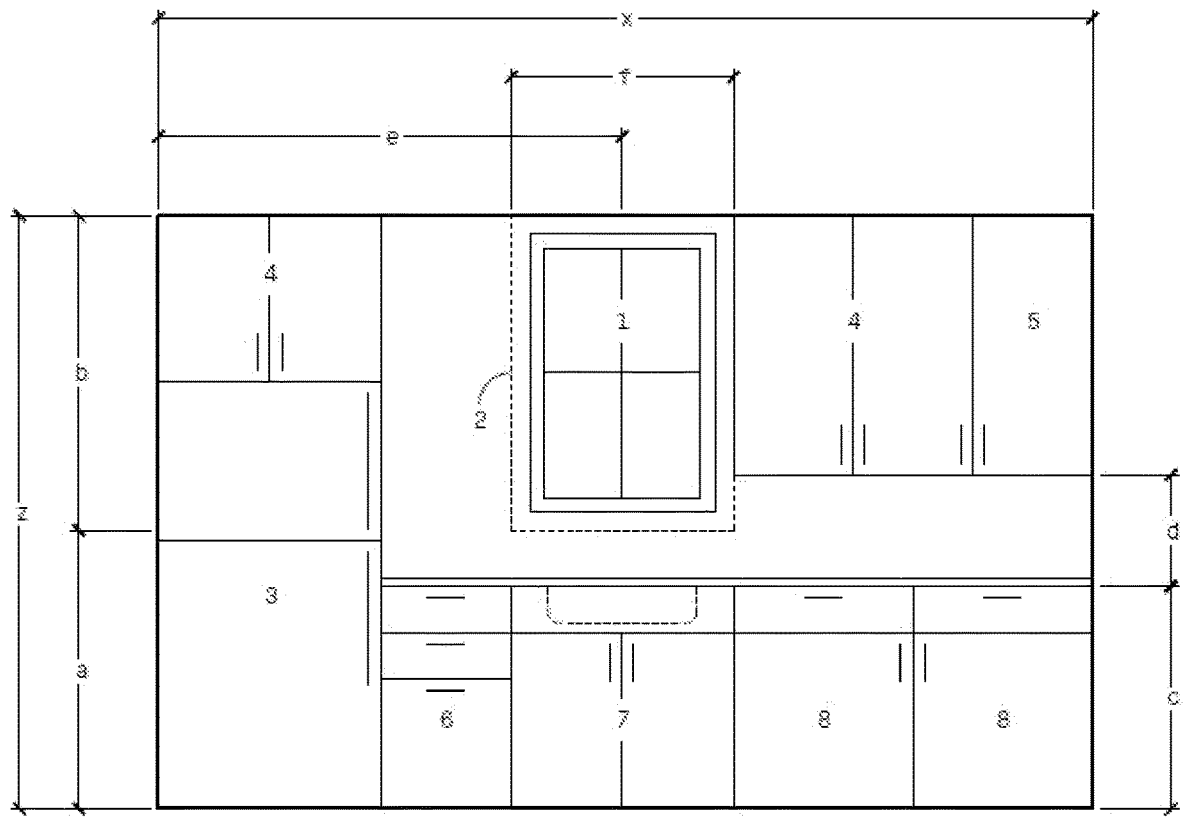
FIG. 47 shows an exemplary embodiment of a wall layout.

Referring now to exemplary FIG. 47, FIG. 47 may illustrate an example of a kitchen wall layout. The wall may have overall dimensions such as a width and a height (x, z). The wall may have one window of a user-defined size. The wall may include an appliance, cabinet units, base units, a sink base cabinet unit with doors, two base cabinet units with doors and drawers, and a work area above the base cabinet units.

Figure 48A:
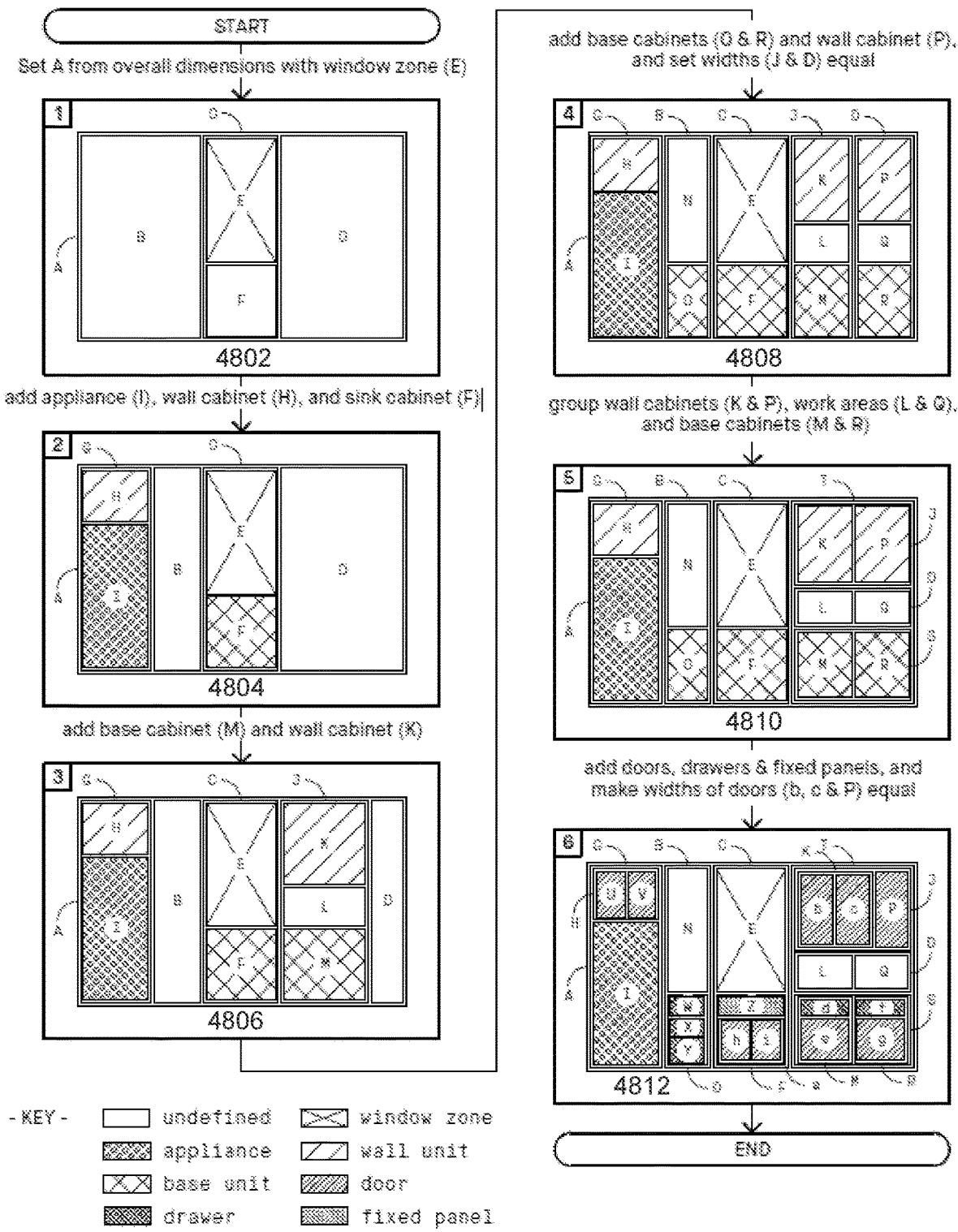
FIG. 48A shows an exemplary embodiment of a method for generating a wall design layout.
Figure 48B:
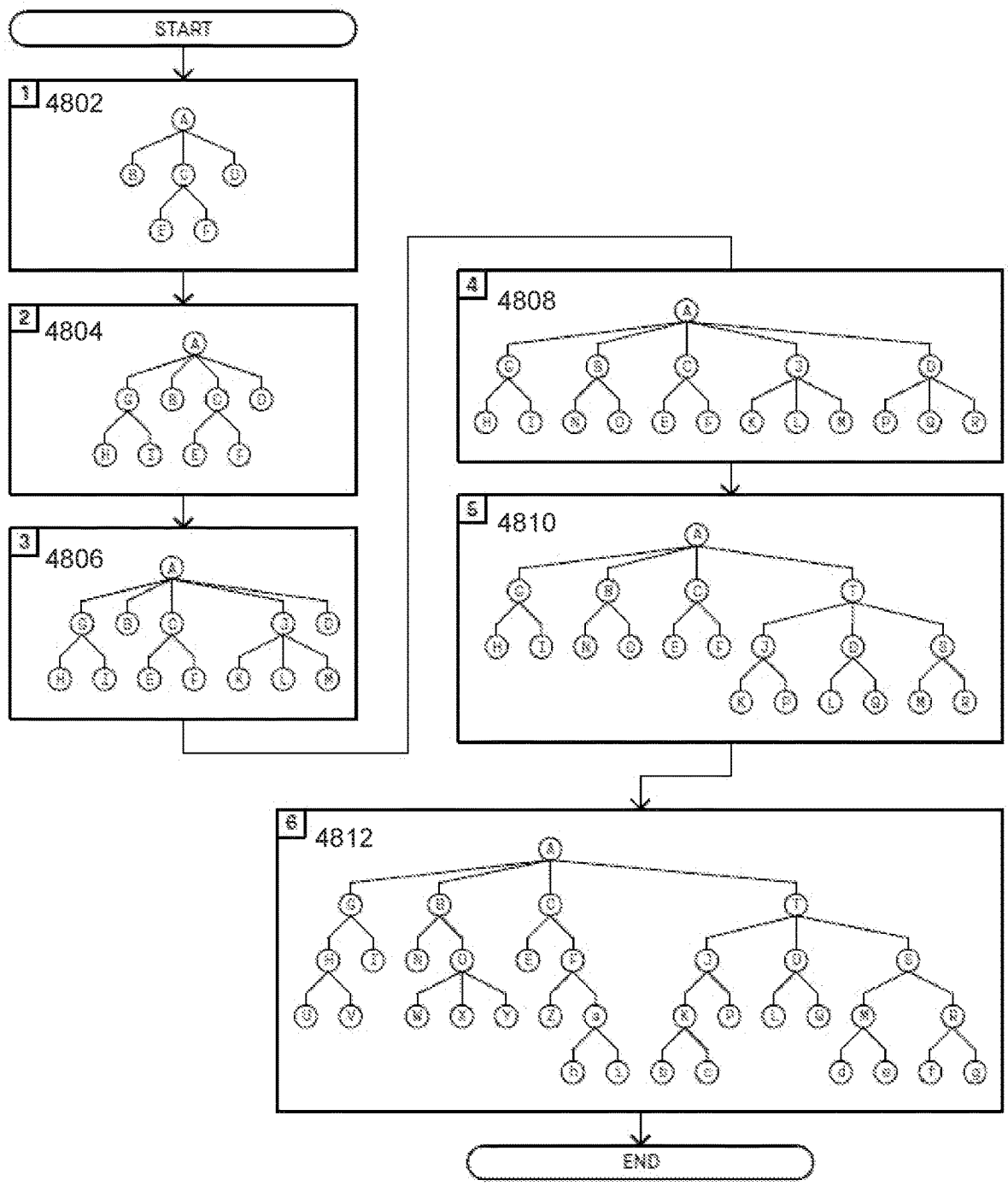
FIG. 48B shows an exemplary embodiment of a method for generating a wall design layout.

Referring now to exemplary FIGS. 48A and 48B, FIGS. 48A and 48B may illustrate an exemplary method for manually generating the kitchen wall design shown in FIG. 47. FIG. 48A may illustrate the method using dimensional drawings, while FIG. 48B may illustrate the method using layered graphs. In an exemplary first step, the algorithm may create a new set A with a width equal to the x dimension of the space and a height equal to the z-dimension of the space 4802. Set A may be divided into ordered subsets, such as subsets B, C, and D in the example illustrated here. Set C may be a column with fixed position and width parameters and may be divided into two subsets, E and F. Set E may denote the window zone with a fixed height parameter. In a next exemplary step, additional appliances and cabinet units may be added 4804. In another exemplary step, columns may be added with wall units and base units 4806. These may be added to the network of sets. In a next exemplary step, wall units work areas and base units may be grouped 4808. In a next exemplary step, doors, drawers, and fixed panels may be added to the network of sets 4810. In a final exemplary step, the widths of doors represented by sets b, c, and P may be made equal. The algorithm computes new width values for sets b, c, P, and K (parent set of sets b and c), so that widths of sets b, c, and P are equal, and the sum of the widths of sets P and K equal the width of their parent set, set J.

Figure 49:
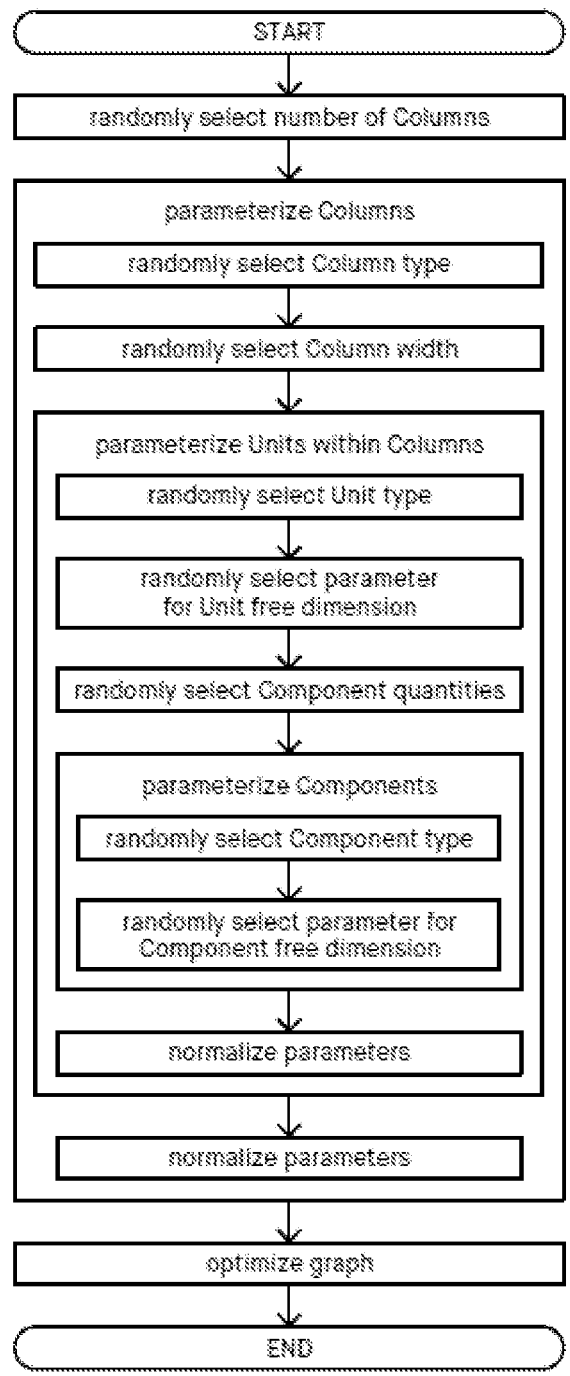
FIG. 49 shows an exemplary embodiment of a method for generating a set.

Referring now to exemplary FIG. 49, FIG. 49 may illustrate an exemplary method for automatically generating a set by calling set editing functions. In this example, components, units, columns, and kitchen walls may be sets with ranges of dimensional and non-dimensional parameters particular to those set types. Components may be subsets of units, and units may be subsets of columns. Parameters for these sets may be randomly selected from domains of possible values. The probability that any one value within a range of possible values may be selected may be weighted to increase the odds that some values may be selected over others. Optimal weights may be selected by the programmer of the algorithm, calculated from variable values entered by a user, or may be determined using machine learning algorithms. In this exemplary embodiment, a kitchen wall set may be generated using predetermined overall dimensions. The layered graphs of the kitchen wall may be normalized and optimized for efficient analysis and future set editing. Networks of sets may be automatically generated using heuristic algorithm(s), metaheuristic algorithm(s) and/or optimization algorithm(s).

Figure 50:
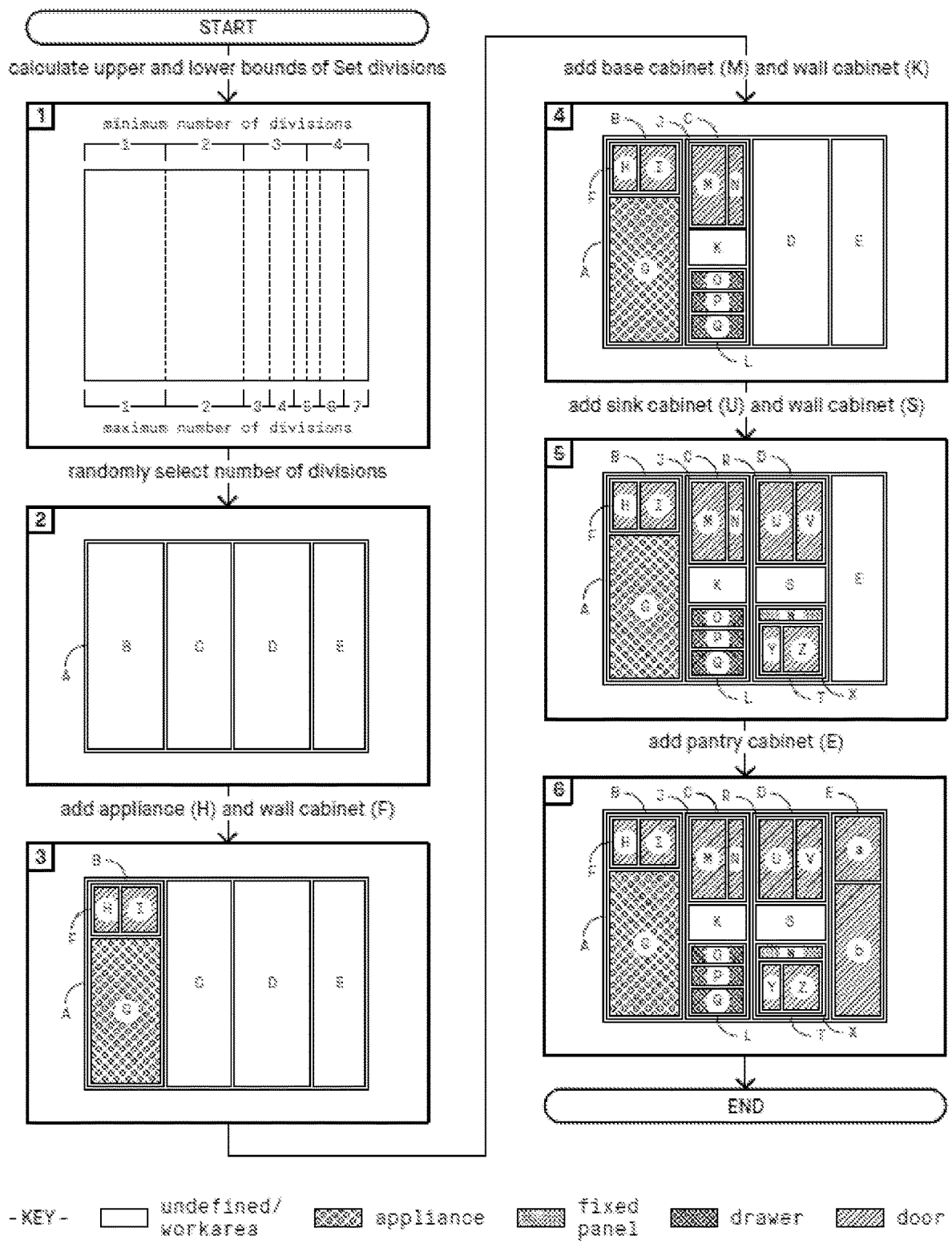
FIG. 50 shows an exemplary embodiment of a method for generating a wall design layout.

Referring now to exemplary FIG. 50, FIG. 50 may illustrate an exemplary kitchen wall design systematically generated by the method described in FIG. 49. In this example, some of the weights used in the random selection of unit types and other parameters may be determined by user defined values such as the overall dimensions of the wall and the required number of appliances. Heuristics may be integrated to efficiently generate acceptable design solutions. For instance, Set G in this example may be a required appliance, and only one appliance may be allowed. When iterating through the subsets of Set A, the probability that the appliance will be added to any given subset is the index value of the subset within the array of sets divided by the number of subsets, guaranteeing the inclusion of the appliance in the network of sets. The algorithm may adjust selection weights throughout the generation. For example, when an appliance is added to the network of sets, the probability another appliance will be added may be adjusted to zero, guaranteeing the exclusion of solutions with multiple appliances.

Figure 51:
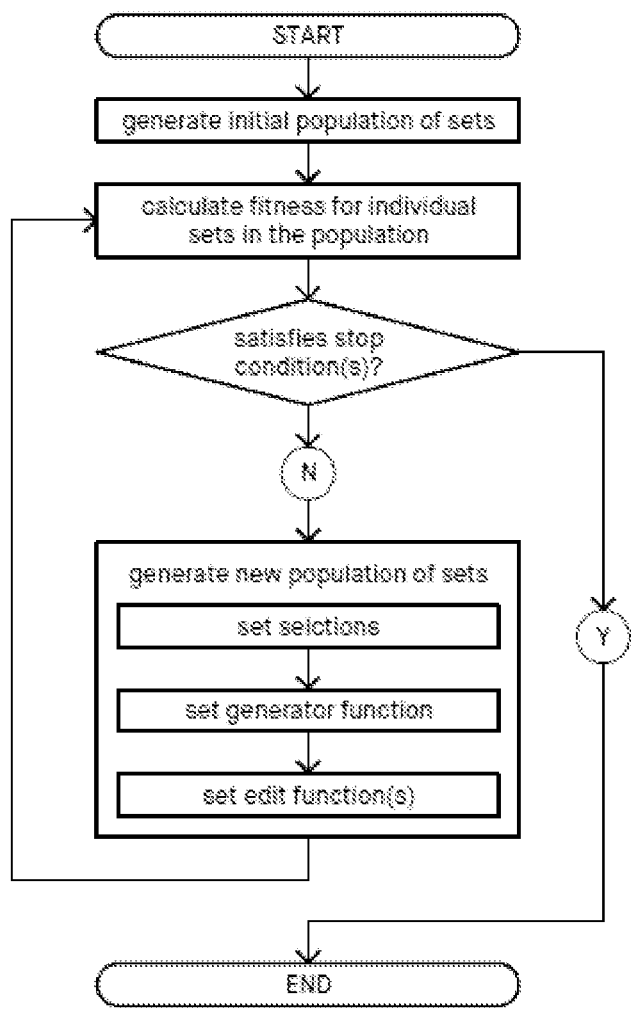
FIG. 51 shows an exemplary embodiment of a method for automatically generating set designs.

Referring now to exemplary FIG. 51, FIG. 51 may illustrate the utilization of a genetic algorithm for automatically generating and selecting set designs. Following this process, an initial population of individual sets may be automatically created with initial set generation function(s). Fitness scores for each individual set in the population may be calculated. A fitness score may be calculated from multiple factors weighted by user inputs, such as design aesthetic and functional requirements. An example design aesthetic may be the selection of a vertical appearance, resulting in networks of sets with narrow set proportions. In the example shown in FIG. 50, a functional fitness score may be higher for solutions with higher calculated continuous work area lengths. Another fitness function may be cost, when selected set types represent physical products with variable amounts of material and construction complexities.

Figure 52:
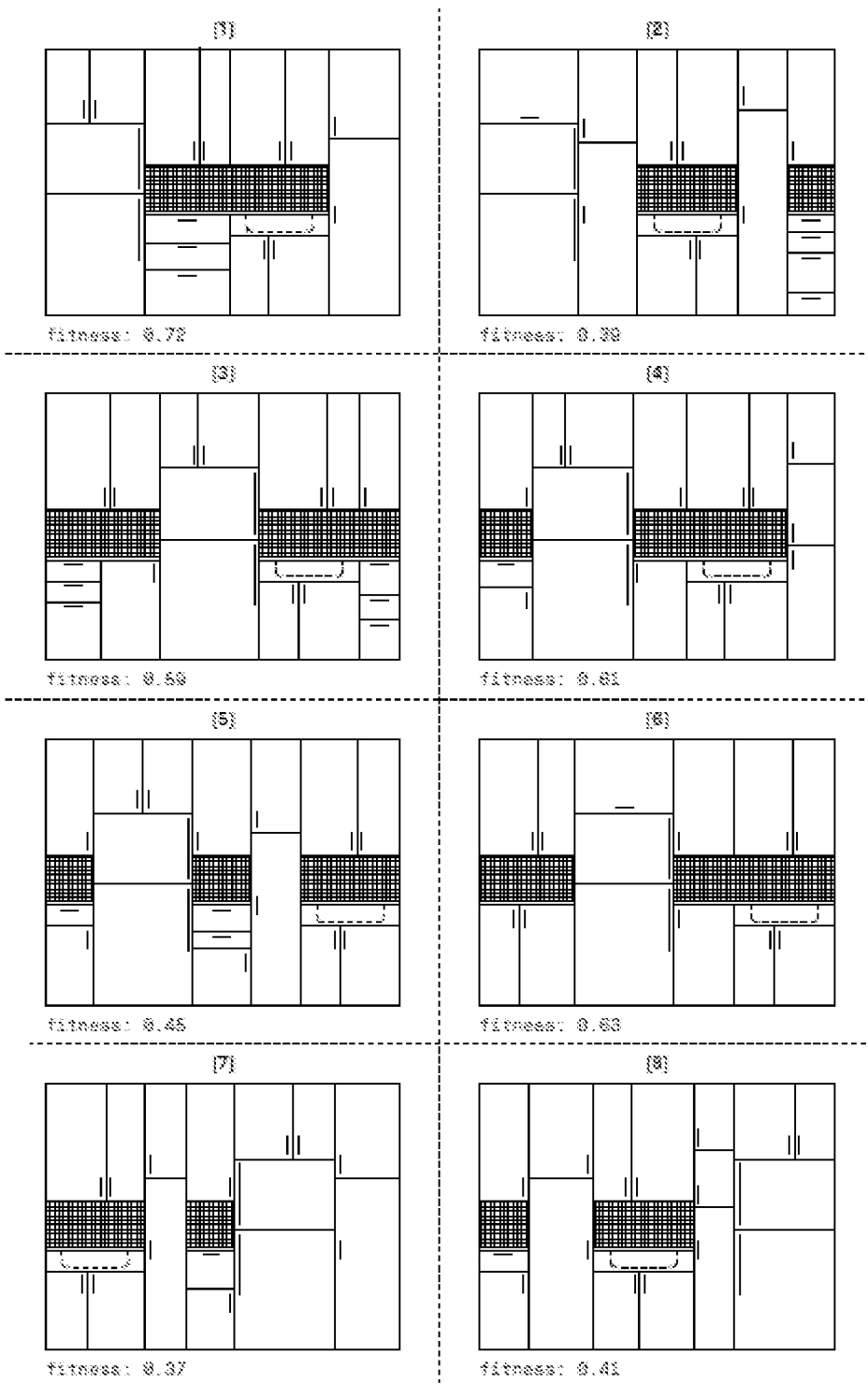
FIG. 52 shows an exemplary embodiment of different sets with individual fitness scores.

Referring now to exemplary FIG. 52, FIG. 52 may illustrate an example of a population of individuals with fitness scores. After calculating fitness scores of the population, the algorithm may decide to either end the process and return individual(s) from the current population, or generate a new population. Example factors for making this decision may include a limit on computing resource, a limit on number of generations, the presence of minimally viable design solution(s), or minimal differences in scores between current and previous populations. To generate new populations, the genetic algorithm may follow a process inspired by natural selection where a network of sets and parameters of the sets in the network may represent an individual's genotype, and the collection of units and their parameters associated with sets within the network of sets may represent the phenotype, and where new populations of networks of sets may be generated by selecting networks of sets from the previous generation. Each selection is probabilistically determined by the fitness scores of the phenotypes. The selected networks of sets and their parameters are modified with crossover and mutation operators, forming a new generation. In this example, the crossover and mutation operators of the genetic algorithm are the set generator and set editing functions.

Figure 53A:
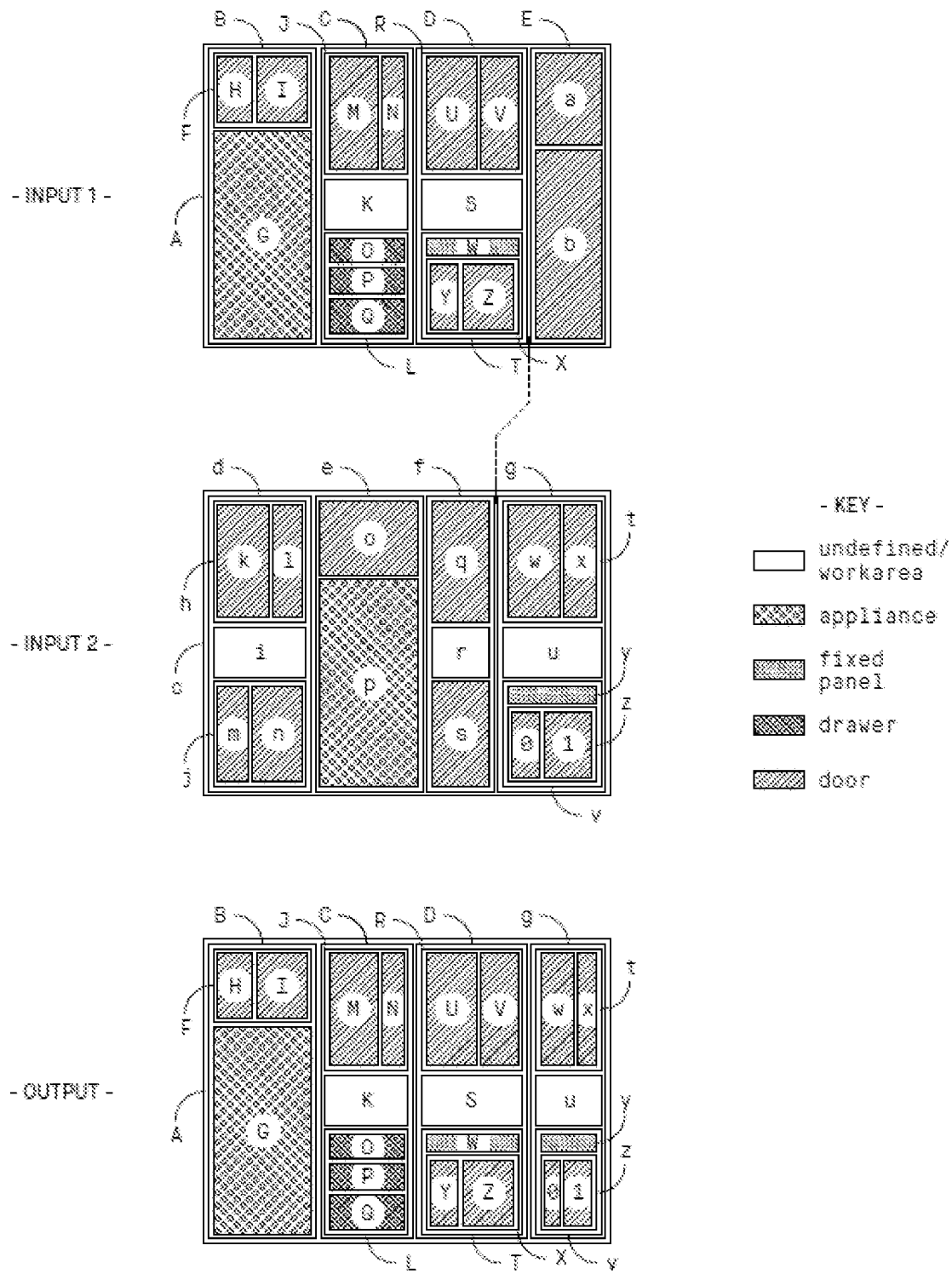
FIG. 53A shows an exemplary embodiment of a set generator function.
Figure 53B:
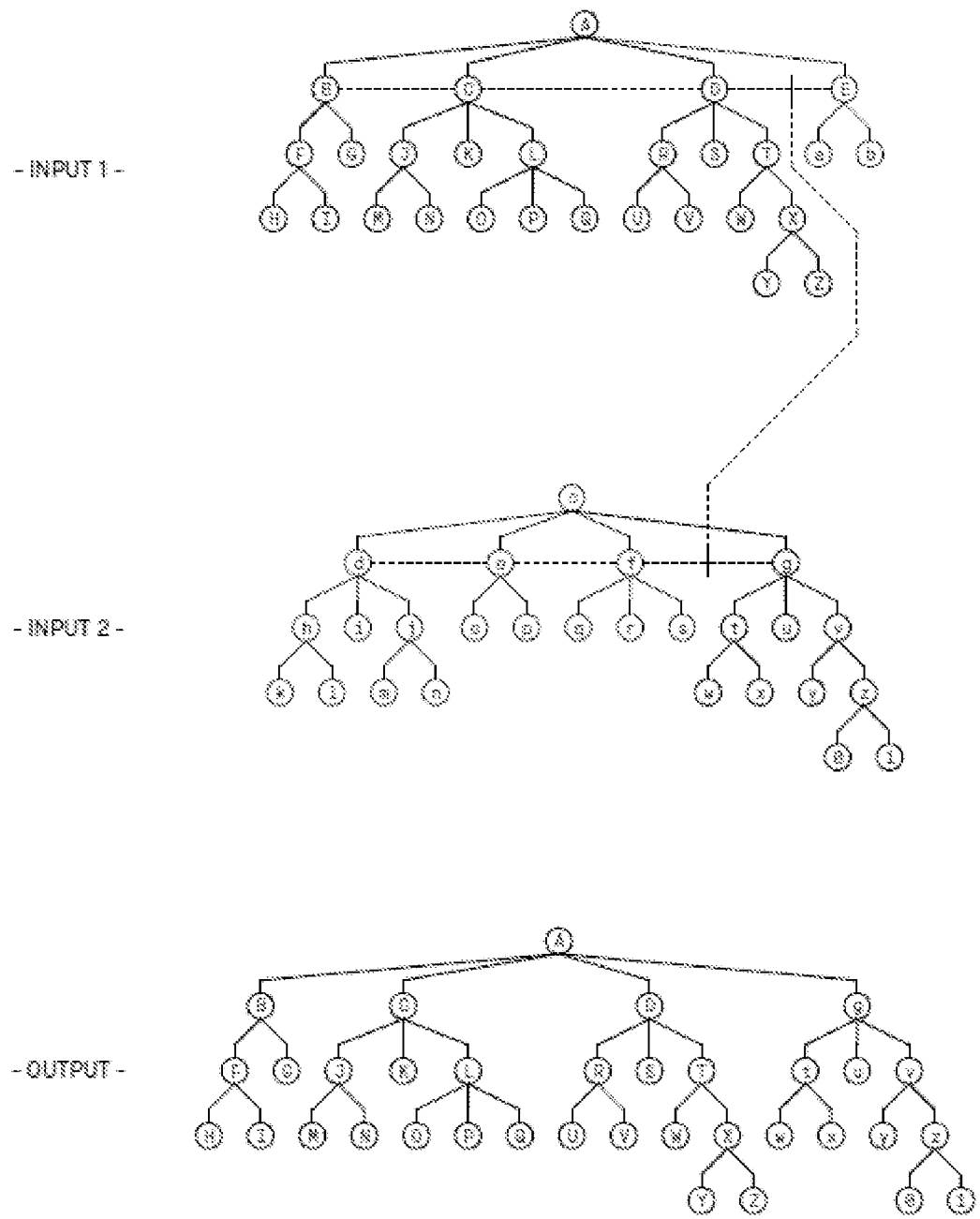
FIG. 53B shows an exemplary embodiment of a set generator function.

Referring now to exemplary FIGS. 53A and 53B, an implementation of a set generator function by a genetic algorithm may be shown. The generation of a kitchen wall set may come from one or more input sets. In this exemplary embodiment, the input sets may be selected from a population of sets. In this exemplary embodiment, the set generator function is a single point crossover function, similar to the set generator function illustrated in FIG. 42, where the crossover point of the first input set is between ordered sets D and E, and the crossover point of the second input set is between ordered sets f and g.

Figure 54:
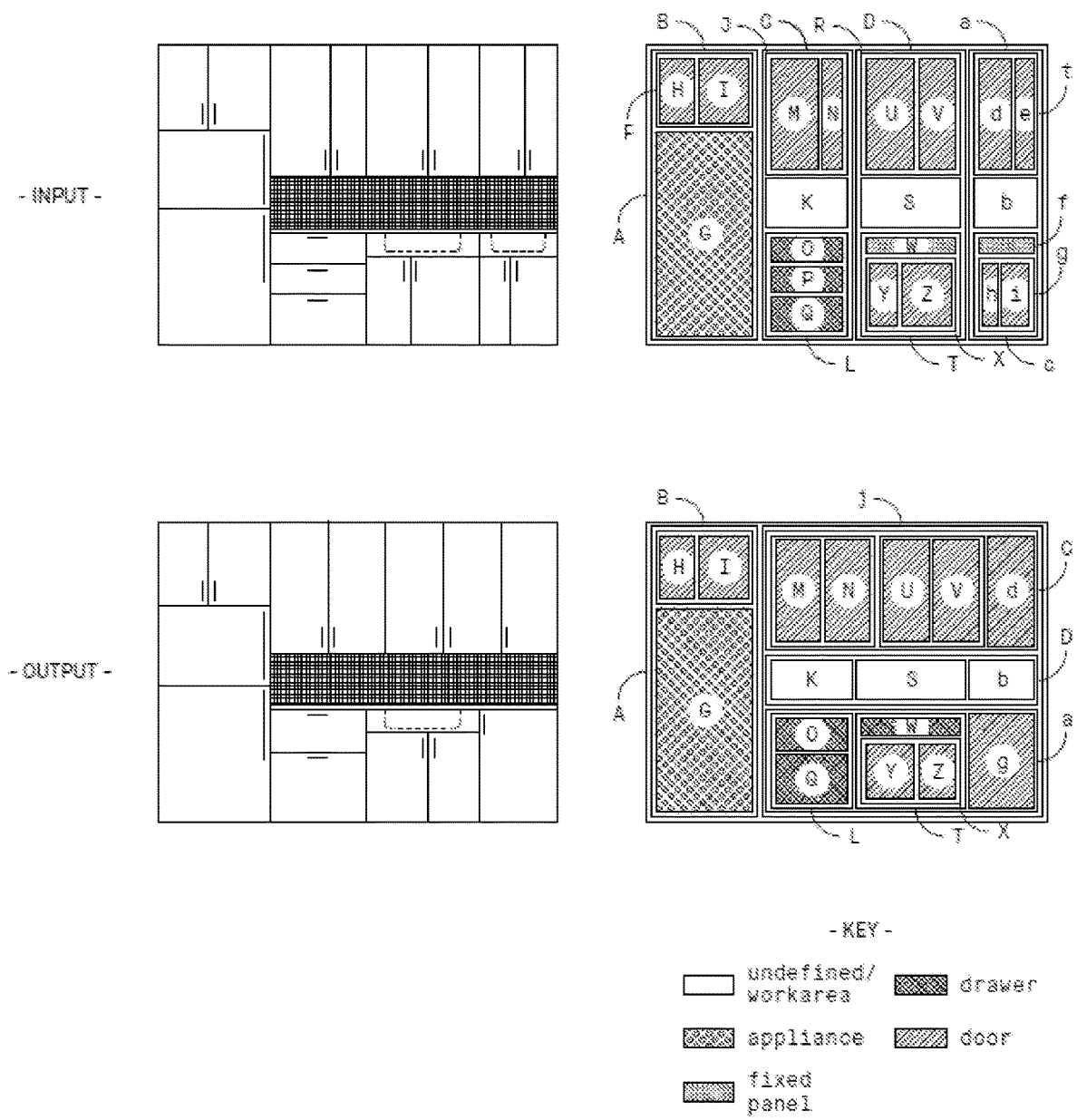
FIG. 54 shows an exemplary embodiment of an input and an output of a set editing function.

Referring now to exemplary FIG. 54, FIG. 54 may illustrate an exemplary output set as a mutation of an input set. The mutated version may be achieved with a set editing function selected by a genetic algorithm. In this example, the input set is edited by grouping the wall cabinet doors of the input (Sets M, N, U, V, d, & e) with the set editing function illustrated in FIG. 39, making the widths of these doors equal with the set editing function illustrated in FIG. 34, changing the number of drawers in a base cabinet (Set L) with the set editing function illustrated in FIG. 31, changing the widths of the doors of the sink cabinet (Set X) with the set editing function illustrated in FIG. 33, and changing the type of a cabinet (Set C) from a sink cabinet (fixed panel and two doors) to a base cabinet with one door with the set editing function illustrated in FIG. 36.

Figure 55:
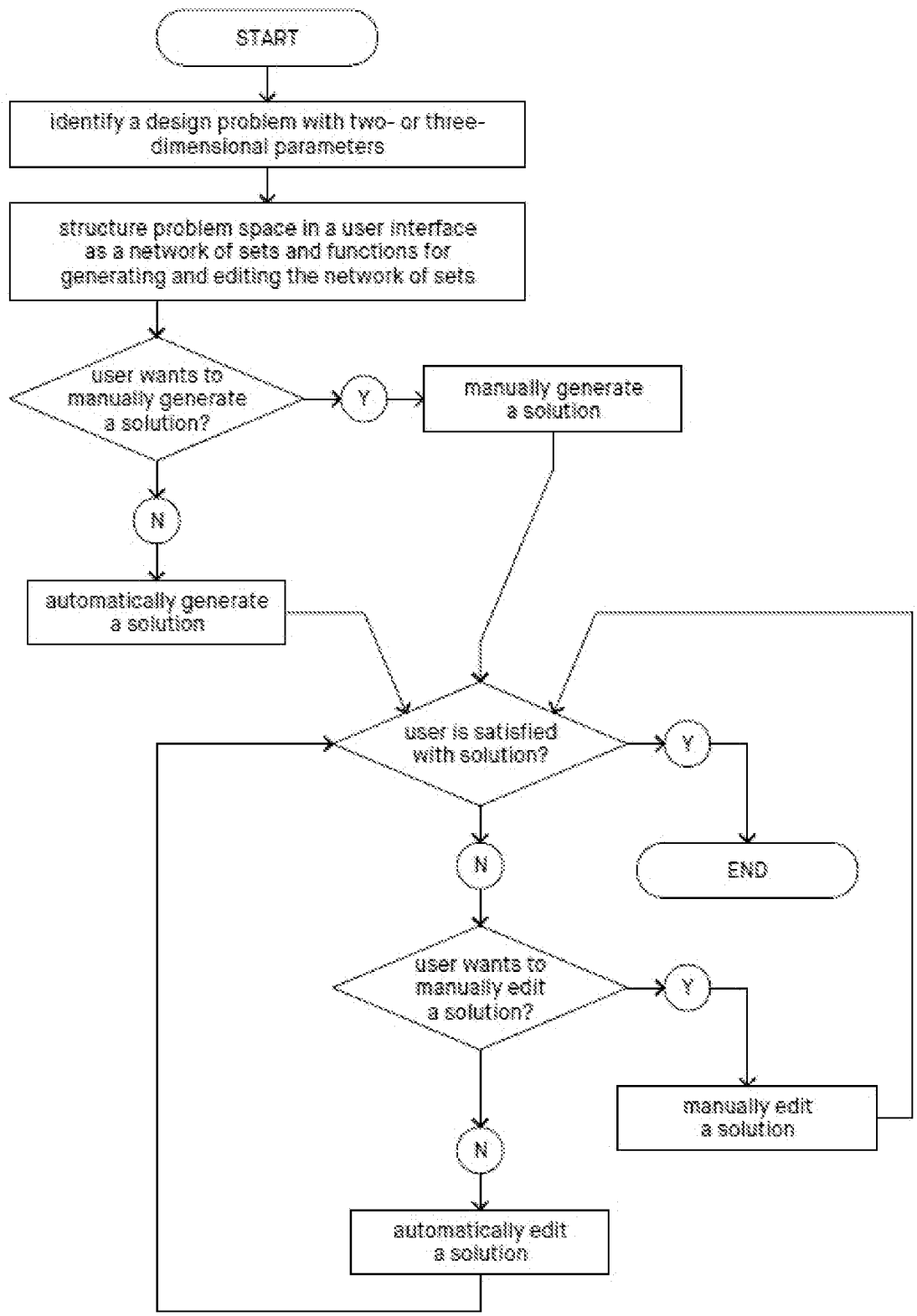
FIG. 55 shows an exemplary embodiment of a method for solving a design problem.

Referring now to exemplary FIG. 55 is a method for creating and using the interface for finding a solution to a problem in a two-dimensional or three-dimensional problem space structured as a network of sets. An exemplary problem space may be the coordination and design of custom cabinetry within a space, such as a kitchen. While a cabinet is a three-dimensional product, and a kitchen is a three-dimensional space, the design of an overall set of cabinets may be divided into coordinated two-dimensional design problems spaces (one plan and one or more elevations). A single cabinet, requiring the design and coordination of peripherals such as doors and drawers, may be another example of a design problem with a two-dimensional problem space.

After identifying a multi-dimensional design problem, a user interface for the problem space may be constructed as a network of sets and functions for generating and editing the network of sets. With the interface, users with varying degrees of experience with the interface and knowledge of the problem space may decide to either manually generate a problem solution with design aids provided by the interface, or instruct the software to automatically generate a solution with minimal inputs. An exemplary solution automatically generated from minimal inputs may be a cabinet design with doors and drawers generated from user inputs, such as size and volume or other dimensional as well as non-dimensional requirements. Software may automatically determine more detailed design requirements from minimal inputs provided by the user with a question-air form or verbal instructions. Exemplary verbal instructions may be, "I need a cabinet to hold 3 large pots, 10 small plates, and knives" or "I want a kitchen with horizontal lines." Using natural language processing algorithms along with heuristics and/or machine learning algorithms, the software may automatically determine or approximate unit proportions as well as volumetric and area requirements from these inputs, and use these requirements as fitness criteria in automatically generating an overall kitchen and/or cabinet design solution.

If the user is not satisfied with the solution, the user may decide to either manually edit the solution with design aids provided by the interface, or instruct the software to automatically edit the solution with additional inputs. Machine learning algorithms (such as object recognition algorithms) may be trained to recognize overall kitchen styles and aid in the generation of solutions for certain types of quantitative as well as qualitative inputs. For instance a user may instruct the software to automatically generate a kitchen design that fits their quantitative requirements in addition to having a qualitative appearance similar to another kitchen or other kitchens.

Other exemplary interfaces with the previous mentioned features for two-dimensional design problem spaces may include virtual and physical media with organized design elements, such as promotional flyers, stationary, and webpage layouts. These exemplary interfaces are more desirable than current technologies, where users are only able to select from a curated set of standard templates.

An exemplary three-dimensional design problem is a whole building design with multiple levels that require design coordination between levels. The problem space for this design problem may be constructed as a three-dimensional network of sets. In the automatic generation of a whole building design, the software may perform whole building analysis in determining fitness. Exemplary analyses of a building include a building's relative size and position to other site elements (roads, other buildings, shading element such trees, and views), life safety analysis, code compliance, and energy analysis.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer program product for designing a unit, embodied on a non-transitory computer-readable medium, the non-transitory computer-readable medium comprising program code that, when executed, causes a computer to perform the steps of:

providing, to a user, a user interface comprising a design interface;

receiving, from the design interface, a plurality of unit parameters for the unit, the plurality of unit parameters comprising at least two of: a type of the unit, a length of the unit, a height of the unit, a width of the unit, a depth of the unit, a number of doors of the unit, a number of other peripherals of the unit, and a number of adjacencies of the unit;

generating a manufacturing model from the plurality of unit parameters received from the design interface, wherein the generated manufacturing model is modeled as a set in a network of sets comprising at least one parent set and a plurality of child sets, the at least one parent set corresponds to an overall space, each parent set has at least two corresponding child sets, and each child set has one corresponding parent set;

computing, from the manufacturing model, two or more constituent parts that make up the unit;

writing a manufacturing file comprising the two or more constituent parts computed from the manufacturing model;

arranging the two or more constituent parts spatially in a workspace to minimize waste of manufacturing material during manufacture;

transmitting the manufacturing file to one or more manufacturing centers;

ordering the two or more constituent parts to be delivered;

executing the manufacturing file when received by an automated manufacturing tool to produce the unit from the two or more delivered constituent parts;

wherein the manufacturing file is generated from the manufacturing model.

2. The computer program product for designing a unit of claim 1, further comprising, automatically constructing, from the specified plurality of parameters, a virtual model of the unit meeting the specified plurality of parameters.

3. The computer program product for designing a unit of claim 1, wherein the design interface is a Web-based interface.

4. The computer program product for designing a unit of claim 1, wherein the first parent set has a plurality of free dimensions, and wherein each of the one or more child sets has one free dimension and at least one inherited dimension, wherein the inherited dimension is inherited from the parent set of the child set.

5. The computer program product for designing a unit of claim 1, wherein each one of the plurality of parent sets has a first dimensional measurement in a first dimension, wherein the parent set has a plurality of child sets associated therewith, the child sets having a plurality of second dimensional measurements in the first dimension, wherein the sum of the plurality of second dimensional measurements is the first dimensional measurement.

6. The computer program product for designing a unit of claim 1, further comprising automatically generating a space design for the overall space, the space design made up of a plurality of units each defined in the one or more child sets.

7. The computer program product for designing a unit of claim 1, further comprising automatically applying a plurality of joints or joinery used to connect a plurality of unit components to the manufacturing model file based on a desired position of each of the plurality of pieces in the unit assembly.

8. The computer program product for designing a unit of claim 7, wherein the plurality of joints are one or more of mortise and hammer-headed tenon joints, mortise and tenon joints, splice joints, and mechanical fasteners.

9. The computer program product for designing a unit of claim 7, wherein the plurality of joinery are one or more of dovetail joinery, T-shaped connections, or tongue and groove joints.

10. The method of claim 6, wherein the step of automatically generating the space design comprises the use of at least one of a heuristic, metaheuristic, and optimization algorithm.

11. The method of claim 1, wherein ordering the one or more parts further comprising ordering the one or more parts to be delivered to one of a customer, the one or more manufacturing centers, or a storage center.

12. The method of claim 1, further comprising applying a nesting algorithm to the plurality of unit parameters received from the design interface to generate a manufacturing model, wherein the unit or its components are arranged spatially in a work space by the manufacturing model to minimize waste of manufacturing material during manufacture.

* * * * *